United States Patent
Cooke et al.

(10) Patent No.: US 12,497,405 B2
(45) Date of Patent: Dec. 16, 2025

(54) BICYCLIC HETEROCYCLE COMPOUNDS METHODS OF USE THEREOF FOR THE TREATMENT OF HERPES VIRUSES

(71) Applicant: Merck Sharp & Dohme LLC, Rahway, NJ (US)

(72) Inventors: Andrew John Cooke, Scotland (GB); Brendan M. Crowley, Collegeville, PA (US); Marc A. Labroli, Moorestown, NJ (US); Michael Aaron Plotkin, Frenchtown, NJ (US); Izzat T. Raheem, Doylestown, PA (US); Ling Tong, Warren, NJ (US); Deyou Sha, Newark, DE (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 828 days.

(21) Appl. No.: 17/783,810

(22) PCT Filed: Dec. 17, 2020

(86) PCT No.: PCT/US2020/065453
§ 371 (c)(1),
(2) Date: Jun. 9, 2022

(87) PCT Pub. No.: WO2021/127071
PCT Pub. Date: Jun. 24, 2021

(65) Prior Publication Data
US 2023/0054782 A1 Feb. 23, 2023

Related U.S. Application Data

(60) Provisional application No. 62/949,911, filed on Dec. 18, 2019.

(51) Int. Cl.
| | |
|---|---|
| *C07D 491/04* | (2006.01) |
| *C07D 405/14* | (2006.01) |
| *C07D 471/04* | (2006.01) |
| *C07D 519/00* | (2006.01) |

(52) U.S. Cl.
CPC ......... *C07D 491/04* (2013.01); *C07D 405/14* (2013.01); *C07D 471/04* (2013.01); *C07D 519/00* (2013.01)

(58) Field of Classification Search
CPC .. C07D 491/04; C07D 405/14; C07D 471/04; C07D 519/00
See application file for complete search history.

(56) References Cited

U.S. PATENT DOCUMENTS

| | | | |
|---|---|---|---|
| 2004/0242568 A1 | 12/2004 | Feng et al. | |
| 2005/0165032 A1 | 7/2005 | Norman et al. | |

FOREIGN PATENT DOCUMENTS

| | | | | |
|---|---|---|---|---|
| WO | 2002004444 A2 | 1/2002 | | |
| WO | 2002006513 A2 | 1/2002 | | |
| WO | 2003053972 A1 | 7/2003 | | |
| WO | 2003059911 A2 | 7/2003 | | |
| WO | 2005040125 A1 | 5/2005 | | |
| WO | WO-2021003157 A1 * | 1/2021 | ........... A61K 31/517 |

OTHER PUBLICATIONS

Liu, Shenping et al., Crystal Structure of the Herpes Simplex Virus 1 DNA Polymerase, The Journal of Biological Chemistry, 2006, 18193-18200, 281(26).
Pubchem, SID 295765343, Available Date: Jan. 27, 2016 [retrieved on Jan. 11, 2021). Retrieved from the Internet: URL: https://pubchem.ncbi.nlm.nih.gov/substance/295765343 entire document, 5 pages.
Tanis, Steven P. et al., The design and development of 2-aryl-2-hydroxyethylamine substituted 1H,7H-pyrido [1,2,3-de]quinoxaline-6-carboxamides as inhibitors of human cytomegalovirus polymerase, Bioorganic & Medicinal Chemistry Letters, 2010, 1994-2000, 20.

* cited by examiner

*Primary Examiner* — Daniel R Carcanague
(74) *Attorney, Agent, or Firm* — Jeffrey P. Bergman; Catherine Fitch

(57) ABSTRACT

The present invention relates to novel Bicyclic Heterocycle Compounds of Formula (I) and pharmaceutically acceptable salts thereof, wherein A, X, Y, Z, R1 R5, R6, and R7 are as defined herein. The present invention also relates to compositions comprising at least one Bicyclic Heterocycle Compound, and methods of using the Bicyclic Heterocycle Compounds for treating or preventing a herpesvirus infection in a patient.

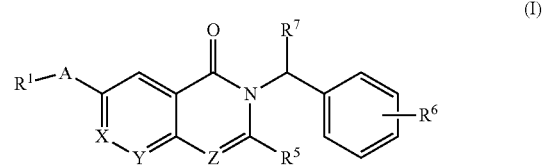

(I)

18 Claims, No Drawings

BICYCLIC HETEROCYCLE COMPOUNDS METHODS OF USE THEREOF FOR THE TREATMENT OF HERPES VIRUSES

CROSS REFERENCE TO RELATED APPLICATIONS

This application is a U.S. National Phase application under 35 U.S.C. § 371 of PCT Application No. PCT/US2020/065453, filed Dec. 17, 2020, which claims priority from U.S. Ser. No. 62/949,911 filed Dec. 18, 2019.

FIELD OF THE INVENTION

The present invention relates to novel Bicyclic Heterocycle Compounds, compositions comprising at least one Bicyclic Heterocycle Compound, and methods of using the Bicyclic Heterocycle Compounds for treating or preventing herpesvirus infection in a patient.

BACKGROUND OF THE INVENTION

Human herpes viruses (Herpesviridae) are responsible for causing a wide variety of diseases in humans. Infection with herpes viruses can occur early in life and by adulthood over 95% of the population is infected by at least one herpes virus. These viruses establish a persistent life-long infection through viral latency in neuronal, lymphoid, or myeloid cells. Recurrent episodes of herpes virus disease can be triggered by numerous stimuli, including concurrent viral infections, stress, fatigue, allergies, pregnancy, sunlight or fever. Herpes virus infection in immune competent individuals generally causes mild self-limiting disease, such as: oral (HSV-1) and genital (HSV-2) ulcers, chicken pox (VZV), flu-like syndrome (CMV) and mononucleosis (EBV). In immunocompromised individuals however, primary infection with, or reactivation of an existing herpes virus infection is a major cause of disease and death. Key at-risk immunocompromised populations include patients undergoing solid organ or stem cell transplants, individuals with HIV/AIDS, and ICU patients.

Herpesviridae comprise a diverse family of double-stranded DNA viruses that are classified into three subfamilies (i.e., α, β, and γ) based upon biological characteristics such as cell tropism, diseases caused, viral life-cycle, and site of viral persistence and latency. The family consists of eight members: Herpes Simplex Virus type 1 and 2 (HSV-1, HSV-2), Varicella Zoster Virus (VZV), Epstein-Barr virus (EBV), Cytomegalovirus (CMV), and human herpes viruses 6-8 (HHV6-8).

α herpes viruses include herpes simplex virus types 1 and 2 (HSV1 and HSV2) and varicella-zoster virus (VZV). HSV1 causes orofacial lesions, commonly known as fever blisters or cold sores. Approximately 30% of the United States population suffers from recurrent episodes of HSV1. HSV2, which is less common than HSV1, causes genital lesions. Primary infection with VZV causes varicella, commonly known as chicken pox. Reactivation of latent VZV manifests as herpes zoster or shingles. Cytomegalovirus (CMV) is a prototypical β herpes virus. Seroprevalance to CMV in the adult population is ~60%, but certain endemic areas of the world have rates closer to 100%. CMV represents the leading viral cause of morbidity and mortality in at-risk immunocompromised patients. EBV, a γ herpes virus, causes infectious mononucleosis and is responsible for lymphoid cancers such as Burkitt's and Hodgkin's lymphoma.

Presently, there is no cure for herpes. Medicines have been developed that can prevent or shorten outbreaks, but there is a need for improved therapies for treating herpes virus infection and inhibiting viral replication. The current standard of care for immunocompromised patients at risk for herpes virus disease is pre-emptive treatment with high-dose nucleoside/nucleotide analog drugs such as acyclovir, (val)ganciclovir, and cidofovir, all of which target the viral DNA polymerase. In general, current treatments are virus specific (not broad spectrum) and in the case of (val)ganciclovir and cidofovir cannot be administered prophylactically due to dose-related toxicities including bone marrow suppression and renal toxicity. Although efficacious in many settings, the current nucleos(t)ide drugs are also limited by drug-resistant viral variants and existing cross-resistant variants which may lead to treatment failure. Therefore, there is an urgent medical need for improved, well-tolerated anti-herpes agents.

SUMMARY OF THE INVENTION

In one aspect, the present invention provides Compounds of Formula

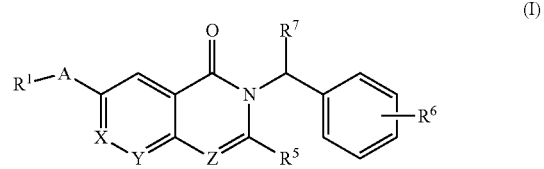

(I)

or a pharmaceutically acceptable salt thereof,
wherein:
A is a bond or —O—;
X is —N— or —C($R^2$)—;
Y is —N— or —C($R^3$)—, such that only one of X and Y can be —N—;
Z is —N— or —C($R^4$)—;
$R^1$ is 5 to 7-membered monocyclic heterocycloalkyl or 9 or 10-membered bicyclic heterocycloalkyl, wherein said 5 to 7-membered monocyclic heterocycloalkyl group, and said 9 or 10-membered bicyclic heterocycloalkyl group can be optionally substituted with up to three $R^A$ groups, which can be the same or different, and wherein said 5 to 7-membered monocyclic heterocycloalkyl group, and said 9 or 10-membered bicyclic heterocycloalkyl group can optionally have a ring carbon atom functionalized as a carbonyl group;
$R^2$ is selected from H, $C_1$-$C_6$ alkyl, —O—($C_1$-$C_6$ alkyl), $C_1$-$C_6$ hydroxyalkyl, $C_1$-$C_6$ aminoalkyl, —CN, —NH$_2$, —C(O)O—($C_1$-$C_6$ alkyl), $C_3$-$C_7$ cycloalkyl, $C_4$-$C_7$ heterocycloalkyl, $C_6$-$C_{10}$ aryl, 5 to 7-membered monocyclic heteroaryl, and 9 or 10-membered bicyclic heteroaryl, wherein said $C_3$-$C_7$ cycloalkyl group, said $C_6$-$C_{10}$ aryl group, said 5 to 7-membered monocyclic heteroaryl group, and said 9 or 10-membered bicyclic heteroaryl group can be optionally substituted with up to three $R^B$ groups, which can be the same or different, or where $R^2$ and $R^3$, together with atoms to which they are attached, are joined to form a 5-membered heteroaryl group;
$R^3$ is selected from H, $C_1$-$C_6$ alkyl, $C_1$-$C_6$ hydroxyalkyl, 5 to 7-membered monocyclic heteroaryl, —O-(5 to 7-membered monocyclic heteroaryl), $C_3$-$C_7$ cycloalkyl, wherein said $C_3$-$C_7$ cycloalkyl group, and any of said 5 to 7-membered monocyclic heteroaryl groups, can be optionally substituted with up to three $R^C$ groups, which can be the same or different;

$R^4$ is selected from H, $C_1$-$C_6$ alkyl, $C_1$-$C_6$ hydroxyalkyl, and $C_3$-$C_7$ cycloalkyl;

$R^5$ is selected from H, $C_1$-$C_6$ alkyl, —$OR^7$, —CN, —$NH_2$, $C_1$-$C_6$ hydroxyalkyl, $C_1$-$C_6$ haloalkyl, —O—($C_1$-$C_6$ hydroxyalkyl), —($C_1$-$C_6$ alkylene)-NH—($C_1$-$C_6$ haloalkyl), —O—($C_1$-$C_6$ alkylene)$_m$-($C_3$-$C_7$ cycloalkyl), —O—($C_1$-$C_6$ alkylene)$_m$-(5 to 7-membered monocyclic heterocycloalkyl), and —($C_1$-$C_6$ alkylene)$_m$-(5 to 7-membered monocyclic heterocycloalkyl), wherein said $C_1$-$C_6$ alkyl group, said $C_3$-$C_7$ cycloalkyl group, and said 5 to 7-membered monocyclic heterocycloalkyl group can each be optionally substituted with one or more substituents, each independently selected from —OH, $C_1$-$C_6$ alkyl, and $C_3$-$C_7$ cycloalkyl, and wherein said $C_1$-$C_6$ haloalkyl can be optionally substituted with one —$NH_2$ group;

$R^6$ represents up to 3 phenyl ring substituents, which can be the same or different, and are each independently selected from $C_1$-$C_6$ haloalkyl, $C_1$-$C_6$ hydroxyalkyl, —CN, —$NO_2$, —$OR^7$, and halo;

each occurrence of $R^7$ is independently selected from H, $C_1$-$C_6$ alkyl, and $C_3$-$C_7$ cycloalkyl;

each occurrence of $R^A$ is independently selected from $C_1$-$C_6$ alkyl, $C_1$-$C_6$ haloalkyl, $C_1$-$C_6$ alkoxyalkyl, 5 to 7-membered monocyclic heterocycloalkyl, —C(O)—($C_1$-$C_6$ alkyl), and halo, wherein said 5 to 7-membered monocyclic heterocycloalkyl group can be optionally substituted with up to 3 substituents, which can be the same or different, and are each independently selected from $C_1$-$C_6$ alkyl, 5 to 7-membered monocyclic heterocycloalkyl, and halo;

each occurrence of $R^B$ is independently selected from $C_1$-$C_6$ alkyl, $C_3$-$C_7$ cycloalkyl, —O—($C_3$-$C_7$ cycloalkyl), —$OR^7$, $C_1$-$C_6$ haloalkyl, $C_1$-$C_6$ hydroxyalkyl, —O—($C_1$-$C_6$ alkylene)$_m$-(5 to 7-membered monocyclic heterocycloalkyl), and —($C_1$-$C_6$ alkylene)$_m$-(5 to 7-membered monocyclic heterocycloalkyl), and —$NH_2$;

each occurrence of $R^C$ is independently selected from $C_1$-$C_6$ alkyl, —$OR^7$, $C_1$-$C_6$ haloalkyl, and 5 to 7-membered monocyclic heterocycloalkyl; and each occurrence of m is independently 0 or 1.

The Compounds of Formula (I) (also referred to herein as the "Bicyclic Heterocycle Compounds"), and pharmaceutically acceptable salts thereof can be useful, for example, for inhibiting herpesvirus viral replication or activity, and for treating or preventing herpesvirus infection in a patient. Without being bound by any specific theory, it is believed that the Bicyclic Heterocycle Compounds inhibit herpesvirus viral replication by inhibiting herpesvirus polymerase.

Accordingly, the present invention provides methods for treating or preventing herpesvirus infection in a patient, comprising administering to the patient an effective amount of at least one Bicyclic Heterocycle Compound.

The details of the invention are set forth in the accompanying detailed description below.

Although any methods and materials similar to those described herein can be used in the practice or testing of the present invention, illustrative methods and materials are now described.

Other embodiments, aspects and features of the present invention are either further described in or will be apparent from the ensuing description, examples and appended claims.

DETAILED DESCRIPTION OF THE INVENTION

The present invention relates to novel Bicyclic Heterocycle Compounds, compositions comprising at least one Bicyclic Heterocycle Compound, and methods of using the Bicyclic Heterocycle Compounds for treating or preventing herpesvirus infection in a patient.

Definitions and Abbreviations

The terms used herein have their ordinary meaning and the meaning of such terms is independent at each occurrence thereof. That notwithstanding and except where stated otherwise, the following definitions apply throughout the specification and claims. Chemical names, common names, and chemical structures may be used interchangeably to describe the same structure. If a chemical compound is referred to using both a chemical structure and a chemical name and an ambiguity exists between the structure and the name, the structure predominates. These definitions apply regardless of whether a term is used by itself or in combination with other terms, unless otherwise indicated. Hence, the definition of "alkyl" applies to "alkyl" as well as the "alkyl" portions of "hydroxyalkyl," "haloalkyl," "—O-alkyl," etc. . . . .

As used herein, and throughout this disclosure, the following terms, unless otherwise indicated, shall be understood to have the following meanings:

A "patient" is a human or non-human mammal. In one embodiment, a patient is a human.

The term "effective amount" as used herein, refers to an amount of Bicyclic Heterocycle Compound and/or an additional therapeutic agent, or a composition thereof that is effective in producing the desired therapeutic, ameliorative, inhibitory or preventative effect when administered to a patient suffering from a viral infection or virus-related disorder. In the combination therapies of the present invention, an effective amount can refer to each individual agent or to the combination as a whole, wherein the amounts of all agents administered are together effective, but wherein the component agent of the combination may not be present individually in an effective amount.

The term "preventing," as used herein with respect to an herpesvirus viral infection or herpesvirus-virus related disorder, refers to reducing the likelihood of herpesvirus infection.

The term "alkyl," as used herein, refers to an aliphatic hydrocarbon group having one of its hydrogen atoms replaced with a bond. An alkyl group may be straight or branched and contain from about 1 to about 20 carbon atoms. In one embodiment, an alkyl group contains from about 1 to about 12 carbon atoms. In different embodiments, an alkyl group contains from 1 to 6 carbon atoms ($C_1$-$C_6$ alkyl) or from about 1 to about 4 carbon atoms ($C_1$-$C_4$ alkyl). Non-limiting examples of alkyl groups include methyl, ethyl, n-propyl, isopropyl, n-butyl, sec-butyl, isobutyl, tert-butyl, n-pentyl, neopentyl, isopentyl, n-hexyl, isohexyl and neohexyl. An alkyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —$NH_2$, —NH(alkyl), —N(alkyl)$_2$, NH(cycloalkyl), —O—C(O)-alkyl, —O—C(O)-aryl, —O—C(O)— cycloalkyl, —C(O)OH and —C(O)O-alkyl. In one embodiment, an alkyl group is linear. In another embodiment, an alkyl group is branched. Unless otherwise indicated, an alkyl group is unsubstituted.

The term "alkenyl," as used herein, refers to an aliphatic hydrocarbon group containing at least one carbon-carbon double bond and having one of its hydrogen atoms replaced with a bond. An alkenyl group may be straight or branched and contain from about 2 to about 15 carbon atoms. In one embodiment, an alkenyl group contains from about 2 to about 12 carbon atoms. In another embodiment, an alkenyl group contains from about 2 to about 6 carbon atoms. Non-limiting examples of alkenyl groups include ethenyl, propenyl, n-butenyl, 3-methylbut-2-enyl, n-pentenyl, octenyl and decenyl. An alkenyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —NH$_2$, —NH(alkyl), —N(alkyl)$_2$, —NH(cycloalkyl), —O—C(O)-alkyl, —O—C(O)-aryl, —O—C(O)-cycloalkyl, —C(O)OH and —C(O)O-alkyl. The term "C$_2$-C$_6$ alkenyl" refers to an alkenyl group having from 2 to 6 carbon atoms. Unless otherwise indicated, an alkenyl group is unsubstituted.

The term "alkynyl," as used herein, refers to an aliphatic hydrocarbon group containing at least one carbon-carbon triple bond and having one of its hydrogen atoms replaced with a bond. An alkynyl group may be straight or branched and contain from about 2 to about 15 carbon atoms. In one embodiment, an alkynyl group contains from about 2 to about 12 carbon atoms. In another embodiment, an alkynyl group contains from about 2 to about 6 carbon atoms. Non-limiting examples of alkynyl groups include ethynyl, propynyl, 2-butynyl and 3-methylbutynyl. An alkynyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —NH$_2$, —NH(alkyl), —N(alkyl)$_2$, —NH(cycloalkyl), —O—C(O)-alkyl, —O—C(O)-aryl, —O—C(O)-cycloalkyl, —C(O)OH and —C(O)O-alkyl. The term "C$_2$-C$_6$ alkynyl" refers to an alkynyl group having from 2 to 6 carbon atoms. Unless otherwise indicated, an alkynyl group is unsubstituted.

The term "alkylene," as used herein, refers to an alkyl group, as defined above, wherein one of the alkyl group's hydrogen atoms has been replaced with a bond. Non-limiting examples of alkylene groups include —CH$_2$—, —CH$_2$CH$_2$—, —CH$_2$CH$_2$CH$_2$—, —CH$_2$CH$_2$CH$_2$CH$_2$—, —CH(CH$_3$)CH$_2$CH$_2$—, —CH(CH$_3$)— and —CH$_2$CH(CH$_3$)CH$_2$—. In one embodiment, an alkylene group has from 1 to about 6 carbon atoms. In another embodiment, an alkylene group is branched. In another embodiment, an alkylene group is linear. In one embodiment, an alkylene group is —CH$_2$—. The term "C$_1$-C$_6$ alkylene" refers to an alkylene group having from 1 to 6 carbon atoms.

The term "aryl," as used herein, refers to an aromatic monocyclic or multicyclic ring system comprising from about 6 to about 14 carbon atoms. In one embodiment, an aryl group contains from about 6 to about 10 carbon atoms. An aryl group can be optionally substituted with one or more "ring system substituents" which may be the same or different, and are as defined herein below. In one embodiment, an aryl group can be optionally fused to a cycloalkyl or cycloalkanoyl group. Non-limiting examples of aryl groups include phenyl and naphthyl. In one embodiment, an aryl group is phenyl. In another embodiment, an aryl group is napthalene. Unless otherwise indicated, an aryl group is unsubstituted.

The term "cycloalkyl," as used herein, refers to a non-aromatic mono- or multicyclic ring system comprising from about 3 to about 10 ring carbon atoms. In one embodiment, a cycloalkyl contains from about 5 to about 10 ring carbon atoms. In another embodiment, a cycloalkyl contains from about 3 to about 7 ring atoms. In another embodiment, a cycloalkyl contains from about 5 to about 6 ring atoms. Non-limiting examples of monocyclic cycloalkyls include cyclopropyl, cyclobutyl, cyclopentyl, cyclohexyl, cycloheptyl and cyclooctyl. Non-limiting examples of multicyclic cycloalkyls include 1-decalinyl, norbornyl and adamantyl. A cycloalkyl group can be optionally substituted with one or more "ring system substituents" which may be the same or different, and are as defined herein below. Unless otherwise indicated, a cycloalkyl group is unsubstituted. In one embodiment, a cycloalkyl group is unsubstituted. The term "3 to 6-membered cycloalkyl" refers to a cycloalkyl group having from 3 to 6 ring carbon atoms. A ring carbon atom of a cycloalkyl group may be functionalized as a carbonyl group. An illustrative example of such a cycloalkyl group (also referred to herein as a "cycloalkanoyl" group) includes, but is not limited to, cyclobutanoyl:

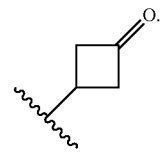 [SMILES: *C1CC(=O)C1]

The term "cycloalkenyl," as used herein, refers to a non-aromatic mono- or multicyclic ring system comprising from about 4 to about 10 ring carbon atoms and containing at least one endocyclic double bond. In one embodiment, a cycloalkenyl contains from about 4 to about 7 ring carbon atoms. In another embodiment, a cycloalkenyl contains 5 or 6 ring atoms. Non-limiting examples of monocyclic cycloalkenyls include cyclopentenyl, cyclohexenyl, cyclohepta-1,3-dienyl, and the like. A cycloalkenyl group can be optionally substituted with one or more "ring system substituents" which may be the same or different, and are as defined herein below. A ring carbon atom of a cycloalkyl group may be functionalized as a carbonyl group. Unless otherwise indicated, a cycloalkenyl group is unsubstituted. In one embodiment, a cycloalkenyl group is cyclopentenyl. In another embodiment, a cycloalkenyl group is cyclohexenyl. The term "4 to 6-membered cycloalkenyl" refers to a cycloalkenyl group having from 4 to 6 ring carbon atoms.

The term "halo," as used herein, means —F, —Cl, —Br or —I.

The term "haloalkyl," as used herein, refers to an alkyl group as defined above, wherein one or more of the alkyl group's hydrogen atoms has been replaced with a halogen. In one embodiment, a haloalkyl group has from 1 to 6 carbon atoms. In another embodiment, a haloalkyl group is substituted with from 1 to 3 F atoms. Non-limiting examples of haloalkyl groups include —CH$_2$F, —CHF$_2$, —CF$_3$, —CH$_2$Cl and —CCl$_3$.

The term "C$_1$-C$_6$ haloalkyl" refers to a haloalkyl group having from 1 to 6 carbon atoms.

The term "hydroxyalkyl," as used herein, refers to an alkyl group as defined above, wherein one or more of the alkyl group's hydrogen atoms has been replaced with an —OH group. In one embodiment, a hydroxyalkyl group has from 1 to 6 carbon atoms. Non-limiting examples of hydroxyalkyl groups include —CH$_2$OH, —CH$_2$CH$_2$OH, —CH$_2$CH$_2$CH$_2$OH and —CH$_2$CH(OH)CH$_3$. The term "C$_1$-C$_6$ hydroxyalkyl" refers to a hydroxyalkyl group having from 1 to 6 carbon atoms.

The term "heteroaryl," as used herein, refers to an aromatic monocyclic or multicyclic ring system comprising about 5 to about 14 ring atoms, wherein from 1 to 4 of the ring atoms is independently O, N or S and the remaining ring atoms are carbon atoms. In one embodiment, a heteroaryl group has 5 to 10 ring atoms. In another embodiment, a heteroaryl group is monocyclic and has 5 or 6 ring atoms. In another embodiment, a heteroaryl group is bicyclic and had 9 or 10 ring atoms. A heteroaryl group can be optionally substituted by one or more "ring system substituents" which may be the same or different, and are as defined herein below. A heteroaryl group is joined via a ring carbon atom, and any nitrogen atom of a heteroaryl can be optionally oxidized to the corresponding N-oxide. The term "heteroaryl" also encompasses a heteroaryl group, as defined above, which is fused to a benzene ring. Unless otherwise indicated, a heteroaryl group is unsubstituted. Non-limiting examples of heteroaryls include pyridyl, pyrazinyl, furanyl, thienyl, pyrimidinyl, pyridone (including N-substituted pyridones), isoxazolyl, isothiazolyl, oxazolyl, oxadiazolyl, thiazolyl, pyrazolyl, furazanyl, pyrrolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, benzimidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like, and all isomeric forms thereof. The term "heteroaryl" also refers to partially saturated heteroaryl moieties such as, for example, tetrahydroisoquinolyl, tetrahydroquinolyl and the like. In one embodiment, a heteroaryl group is a 5-membered heteroaryl. In another embodiment, a heteroaryl group is a 6-membered heteroaryl. In another embodiment, a "9- or 10-membered bicyclic heteroaryl" group comprises a 5- to 6-membered heterocycloalkyl group fused to a benzene ring, such as:

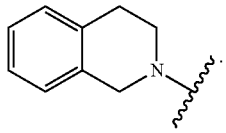 [SMILES: *N1CCc2ccccc2C1]

In still another embodiment, a "9- or 10-membered bicyclic heteroaryl" group comprises a 5- to 6-membered heteroaryl group fused to a cycloalkyl ring or a heterocycloalkyl ring, such as:

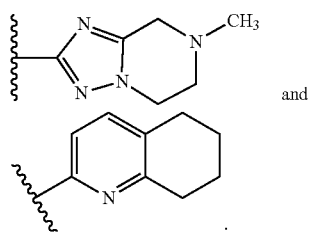

and

The term "heteroarylene," as used herein, refers to a bivalent group derived from an heteroaryl group, as defined above, by removal of a hydrogen atom from a ring carbon or ring heteroatom of a heteroaryl group. A heteroarylene group can be derived from a monocyclic or multicyclic ring system comprising about 5 to about 14 ring atoms, wherein from 1 to 4 of the ring atoms are each independently O, N or S and the remaining ring atoms are carbon atoms. A heteroarylene group can be optionally substituted by one or more "ring system substituents" which may be the same or different, and are as defined herein below. A heteroarylene group is joined via a ring carbon atom or by a nitrogen atom with an open valence, and any nitrogen atom of a heteroarylene can be optionally oxidized to the corresponding N-oxide. The term "heteroarylene" also encompasses a heteroarylene group, as defined above, which is fused to a benzene ring. Non-limiting examples of heteroarylenes include pyridylene, pyrazinylene, furanylene, thienylene, pyrimidinylene, pyridonylene (including those derived from N-substituted pyridonyls), isoxazolylene, isothiazolylene, oxazolylene, oxadiazolylene, thiazolylene, pyrazolylene, thiophenylene, furazanylene, pyrrolylene, triazolylene, 1,2,4-thiadiazolylene, pyrazinylene, pyridazinylene, quinoxalinylene, phthalazinylene, oxindolylene, imidazo[1,2-a]pyridinylene, imidazo[2,1-b]thiazolylene, benzofurazanylene, indolylene, azaindolylene, benzimidazolylene, benzothienylene, quinolinylene, imidazolylene, benzimidazolylene, thienopyridylene, quinazolinylene, thienopyrimidylene, pyrrolopyridylene, imidazopyridylene, isoquinolinylene, benzoazaindolylene, 1,2,4-triazinylene, benzothiazolylene and the like, and all isomeric forms thereof. The term "heteroarylene" also refers to partially saturated heteroarylene moieties such as, for example, tetrahydroisoquinolylene, tetrahydroquinolylene, and the like. A heteroarylene group is divalent and unless specified otherwise, either available bond on a heteroarylene ring can connect to either group flanking the heteroarylene group. For example, the group "A-heteroarylene-B," wherein the heteroarylene group is:

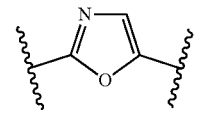 [SMILES: *c1cnc(*)o1]

is understood to represent both:

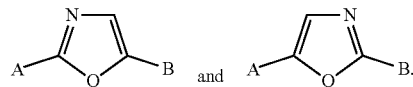

In one embodiment, a heteroarylene group is a monocyclic heteroarylene group or a bicyclic heteroarylene group. In another embodiment, a heteroarylene group is a monocyclic heteroarylene group. In another embodiment, a heteroarylene group is a bicyclic heteroarylene group. In still another embodiment, a heteroarylene group has from about 5 to about 10 ring atoms. In another embodiment, a heteroarylene group is monocyclic and has 5 or 6 ring atoms. In another embodiment, a heteroarylene group is bicyclic and has 9 or 10 ring atoms. In another embodiment, a heteroarylene group is a 5-membered monocyclic heteroarylene. In another embodiment, a heteroarylene group is a 6-membered monocyclic heteroarylene. In another embodiment, a bicyclic heteroarylene group comprises a 5 or 6-membered monocyclic heteroarylene group fused to a benzene ring. In still another embodiment, a heteroaryl group comprises a 5- to 6-membered monocyclic heteroarylene group fused to a cycloalkyl ring or a heterocycloalkyl ring. Unless otherwise indicated, a heteroarylene group is unsubstituted.

The term "heterocycloalkyl," as used herein, refers to a non-aromatic saturated monocyclic or multicyclic ring system comprising 3 to about 11 ring atoms, wherein from 1 to 4 of the ring atoms are independently O, S, N or Si, and the remainder of the ring atoms are carbon atoms. A heterocycloalkyl group can be joined via a ring carbon, ring silicon atom or ring nitrogen atom. In one embodiment, a heterocycloalkyl group is monocyclic and has from about 3 to about 7 ring atoms. In another embodiment, a heterocycloalkyl group is monocyclic has from about 4 to about 7 ring atoms. In another embodiment, a heterocycloalkyl group is bicyclic and has from about 7 to about 11 ring atoms. In still another embodiment, a heterocycloalkyl group is monocyclic and has 5 or 6 ring atoms. In one embodiment, a heterocycloalkyl group is monocyclic. In another embodiment, a heterocycloalkyl group is bicyclic. There are no adjacent oxygen and/or sulfur atoms present in the ring system. Any —NH group in a heterocycloalkyl ring may exist protected such as, for example, as an —N(BOC), —N(CBz), —N(Tos) group and the like; such protected heterocycloalkyl groups are considered part of this invention. A heterocycloalkyl group can be optionally substituted by one or more "ring system substituents" which may be the same or different, and are as defined herein below. The nitrogen or sulfur atom of the heterocycloalkyl can be optionally oxidized to the corresponding N-oxide, S-oxide or S,S-dioxide. Non-limiting examples of monocyclic heterocycloalkyl rings include oxetanyl, piperidyl, pyrrolidinyl, piperazinyl, morpholinyl, thiomorpholinyl, thiazolidinyl, 1,4-dioxanyl, tetrahydrofuranyl, tetrahydrothiophenyl, delta-lactam, delta-lactone, silacyclopentane, silapyrrolidine and the like, and all isomers thereof. Non-limiting illustrative examples of a silyl-containing heterocycloalkyl group include:

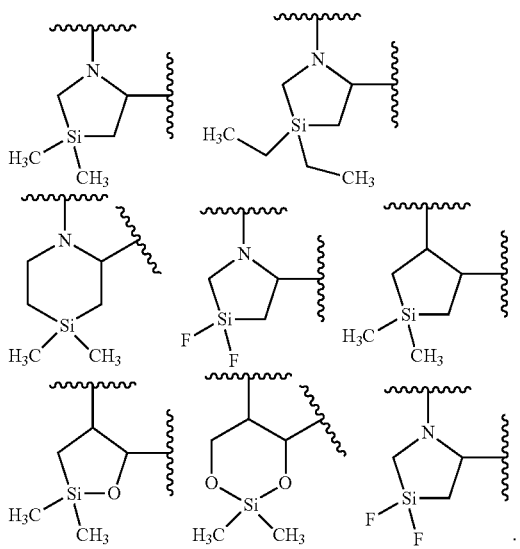

A ring carbon atom of a heterocycloalkyl group may be functionalized as a carbonyl group. Illustrative examples of such a heterocycloalkyl group include, but are not limited to:

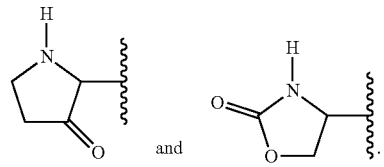 [SMILES: *C1NCCC1=O ; *C1COC(=O)N1]

A ring sulfur atom of a heterocycloalkyl group may also be functionalized as a sulfonyl group. An example of such a heterocycloalkyl group is:

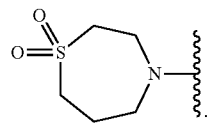

In one embodiment, a heterocycloalkyl group is a 5-membered monocyclic heterocycloalkyl. In another embodiment, a heterocycloalkyl group is a 6-membered monocyclic heterocycloalkyl. The term "5- to 7-membered monocyclic cycloalkyl" refers to a monocyclic heterocycloalkyl group having from 5 to 5 ring atoms. The term "4 to 6-membered monocyclic cycloalkyl" refers to a monocyclic heterocycloalkyl group having from 4 to 6 ring atoms. The term "9 to 10-membered bicyclic heterocycloalkyl" refers to a bicyclic heterocycloalkyl group having from 9 to 10 ring atoms.

The term "heterocycloalkenyl," as used herein, refers to a heterocycloalkyl group, as defined above, wherein the heterocycloalkyl group contains from 4 to 10 ring atoms, and at least one endocyclic carbon-carbon or carbon-nitrogen double bond. A heterocycloalkenyl group can be joined via a ring carbon or ring nitrogen atom. In one embodiment, a heterocycloalkenyl group has from 4 to 6 ring atoms. In another embodiment, a heterocycloalkenyl group is monocyclic and has 5 or 6 ring atoms. In another embodiment, a heterocycloalkenyl group is bicyclic. A heterocycloalkenyl group can optionally substituted by one or more ring system substituents, wherein "ring system substituent" is as defined above. The nitrogen or sulfur atom of the heterocycloalkenyl can be optionally oxidized to the corresponding N-oxide, S-oxide or S,S-dioxide. A ring carbon atom of a heterocycloalkenyl group may be functionalized as a carbonyl group. Non-limiting examples of heterocycloalkenyl groups include 1,2,3,4-tetrahydropyridinyl, 1,2-dihydropyridinyl, 1,4-dihydropyridinyl, 1,2,3,6-tetrahydropyridinyl, 1,4,5,6-tetrahydropyrimidinyl, 2-pyrrolinyl, 3-pyrrolinyl, 2-imidazolinyl, 2-pyrazolinyl, dihydroimidazolyl, dihydrooxazolyl, dihydrooxadiazolyl, dihydrothiazolyl, 3,4-dihydro-2H-pyranyl, dihydrofuranyl, fluoro-substituted dihydrofuranyl, 7-oxabicyclo[2.2.1]heptenyl, dihydrothiophenyl, dihydrothiopyranyl, and the like and the like. In one embodiment, a heterocycloalkenyl group is a 5-membered heterocycloalkenyl. In another embodiment, a heterocycloalkenyl group is a 6-membered heterocycloalkenyl. The term "4 to 6-membered heterocycloalkenyl" refers to a heterocycloalkenyl group having from 4 to 6 ring atoms.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds. By "stable compound" or "stable structure" is meant a compound that is sufficiently robust to survive isolation to a useful degree of purity from a reaction mixture, and formulation into an efficacious therapeutic agent.

The term "in substantially purified form," as used herein, refers to the physical state of a compound after the compound is isolated from a synthetic process (e.g., from a reaction mixture), a natural source, or a combination thereof. The term "in substantially purified form," also refers to the physical state of a compound after the compound is obtained from a purification process or processes described herein or well-known to the skilled artisan (e.g., chromatography, recrystallization and the like), in sufficient purity to be characterizable by standard analytical techniques described herein or well-known to the skilled artisan.

It should also be noted that any carbon as well as heteroatom with unsatisfied valences in the text, schemes, examples and tables herein is assumed to have the sufficient number of hydrogen atom(s) to satisfy the valences.

When a functional group in a compound is termed "protected", this means that the group is in modified form to preclude undesired side reactions at the protected site when the compound is subjected to a reaction. Suitable protecting groups will be recognized by those with ordinary skill in the art as well as by reference to standard textbooks such as, for example, T. W. Greene et al, *Protective Groups in Organic Synthesis* (1991), Wiley, New York.

Examples of "ring system substituents" include, but are not limited to, alkyl, alkenyl, alkynyl, aryl, heteroaryl, -alkylene-aryl, -arylene-alkyl,-alkylene-heteroaryl, -alkenylene-heteroaryl, -alkynylene-heteroaryl, —OH, hydroxyalkyl, haloalkyl, —O-alkyl, —O-haloalkyl, -alkylene-O-alkyl, —O-aryl, —O-alkylene-aryl, acyl, —C(O)-aryl, halo, —NO$_2$, —CN, —SF$_5$, —C(O)OH, —C(O)O-alkyl, —C(O)O-aryl, —C(O)O-alkylene-aryl, —S(O)-alkyl, —S(O)$_2$-alkyl, —S(O)-aryl, —S(O)$_2$-aryl, —S(O)-heteroaryl, —S(O)$_2$-heteroaryl, —S-alkyl, —S-aryl, —S-heteroaryl, —S-alkylene-aryl, —S-alkyleneheteroaryl, —S(O)$_2$-alkylene-aryl, —S(O)$_2$-alkylene-heteroaryl, —Si (alkyl)$_2$, —Si(aryl)$_2$, Si(heteroaryl)$_2$-Si(alkyl)(aryl), —Si (alkyl)(cycloalkyl), —Si(alkyl)(heteroaryl), cycloalkyl, heterocycloalkyl, —O—C(O)-alkyl, —O—C(O)-aryl, —O—C (O)-cycloalkyl, —C(=N—CN)—NH$_2$, —C(=NH)—NH$_2$, —C(=NH)—NH(alkyl), —N(Y$^1$)(Y$^2$), -alkylene-N(Y$^1$) (Y$^2$), —C(O)N(Y$^1$)(Y$^2$) and —S(O)$_2$N(Y$^1$)(Y$^2$), wherein Y$^1$ and Y$^2$ can be the same or different and are independently selected from the group consisting of hydrogen, alkyl, aryl, cycloalkyl, and -alkylene-aryl. "Ring system substituent" may also mean a single moiety which simultaneously replaces two available hydrogens on two adjacent carbon atoms (one H on each carbon) on a ring system. Examples of such moiety are methylenedioxy, ethylenedioxy, —C(CH$_3$)$_2$— and the like which form moieties such as, for example:

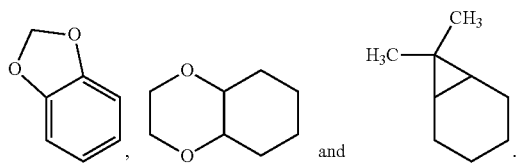

When any substituent or variable (e.g., R$^1$, m, etc.) occurs more than one time in any constituent or in Formula (I), its definition on each occurrence is independent of its definition at every other occurrence, unless otherwise indicated.

As used herein, the term "composition" is intended to encompass a product comprising the specified ingredients in the specified amounts, as well as any product which results from combination of the specified ingredients in the specified amounts.

Prodrugs and solvates of the compounds of the invention are also contemplated herein. A discussion of prodrugs is provided in T. Higuchi and V. Stella, *Pro-drugs as Novel Delivery Systems* (1987) 14 of the A.C.S. Symposium Series, and in *Bioreversible Carriers in Drug Design*, (1987) Edward B. Roche, ed., American Pharmaceutical Association and Pergamon Press. The term "prodrug" means a compound (e.g., a drug precursor) that is transformed in vivo to provide an Bicyclic Heterocycle Compound or a pharmaceutically acceptable salt or solvate of the compound. The transformation may occur by various mechanisms (e.g., by metabolic or chemical processes), such as, for example, through hydrolysis in blood.

For example, if an Bicyclic Heterocycle Compound or a pharmaceutically acceptable salt, hydrate or solvate of the compound contains a carboxylic acid functional group, a prodrug can comprise an ester formed by the replacement of the hydrogen atom of the acid group with a group such as, for example, (C$_1$-C$_8$)alkyl, (C$_2$-C$_{12}$)alkanoyloxymethyl, 1-(alkanoyloxy)ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 6 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl) amino)ethyl having from 4 to 10 carbon atoms, 3-phthalidyl, 4-crotonolactonyl, gamma-butyrolacton-4-yl, di-N,N—(C$_1$-C$_2$)alkylamino(C$_2$-C$_3$)alkyl (such as β-dimethylaminoethyl), carbamoyl-(C$_1$-C$_2$)alkyl, N,N-di (C$_1$-C$_2$)alkylcarbamoyl-(C$_1$-C$_2$)alkyl and piperidino-, pyrrolidino- or morpholino(C$_2$-C$_3$)alkyl, and the like.

Similarly, if an Bicyclic Heterocycle Compound contains an alcohol functional group, a prodrug can be formed by the replacement of the hydrogen atom of the alcohol group with a group such as, for example, (C$_1$-C$_6$)alkanoyloxymethyl, 1-((C$_1$-C$_6$)alkanoyloxy)ethyl, 1-methyl-1-((C$_1$-C$_6$)alkanoyloxy)ethyl, (C$_1$-C$_6$)alkoxycarbonyloxymethyl, N—(C$_1$-C$_6$) alkoxycarbonylaminomethyl, succinoyl, (C$_1$-C$_6$)alkanoyl, α-amino(C$_1$-C$_4$)alkyl, α-amino(C$_1$-C$_4$)alkylene-aryl, arylacyl and α-aminoacyl, or α-aminoacyl-α-aminoacyl, where each α-aminoacyl group is independently selected from the naturally occurring L-amino acids, —P(O)(OH)$_2$, —P(O)(O (C$_1$-C$_6$)alkyl)$_2$ or glycosyl (the radical resulting from the removal of a hydroxyl group of the hemiacetal form of a carbohydrate), and the like.

If an Bicyclic Heterocycle Compound incorporates an amine functional group, a prodrug can be formed by the replacement of a hydrogen atom in the amine group with a group such as, for example, R-carbonyl-, RO-carbonyl-, NRR'-carbonyl- wherein R and R' are each independently (C$_1$-C$_{10}$) alkyl, (C$_3$-C$_7$) cycloalkyl, benzyl, a natural α-aminoacyl, —C(OH)C(O)OY$^1$ wherein Y$^1$ is H, (C$_1$-C$_6$)alkyl or benzyl, —C(OY$^2$)Y$^3$ wherein Y$^2$ is (C$_1$-C$_4$) alkyl and Y$^3$ is (C$_1$-C$_6$) alkyl; carboxy (C$_1$-C$_6$)alkyl; amino(C$_1$-C$_4$)alkyl or mono-N- or di-N,N—(C$_1$-C$_6$)alkylaminoalkyl; —C(Y$^4$)Y$^5$ wherein $Y^4$ is H or methyl and $Y^5$ is mono-N- or di-N,N—($C_1$-$C_6$) alkylamino morpholino; piperidin-1-yl or pyrrolidin-1-yl, and the like.

Pharmaceutically acceptable esters of the present compounds include the following groups: (1) carboxylic acid esters obtained by esterification of the hydroxy group of a hydroxyl compound, in which the non-carbonyl moiety of the carboxylic acid portion of the ester grouping is selected from straight or branched chain alkyl (e.g., methyl, ethyl, n-propyl, isopropyl, t-butyl, sec-butyl or n-butyl), alkoxyalkyl (e.g., methoxymethyl), aralkyl (e.g., benzyl), aryloxyalkyl (for example, phenoxymethyl), aryl (e.g., phenyl optionally substituted with, for example, halogen, $C_{1-4}$alkyl, —O—($C_{1-4}$alkyl) or amino); (2) sulfonate esters, such as alkyl- or aralkylsulfonyl (for example, methanesulfonyl); (3) amino acid esters (e.g., L-valyl or L-isoleucyl); (4) phosphonate esters and (5) mono-, di- or triphosphate esters. The phosphate esters may be further esterified by, for example, a $C_{1-20}$ alcohol or reactive derivative thereof, or by a 2,3-di ($C_{6-24}$)acyl glycerol.

One or more compounds of the invention may exist in unsolvated as well as solvated forms with pharmaceutically acceptable solvents such as water, ethanol, and the like, and it is intended that the invention embrace both solvated and unsolvated forms. "Solvate" means a physical association of a compound of this invention with one or more solvent molecules. This physical association involves varying degrees of ionic and covalent bonding, including hydrogen bonding. In certain instances the solvate will be capable of isolation, for example when one or more solvent molecules are incorporated in the crystal lattice of the crystalline solid. "Solvate" encompasses both solution-phase and isolatable solvates. Non-limiting examples of solvates include ethanolates, methanolates, and the like. A "hydrate" is a solvate wherein the solvent molecule is water.

One or more compounds of the invention may optionally be converted to a solvate. Preparation of solvates is generally known. Thus, for example, M. Caira et al, *J. Pharmaceutical Sci.*, 93(3), 601-611 (2004) describe the preparation of the solvates of the antifungal fluconazole in ethyl acetate as well as from water. Similar preparations of solvates, hemisolvate, hydrates and the like are described by E. C. van Tonder et al, *AAPS PharmSci Techours.*, 5(1), article 12 (2004); and A. L. Bingham et al, Chem. Commun., 603-604 (2001). A typical, non-limiting, process involves dissolving the inventive compound in desired amounts of the desired solvent (organic or water or mixtures thereof) at a higher than room temperature, and cooling the solution at a rate sufficient to form crystals which are then isolated by standard methods. Analytical techniques such as, for example IR spectroscopy, show the presence of the solvent (or water) in the crystals as a solvate (or hydrate).

The Bicyclic Heterocycle Compounds can form salts which are also within the scope of this invention. The term "salt(s)", as employed herein, denotes acidic salts formed with inorganic and/or organic acids, as well as basic salts formed with inorganic and/or organic bases. In addition, when an Bicyclic Heterocycle Compound contains both a basic moiety, such as, but not limited to a pyridine or imidazole, and an acidic moiety, such as, but not limited to a carboxylic acid, zwitterions ("inner salts") may be formed and are included within the term "salt(s)" as used herein. In one embodiment, the salt is a pharmaceutically acceptable (i.e., non-toxic, physiologically acceptable) salt. In another embodiment, the salt is other than a pharmaceutically acceptable salt. Salts of the Compounds of Formula (I) may be formed, for example, by reacting an Bicyclic Heterocycle Compound with an amount of acid or base, such as an equivalent amount, in a medium such as one in which the salt precipitates or in an aqueous medium followed by lyophilization.

Exemplary acid addition salts include acetates, ascorbates, benzoates, benzenesulfonates, bisulfates, borates, butyrates, citrates, camphorates, camphorsulfonates, fumarates, hydrochlorides, hydrobromides, hydroiodides, lactates, maleates, methanesulfonates, naphthalenesulfonates, nitrates, oxalates, phosphates, propionates, salicylates, succinates, sulfates, tartarates, thiocyanates, toluenesulfonates (also known as tosylates), and the like. Additionally, acids which are generally considered suitable for the formation of pharmaceutically useful salts from basic pharmaceutical compounds are discussed, for example, by P. Stahl et al, Camille G. (eds.) *Handbook of Pharmaceutical Salts. Properties, Selection and Use*. (2002) Zurich: Wiley-VCH; S. Berge et al, *Journal of Pharmaceutical Sciences* (1977) 66(1) 1-19; P. Gould, *International J. of Pharmaceutics* (1986) 33 201-217; Anderson et al, *The Practice of Medicinal Chemistry* (1996), Academic Press, New York; and in The Orange Book (Food & Drug Administration, Washington, D.C. on their website). These disclosures are incorporated herein by reference thereto.

Exemplary basic salts include ammonium salts, alkali metal salts such as sodium, lithium, and potassium salts, alkaline earth metal salts such as calcium and magnesium salts, salts with organic bases (for example, organic amines) such as dicyclohexylamine, t-butyl amine, choline, and salts with amino acids such as arginine, lysine and the like. Basic nitrogen-containing groups may be quarternized with agents such as lower alkyl halides (e.g., methyl, ethyl, and butyl chlorides, bromides and iodides), dialkyl sulfates (e.g., dimethyl, diethyl, and dibutyl sulfates), long chain halides (e.g., decyl, lauryl, and stearyl chlorides, bromides and iodides), aralkyl halides (e.g., benzyl and phenethyl bromides), and others.

All such acid salts and base salts are intended to be pharmaceutically acceptable salts within the scope of the invention and all acid and base salts are considered equivalent to the free forms of the corresponding compounds for purposes of the invention.

Diastereomeric mixtures can be separated into their individual diastereomers on the basis of their physical chemical differences by methods well-known to those skilled in the art, such as, for example, by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereomers to the corresponding pure enantiomers. Sterochemically pure compounds may also be prepared by using chiral starting materials or by employing salt resolution techniques. Also, some of the Bicyclic Heterocycle Compounds may be atropisomers (e.g., substituted biaryls), and are considered as part of this invention. Enantiomers can also be directly separated using chiral chromatographic techniques.

It is also possible that the Bicyclic Heterocycle Compounds may exist in different tautomeric forms, and all such forms are embraced within the scope of the invention. For example, all keto-enol and imine-enamine forms of the compounds are included in the invention.

All stereoisomers (for example, geometric isomers, optical isomers and the like) of the present compounds (including those of the salts, solvates, hydrates, esters and prodrugs of the compounds as well as the salts, solvates and esters of the prodrugs), such as those which may exist due to asymmetric carbons on various substituents, including enantiomeric forms (which may exist even in the absence of asymmetric carbons), rotameric forms, atropisomers, and diastereomeric forms, are contemplated within the scope of this invention. If an Bicyclic Heterocycle Compound incorporates a double bond or a fused ring, both the cis- and trans-forms, as well as mixtures, are embraced within the scope of the invention.

Individual stereoisomers of the compounds of the invention may, for example, be substantially free of other isomers, or may be admixed, for example, as racemates or with all other, or other selected, stereoisomers. The chiral centers of the present invention can have the S or R configuration as defined by the IUPAC 1974 Recommendations. The use of the terms "salt", "solvate", "ester", "prodrug" and the like, is intended to apply equally to the salt, solvate, ester and prodrug of enantiomers, stereoisomers, rotamers, tautomers, positional isomers, racemates or prodrugs of the inventive compounds.

In the Compounds of Formula (I), the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of generic Formula I. For example, different isotopic forms of hydrogen (H) include protium ($^1$H), and deuterium ($^2$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched Compounds of Formula (I) can be prepared without undue experimentation by conventional techniques well known to those skilled in the art or by processes analogous to those described in the Schemes and Examples herein using appropriate isotopically-enriched reagents and/or intermediates. In one embodiment, a Compound of Formula (I) has one or more of its hydrogen atoms replaced with deuterium.

Polymorphic forms of the Bicyclic Heterocycle Compounds, and of the salts, solvates, hydrates, esters and prodrugs of the Bicyclic Heterocycle Compounds, are intended to be included in the present invention.

The following abbreviations are used below and have the following meanings:

| Ac | acetyl |
| Ar | aryl |
| Bn | benzyl |
| Boc or BOC | tert-butoxycarbonyl |
| Bu | butyl |
| CBz | carboxybenzyl |
| DCM | dichloromethane |
| DMA | N,N-dimethylacetamide |
| DMAP | 4-(dimethylamino)pyridine |
| DMF | N,N-dimethyl formamide |
| Dess-Martin periodinane (DMP) | 1,1,1-Tris(acetyloxy)-1,1-dihydro-1,2-benziodoxol-3-(1H)-one |
| DMSO | dimethylsulfoxide |
| dppf | 1,1'-bis(diphenylphosphino)ferrocene |
| EDC | N-(3-dimethylaminopropyl)-N'-ethylcarbodiimide hydrochloride |
| ESI | electrospray ionization |
| Et | ethyl |
| HOAt | 1-hydroxy-7-azabenzotriazole |
| HPLC | high performance liquid chromatography |
| i-Pr | isopropyl |
| LCMS | liquid chromatography-mass spectrometry |
| Me | methyl |
| MP | macroporous polystyrene |
| Ms | methanesulfonyl |
| MTBE | methyl tert-butyl ether |
| n-BuLi | n-butyllithium |
| NMP | 1-methyl-2-pyrrolidinone |
| NMR | nuclear magnetic resonance |
| OAc | acetate |
| PBS | phosphate-buffered saline |
| Pd/C | palladium on carbon |
| Ph | phenyl |
| p-Ts | 4-toluenesulfonyl |
| Py | pyridyl |
| SEM | 2-trimethylsilylethoxymethyl |
| SEMCl | 2-trimethylsilylethoxymethyl chloride |
| SFC | supercritical fluid chromatography |
| TBAF | n-tetrabutylammonium fluoride |
| TBAI | n-tetrabutylammonium iodide |
| TBS | tert-butyldimethylsilyl |
| TBSCl | tert-butyldimethylsilyl chloride |
| t-Bu | tert-butyl |
| TEA | triethylamine |
| TFA | trifluoroacetic acid |
| Tf | trifluoromethanesulfonyl |
| THF | tetrahydrofuran |
| TMSD | trimethylsilyldiazomethane |

The Compounds of Formula (I)

The present invention provides Bicyclic Heterocycle Compounds of Formula (I):

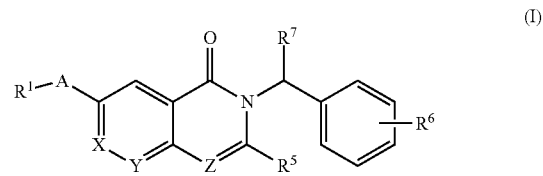

(I)

and pharmaceutically acceptable salts thereof, wherein A, X, Y, Z, $R^1$ $R^5$, $R^6$, and $R^7$ are defined above for the Compounds of Formula (I).

In one embodiment, for the compounds of formula (I):

A is a bond or —O—;

X is —N— or —C($R^2$)—;

Y is —N— or —C($R^3$)—, such that only one of X and Y can be —N—;

Z is —N— or —C($R^4$)—;

$R^1$ is 5 to 7-membered monocyclic heterocycloalkyl or 9 or 10-membered bicyclic heterocycloalkyl, wherein said 5 to 7-membered monocyclic heterocycloalkyl group, and said 9 or 10-membered bicyclic heterocycloalkyl group can be optionally substituted with up to three $R^A$ groups, which can be the same or different, and wherein said 5 to 7-membered monocyclic heterocycloalkyl group, and said 9 or 10-membered bicyclic heterocycloalkyl group can optionally have a ring carbon atom functionalized as a carbonyl group;

$R^2$ is selected from H, $C_1$-$C_6$ alkyl, —O—($C_1$-$C_6$ alkyl), $C_1$-$C_6$ hydroxyalkyl, $C_1$-$C_6$ aminoalkyl, —CN, —C(O)O—($C_1$-$C_6$ alkyl), $C_3$-$C_7$ cycloalkyl, $C_4$-$C_7$ heterocycloalkyl, $C_6$-$C_{10}$ aryl, 5 to 7-membered monocyclic heteroaryl, and 9 or 10-membered bicyclic heteroaryl, wherein said $C_3$-$C_7$ cycloalkyl group, said $C_6$-$C_{10}$ aryl group, said 5 to 7-membered monocyclic heteroaryl group, and said 9 or 10-membered bicyclic heteroaryl group can be optionally substituted with up to three $R^B$ groups, which can be the same or different, or where $R^2$ and $R^3$, together with atoms to which they are attached, are joined to form a 5-membered heteroaryl group;

$R^3$ is selected from H, $C_1$-$C_6$ alkyl, $C_1$-$C_6$ hydroxyalkyl, 5 to 7-membered monocyclic heteroaryl, —O-(5 to 7-membered monocyclic heteroaryl), $C_3$-$C_7$ cycloalkyl, wherein said $C_3$-$C_7$ cycloalkyl group, and any of said 5 to 7-membered monocyclic heteroaryl groups, can be optionally substituted with up to three $R^C$ groups, which can be the same or different; $R^4$ is selected from H, $C_1$-$C_6$ alkyl, $C_1$-$C_6$ hydroxyalkyl, and $C_3$-$C_7$ cycloalkyl;

$R^5$ is selected from H, $C_1$-$C_6$ alkyl, —$OR^7$, and $C_3$-$C_7$ cycloalkyl, wherein said $C_1$-$C_6$ alkyl can be optionally substituted with $C_3$-$C_7$ cycloalkyl;

$R^6$ represents up to 3 phenyl ring substituents, which can be the same or different, and are each independently selected from $C_1$-$C_6$ haloalkyl, —CN, —$NO_2$, —$OR^7$, and halo;

each occurrence of $R^7$ is independently selected from H, $C_1$-$C_6$ alkyl, and $C_3$-$C_7$ cycloalkyl;

each occurrence of $R^A$ is independently selected from $C_1$-$C_6$ alkyl, $C_1$-$C_6$ haloalkyl, $C_1$-$C_6$ alkoxyalkyl, 5 to 7-membered monocyclic heterocycloalkyl, —C(O)—($C_1$-$C_6$ alkyl), and halo, wherein said 5 to 7-membered monocyclic heterocycloalkyl group can be optionally substituted with up to 3 substituents, which can be the same or different, and are each independently selected from $C_1$-$C_6$ alkyl, 5 to 7-membered monocyclic heterocycloalkyl, and halo;

each occurrence of $R^B$ is independently selected from $C_1$-$C_6$ alkyl, —$OR^7$, $C_1$-$C_6$ haloalkyl, 5 to 7-membered monocyclic heterocycloalkyl, and —$NH_2$; and each occurrence of $R^C$ is independently selected from $C_1$-$C_6$ alkyl, —$OR^7$, $C_1$-$C_6$ haloalkyl, and 5 to 7-membered monocyclic heterocycloalkyl.

In one embodiment, A is a bond.

In another embodiment, A is O.

In one embodiment, —$R^1$ is selected from:

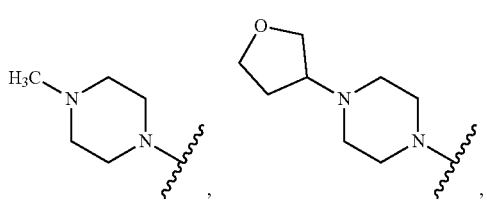

,

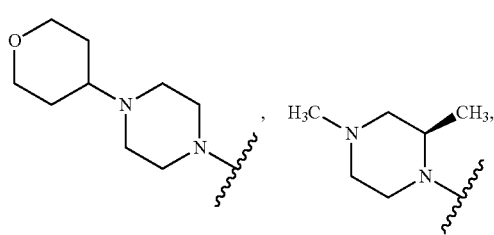

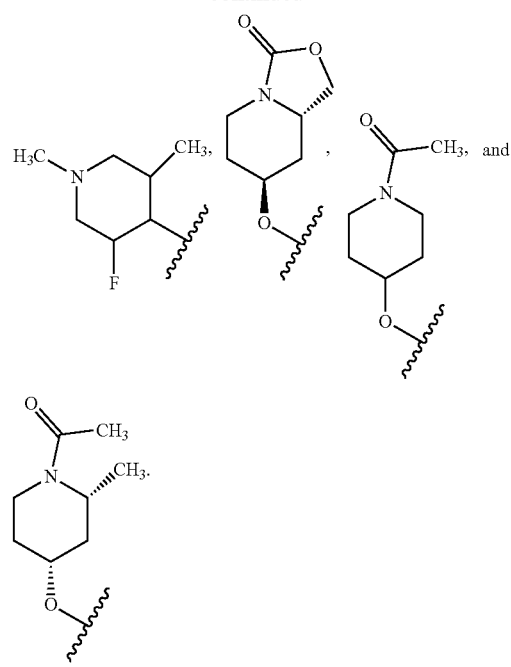

In one embodiment, —$R^1$ is:

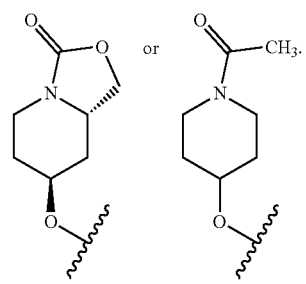 [SMILES: *O[C@H]1CCN2C(=O)OC[C@@H]2C1 ; *OC1CCN(C(C)=O)CC1]

In another embodiment, -A-$R^1$ is:

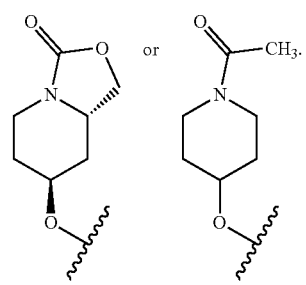 [SMILES: *O[C@H]1CCN2C(=O)OC[C@@H]2C1 ; *OC1CCN(C(C)=O)CC1]

In one embodiment, X is N.

In another embodiment, X is —$C(R^2)$—.

In another embodiment, X is —$C(R^2)$— and $R^2$ is selected from H, —CN, cyclobutyl, pyrazolyl, pyridyl, trizolyl, oxazolyl, —$CH_2C(CH_3)_2NH_2$, —$CH_2C(CH_3)_2OH$, —$CH_2CH(CH_3)OH$,

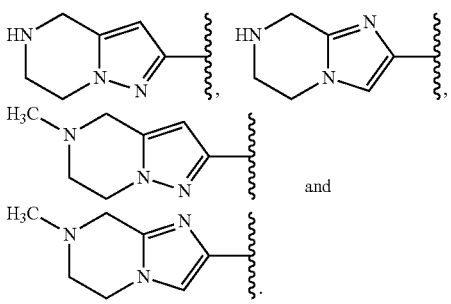

wherein said pyrazolyl group, said triazolyl group, said pyridyl group, and said cyclobutyl group can be optionally substituted with up to 2 groups, which are independently selected from —CHF$_2$, —CF$_3$, piperdinyl, —OCH$_3$, —OH, and methyl.

In one embodiment, Y is N.

In another embodiment, Y is —C(R$^3$)—.

In another embodiment, Y is —C(R$^3$)— and R$^3$ is selected from H, —O-pyrazolyl, oxazolyl, —CH$_2$OH, and —CH$_2$C(CH$_3$)$_2$OH, —CH$_2$CH(CH$_3$)OH.

In one embodiment, Z is N.

In another embodiment, Z is —C(R$^4$)—.

In another embodiment, Z is —C(R$^4$)— and R$^4$ is selected from H, —CH$_2$OH, and cyclopropyl.

In one embodiment, none of X, Y and Z is N.

In another embodiment, X is —CH—.

In another embodiment, Y is —CH—.

In still another embodiment, Z is —CH—.

In one embodiment, X is —C(R$^2$)—, and Y is —C(R$^3$)—.

In another embodiment, X and Y are each —CH—.

In another embodiment, X and Z are each N.

In one embodiment, X is —C(R$^2$)—, and Y and Z are each N.

In another embodiment, X is —C(R$^2$)—, and Y and Z are each N, wherein R$^2$ is selected from H, —O-pyrazolyl, oxazolyl, —CH$_2$OH, and —CH$_2$C(CH$_3$)$_2$OH, —CH$_2$CH(CH$_3$)OH.

In one embodiment, Y is —C(R$^3$)—, and X and Z are each N.

In another embodiment, Y is —C(R$^3$)—, and X and Z are each N, wherein R$^3$ is selected from H, —CH$_2$OH, and cyclopropyl.

In one embodiment, R$^5$ is selected from H, —OH, —OCH$_3$, methyl, ethyl, and cyclopropyl.

In one embodiment, R$^6$ is selected from halo and —CN.

In another embodiment, R$^6$ is Cl.

In another embodiment, R$^6$ is F.

In another embodiment, R$^6$ is CN.

In still another embodiment, R$^6$ represents one substituent, selected from 4-Cl and 4-CN.

In another embodiment, R$^6$ represents two substituent, selected from Cl, F, and —CN.

In another embodiment, R$^6$ is 4-Cl.

In still another embodiment, R$^6$ is 4-CN.

In one embodiment, R$^7$ is H.

In another embodiment, R$^7$ is H or C$_1$-C$_6$ alkyl.

In another embodiment, R$^7$ is methyl.

It is understood that the present invention includes any combination of two or more of the above embodiments.

Other embodiments of the present invention include the following:

(a) A pharmaceutical composition comprising an effective amount of a Compound of Formula (I) or a pharmaceutically acceptable salt thereof, and a pharmaceutically acceptable carrier.

(b) The pharmaceutical composition of (a), further comprising a second therapeutic agent selected from the group consisting of anti-herpes agents and immunomodulators.

(c) The pharmaceutical composition of (b), wherein the anti-herpes agent is selected from the group consisting of herpesvirus polymerase inhibitors, and CMV terminase inhibitors.

(d) A pharmaceutical combination that is (i) a Compound of Formula (I), and (ii) a second therapeutic agent selected from the group consisting of anti-herpes agents and immunomodulators; wherein the Compound of Formula (I), and the second therapeutic agent are each employed in an amount that renders the combination effective for inhibiting herpesvirus replication, or for treating herpesvirus infection and/or reducing the likelihood or severity of symptoms of herpesvirus infection.

(e) The combination of (d), wherein the anti-herpes agent is selected from the group consisting of herpesvirus polymerase inhibitors, and CMV terminase inhibitors.

(f) A method of inhibiting herpesvirus replication in a subject in need thereof which comprises administering to the subject an effective amount of a Compound of Formula (I).

(g) A method of treating herpesvirus infection and/or reducing the likelihood or severity of symptoms of herpesvirus infection in a subject in need thereof which comprises administering to the subject an effective amount of a Compound of Formula (I).

(h) The method of (g), wherein the Compound of Formula (I) is administered in combination with an effective amount of at least one second therapeutic agent selected from the group consisting of anti-herpes agents and immunomodulators.

(i) The method of (h), wherein the anti-herpes agent is selected from the group consisting of herpesvirus polymerase inhibitors, and CMV terminase inhibitors.

j) A method of inhibiting herpesvirus replication in a subject in need thereof which comprises administering to the subject the pharmaceutical composition of (a), (b) or (c) or the combination of (d) or (e).

(k) A method of treating herpesvirus infection and/or reducing the likelihood or severity of symptoms of herpesvirus infection in a subject in need thereof which comprises administering to the subject the pharmaceutical composition of (a), (b) or (c) or the combination of (d) or (e). The present invention also includes a compound of the present invention for use (i) in, (ii) as a medicament for, or (iii) in the preparation of a medicament for: (a) medicine; (b) inhibiting herpesvirus replication or (c) treating herpesvirus infection and/or reducing the likelihood or severity of symptoms of herpesvirus infection. In these uses, the compounds of the present invention can optionally be employed in combination with one or more second therapeutic agents selected from anti-herpes agents, anti-infective agents, and immunomodulators.

Additional embodiments of the invention include the pharmaceutical compositions, combinations and methods set forth in (a)-(k) above and the uses set forth in the preceding paragraph, wherein the compound of the present invention employed therein is a compound of one of the embodiments, aspects, classes, sub-classes, or features of the compounds described above. In all of these embodiments, the compound may optionally be used in the form of a pharmaceutically acceptable salt or hydrate as appropriate.

It is further to be understood that the embodiments of compositions and methods provided as (a) through (k) above are understood to include all embodiments of the compounds, including such embodiments as result from combinations of embodiments.

Non-limiting examples of the Compounds of Formula (I) include compounds 1-157, as set forth in the Examples below, and pharmaceutically acceptable salts thereof.

Methods for Making the Compounds of Formula (I)

The Compounds of Formula (I) may be prepared from known or readily prepared starting materials, following methods known to one skilled in the art of organic synthesis. Methods useful for making the Compounds of Formula (I) are set forth in the Examples below Alternative synthetic pathways and analogous structures will be apparent to those skilled in the art of organic synthesis.

One skilled in the art of organic synthesis will recognize that the synthesis of multicyclic heterocycle cores contained in Compounds of Formula (I) may require protection of certain functional groups (i.e., derivatization for the purpose of chemical compatibility with a particular reaction condition). Suitable protecting groups for the various functional groups of these Compounds and methods for their installation and removal are well known in the art of organic chemistry. A summary of many of these methods can be found in Greene et al., *Protective Groups in Organic Synthesis*, Wiley-Interscience, New York, (1999).

One skilled in the art of organic synthesis will also recognize that one route for the synthesis of the multicyclic heterocycle cores of the Compounds of Formula (I) may be more desirable depending on the choice of appendage substituents. Additionally, one skilled in the art will recognize that in some cases the order of reactions may differ from that presented herein to avoid functional group incompatibilities and thus adjust the synthetic route accordingly.

The preparation of multicyclic intermediates useful for making the multicyclic heterocycle cores of the Compounds of Formula (I) have been described in the literature and in compendia such as "Comprehensive Heterocyclic Chemistry" editions I, II and III, published by Elsevier and edited by A. R. Katritzky & R. J K Taylor. Manipulation of the required substitution patterns have also been described in the available chemical literature as summarized in compendia such as "Comprehensive Organic Chemistry" published by Elsevier and edited by D H R. Barton and W. D. Ollis; "Comprehensive Organic Functional Group Transformations" edited by edited by A. R. Katritzky & R. J K Taylor and "Comprehensive Organic Transformation" published by Wily-CVH and edited by R. C. Larock.

The starting materials used and the intermediates prepared using the methods set forth in the Examples below may be isolated and purified if desired using conventional techniques, including but not limited to filtration, distillation, crystallization, chromatography and alike. Such materials can be characterized using conventional means, including physical constants and spectral data.

One skilled in the art will be aware of standard formulation techniques as set forth in the open literature as well as in textbooks such as Zheng, "Formulation and Analytical Development for Low-dose Oral Drug Products," Wiley, 2009, ISBN.

EXAMPLES

General Methods

Solvents, reagents, and intermediates that are commercially available were generally used as received. Reagents and intermediates that are not commercially available were prepared in the manner as described below or per literature references. $^1$H NMR spectra are reported as ppm downfield from Me$_4$Si with number of protons, multiplicities, and coupling constants in Hertz indicated parenthetically. Where LC/MS data are presented, observed parent ion are given. Flash column chromatography was performed using pre-packed normal phase silica. Unless otherwise indicated, column chromatography was generally performed using a gradient elution of hexanes/ethyl acetate, from 100% hexanes to 100% ethyl acetate.

Synthesis of Intermediates

Preparation of Intermediate Compound Int-1

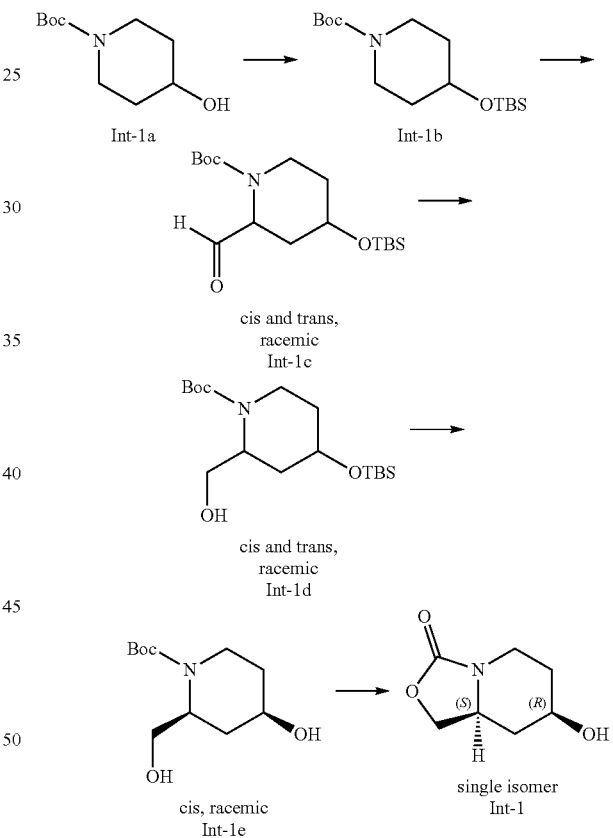

Step A—Synthesis of Compound Int-1b

A 5-L, 3-necked round-bottom flask (under an atmosphere of nitrogen) was charged with tert-butyl 4-hydroxypiperidine-1-carboxylate (Int-1a, 120 g, 596 mmol), and imidazole (81.2 g, 1.19 mmol) in dichloromethane (2.5 L). To the resulting solution was added tert-butyldimethylsilyl chloride (116.7 g, 0.77 mmol) in several batches. The resulting reaction was allowed to stir at room temperature for 3 hours, then the reaction mixture was cooled to 10° C., and then saturated aqueous sodium bicarbonate (3 L) was added. The resulting solution was extracted with dichloromethane (1 L), dried over sodium sulfate, filtered, and the filtrate was concentrated in vacuo. The residue obtained was purified using silica gel column chromatography, eluting with ethyl acetate:petroleum ether—10:90 to provide compound Int-1b, which was used without further purification.

Step B Synthesis of Compound Int-1c

A 10-L, 4-necked round-bottom flask (purged and maintained with an inert atmosphere of nitrogen) was charged with compound Int-1b (170 g, 539 mmol), tetramethylethylenediamine (137.7 g, 1.18 mmol), and methyl tert-butyl ether (4.2 L). The resulting solution was cooled to −78° C., and a solution of sec-butyllithium in tetrahydrofuran (1.3 M, 748 mL) was added dropwise. The resulting reaction was heated to −40° C., and allowed to stir at this temperature for 1 hour. The resulting reaction was cooled again to −78° C., and N,N-dimethylformamide (373 mL, 5.0 mol) was added dropwise. The resulting reaction was heated to −40° C., and allowed to stir at this temperature for 1.5 hours. Saturated aqueous ammonium chloride (2 L) was added, and the resulting reaction was extracted with methyl tert-butyl ether (2 L), dried over sodium sulfate and filtered. The filtrate was concentrated in vacuo to provide compound Int-1c, which was used without further purification.

Step C synthesis of Compound Int-1d

A 5-L, 4-necked round-bottom flask (purged and maintained with an inert atmosphere of nitrogen) at 0° C. was charged with compound Int-1c (100 g, 0.29 mmol) in methanol (2 L). To the resulting solution was added sodium borohydride (22 g, 0.60 mmol) in several batches, and the resulting reaction was allowed to stir for 2 hours at 0° C. Water (5 L) was slowly added, and the resulting reaction was extracted with ethyl acetate (3×3 L). The combined organic extracts were dried over sodium sulfate, filtered, and concentrated in vacuo to provide compound Int-1d, which was used without further purification.

Step D—Synthesis of Compound Int-1e

A 5-L, 3-necked round-bottom flask (under an atmosphere of nitrogen) was charged with compound Int-1d (100 g, 0.29 mmol), and a solution of tetrabutylammonium fluoride in tetrahydrofuran (1.0 M, 2.7 L, 2.7 mmol). The resulting reaction was allowed to stir for 3 hours at room temperature. The resulting reaction was then concentrated in vacuo, and the residue obtained was purified using silica gel column chromatography, eluting with ethyl acetate:petroleum ether—10:90 to provide compound Int-1e.

Step E—Synthesis of Compound Int-1

A 3-L, 3-necked round-bottom flask (under an atmosphere of nitrogen), was charged with compound Int-1e (100 g, 432.36 mmol, 1 equiv.), and potassium 2-methylpropan-2-olate (29.1 g, 260 mol, 0.60 equiv.) in iPrOH (2 L). The resulting reaction was allowed to stir for 3 hours at 70° C., then the reaction mixture was cooled to 0° C. using an ice/salt bath. The cooled solution was adjusted to pH 6 using HCl in MeOH (4 M), then concentrated in vacuo. The resulting solution was diluted with 1 L of dichloromethane, filtered, and concentrated in vacuo. The residue obtained was purified using silica gel column chromatography, eluting with ethyl acetate:petroleum ether—10:90. The racemic material obtained was resolved by chiral supercritical fluid chromatography, using a Chiralpak IG column and eluting with 30% MeOH in $CO_2$ to provide compound Int-1. LC-MS: (ES, m/z): $[M+1]^+$=158. H-NMR: (400 MHz, $CDCl_3$, ppm): δ 4.47 (1H, t), 4.00-3.89 (2H, m), 3.83-3.72 (2H, m), 2.97-2.85 (1H, m), 2.17-2.10 (1H, m), 2.02-1.95 (1H, m), 1.51-1.31 (2H, m).

Preparation of Intermediate Compound Int-2

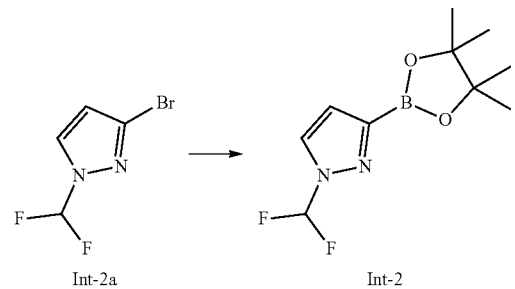 [SMILES: FC(F)n1ccc(Br)n1 ; CC1(C)OB(c2ccn(C(F)F)n2)OC1(C)C]

Step A—Synthesis of Compound Int-2

To a mixture of 1-(difluoromethyl)-3-iodo-1H-pyrazole (Int-2a, 50 mg, 0.205 mmol), potassium acetate (40.2 mg, 0.410 mmol), and 4,4,4',4',5,5,5',5'-octamethyl-2,2'-bi(1,3,2-dioxaborolane) (78 mg, 0.307 mmol) in dimethylsulfoxide (0.5 mL) at room temperature, was added [1,1'-bis(diphenylphosphino)ferrocene]dichloropalladium(II) (15.0 mg, 0.020 mmol). The resulting reaction was put under argon atmosphere, heated to 80° C., and allowed to stir at this temperature for 15 hours. The reaction was quenched with water (20 mL), and extracted with ethyl acetate (2×20 mL). The combined organic extracts were washed with saturated aqueous sodium chloride (10 mL), dried over sodium sulfate, and concentrated in vacuo to provide compound Int-2, which was used without further purification. MS: m/z=245.2 [M+H].

Preparation of Intermediate Compound Int-3

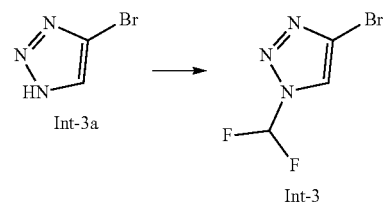 [SMILES: Brc1c[nH]nn1 ; FC(F)n1cc(Br)nn1]

Step A—Synthesis of Compound Int-3

To a mixture of 4-bromo-1H-1,2,3-triazole (Int-3a, 1 g, 6.76 mmol), and potassium fluoride (0.785 g, 13.5 mmol) in acetonitrile (15 mL) was added diethyl (bromodifluoromethyl)phosphonate (1.99 g, 7.43 mmol). The resulting reaction was allowed to stir for 15 hours at room temperature. The reaction mixture was then filtered, and concentrated in vacuo. The residue obtained was purified using silica gel chromatography, eluting with a gradient of diethyl ether:petroleum ether—0:100 to 75:25 to provide compound Int-3. MS: m/z=198.0, 200.0 [M+H].

Example 1

Preparation of Compound 1

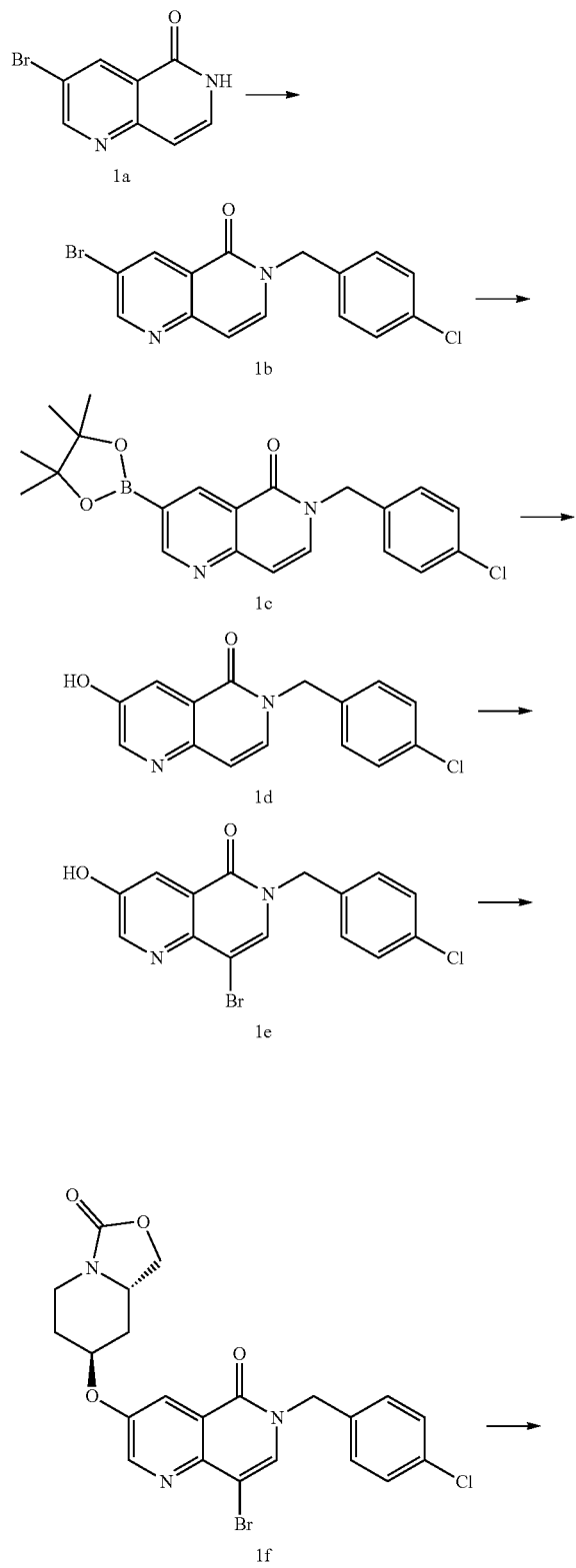

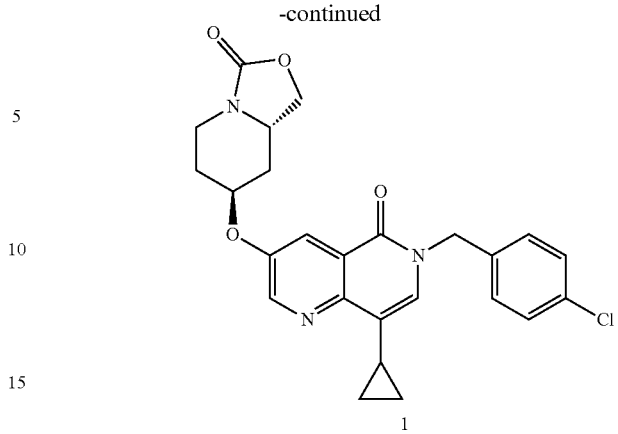

Step A—Synthesis of Compound 1b

To a mixture of 3-bromo-7,8-dihydro-1,6-naphthyridin-5(6H)-one (1a, 500 mg, 2.20 mmol) in N,N-dimethylformamide (10 mL) at 0° C. under an atmosphere of dinitrogen was added sodium hydride (60% in mineral oil) (106 mg, 2.64 mmol). The resulting solution was allowed to stir for 30 minutes, then 1-(bromomethyl)-4-chlorobenzene (588 mg, 2.86 mmol) was added, and the resulting reaction was heated to room temperature and allowed to stir for an additional 1.5 hours. Saturated aqueous ammonium chloride (10 mL) was added to the reaction mixture, and the resulting solution was extracted with ethyl acetate (3×20 mL). The combined organic extracts were washed with saturated aqueous sodium chloride (40 mL), dried over sodium sulfate, and concentrated in vacuo. The residue obtained was purified using silica gel column chromatography, eluting with a gradient of ethyl acetate:petroleum ether—0:1 to 2:1 to provide compound 1b. MS: m/z=351.0 [M+H].

Step B—Synthesis of compound 1c

To a mixture of compound 1b (300 mg, 0.858 mmol) in 1,4-dioxane (6 mL) were added 4,4,4',4',5,5,5',5'-octamethyl-2,2'-bi(1,3,2-dioxaborolane) (436 mg, 1.72 mmol), 1,1'-bis(diphenylphosphino)ferrocene-palladium(II)dichloride dichloromethane complex (140 mg, 0.172 mmol), and potassium acetate (337 mg, 3.43 mmol). The resulting reaction was allowed to stir for 16 hours at 100° C. under an atmosphere of dinitrogen. The resulting reaction was diluted with water (20 mL), and extracted with ethyl acetate (3×60 mL). The combined organic extracts were washed with saturated aqueous sodium chloride (50 mL), dried over sodium sulfate, and concentrated in vacuo to provide compound 1c. MS: m/z=315.0 [M+H—$C_6H_{10}$]$^+$.

Step C—Synthesis of Compound 1d

To a mixture of compound 1c (260 mg, 0.827 mmol) in tetrahydrofuran (15 mL) was added hydrogen peroxide (5 mL, 0.827 mmol) at 0° C. The resulting reaction was allowed to warm to room temperature and then stir for 4 hours. The resulting reaction was diluted with water (10 mL), and extracted with ethyl acetate (3×40 mL). The combined organic extracts were washed with saturated aqueous sodium chloride (50 mL), dried over sodium sulfate, and concentrated in vacuo. The residue obtained was purified using silica gel chromatography, eluting with a gradient of ethyl acetate:petroleum ether—0:1 to 1:5 to provide compound 1d. MS: m/z=287.1 [M+H].

Step D—Synthesis of Compound 1e

To a mixture of compound 1d (290 mg, 1.011 mmol) in trifluoroacetic acid (6 mL) at 0° C. was added N-bromosuccinimide (180 mg, 1.011 mmol). The resulting reaction was allowed to stir for 6 hours. Water (10 mL) was added, and the resulting solution was extracted with ethyl acetate (3×15 mL). The combined organic extracts were washed with saturated aqueous sodium chloride (15 mL), dried over sodium sulfate, and concentrated in vacuo. The residue obtained was purified using silica gel column chromatography, eluting with a gradient of ethyl acetate:petroleum ether—1:6 to 1:1 to provide compound 1e. MS: m/z=365.1, 367.1 [M+H].

Step E—Synthesis of Compound 1f

To a mixture of triphenylphosphine (517 mg, 1.969 mmol) in tetrahydrofuran (8 mL) at 0° C. under an atmosphere of dinitrogen was added di-tert-butyl azodicarboxylate (453 mg, 1.969 mmol). The resulting reaction was allowed to stir for 20 minutes, then (7R,8aS)-7-hydroxytetrahydro-1H-oxazolo[3,4-a]pyridin-3(5H)-one (124 mg, 0.788 mmol), and compound 1e (240 mg, 0.656 mmol) were added. The resulting reaction was allowed to warm to room temperature and allowed to stir for 2 hours. Water (10 mL) was added, and the resulting mixture was extracted with ethyl acetate (3×15 mL). The combined organic extracts were washed with saturated aqueous sodium chloride (15 mL), dried over sodium sulfate, and concentrated in vacuo. The residue obtained was purified using silica gel column chromatography, eluting with a gradient of ethyl acetate: petroleum ether—15:85 to 1:1 to provide compound 1f. MS: m/z=504.1, 506.1 [M+H].

Step F—Synthesis of Compound 1

To a mixture of compound if (200 mg, 0.396 mmol) in toluene (4 mL), and water (0.1 mL) under an atmosphere of dinitrogen were added palladium (II) acetate (4.5 mg, 0.020 mmol), tricyclohexylphosphine (0.012 mL, 0.040 mmol), potassium phosphate (294 mg, 1.39 mmol), and cyclopropylboronic acid (51 mg, 0.59 mmol). The resulting reaction was heated to 140° C., and allowed to stir at this temperature for 20 minutes. The resulting reaction was cooled to room temperature, water (10 mL) was added, and the resulting solution was extracted with ethyl acetate (2×20 mL). The combined organic extracts were washed with saturated aqueous sodium chloride (20 mL), dried over sodium sulfate, and concentrated in vacuo. The residue obtained was purified using preparative HPLC, eluting with a gradient of acetonitrile:water (0.05% trifluoroacetic acid)—53:47 to provide compound 1. MS: m/z=466.3 [M+H]. $^1$H NMR (300 MHz, dimethyl sulfoxide-$d_6$, ppm) δ 8.83 (d, J=3.0 Hz, 1H), 8.03 (d, J=3.0 Hz, 1H), 7.43-7.33 (m, 5H), 5.16 (s, 2H), 5.13 (s, 1H), 4.37 (t, J=8.1 Hz, 1H), 4.07-4.00 (m, 1H), 3.91 (dd, J=5.7, 8.4 Hz, 1H), 3.59-3.54 (m, 1H), 3.22-3.17 (m, 1H), 2.32-2.15 (m, 2H), 1.99-1.94 (m, 1H), 1.78-1.65 (m, 2H), 0.92-0.85 (m, 2H), 0.68-0.63 (m, 2H).

Example 2

Preparation of Compound 2

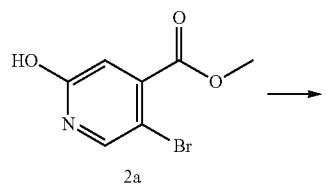

2a

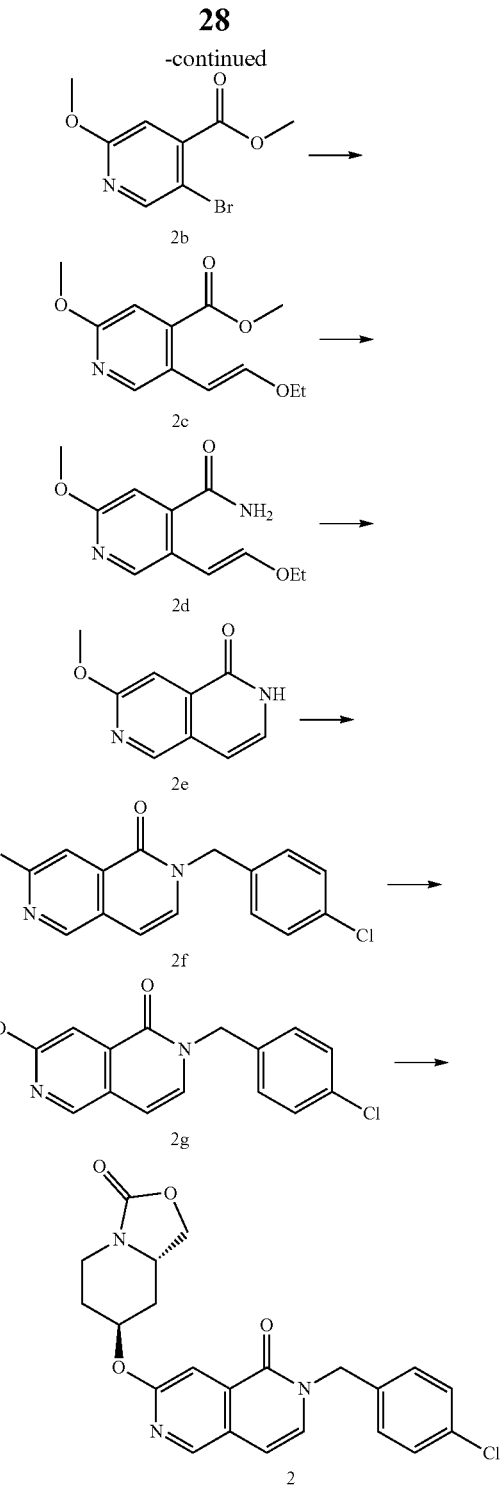

Step A—Synthesis of Compound 2b

To a mixture of methyl 5-bromo-2-hydroxyisonicotinate (2a, 30 g, 129 mmol), and iodomethane (27.5 g, 194 mmol) in toluene (400 mL) was added silver carbonate (46.3 g, 168 mmol). The resulting reaction was heated to 100° C., and allowed to stir at this temperature for 2 hours. The resulting reaction was cooled to room temperature, and water (300 mL) was added. The resulting solution was extracted with ethyl acetate (3×200 mL), and the combined organic extracts were washed with saturated aqueous sodium chloride (300 mL), dried over sodium sulfate, and concentrated in vacuo.

The residue obtained was purified using silica gel chromatography, eluting with a gradient of ethyl acetate:petroleum ether—0:100 to 20:80 to provide compound 2b. MS: m/z=246.1, 248.1 [M+H].

Step B—Synthesis of Compound 2c

To a mixture of sodium carbonate (10.3 g, 98 mmol), and (E)-2-(2-ethoxyvinyl)-4,4,5,5-tetramethyl-1,3,2-dioxaborolane (19.3 g, 98 mmol) in toluene (50 mL), ethanol (50 mL), and water (50 mL), under an atmosphere of dinitrogen, were added compound 2b (12 g, 48.8 mmol), and tetrakis(triphenylphosphine)palladium(0) (5.6 g, 4.88 mmol). The resulting reaction was heated to 70° C., and allowed to stir at this temperature for 5 hours. The resulting reaction was quenched with water (200 mL), and extracted with ethyl acetate (3×200 mL). The combined organic extracts were washed with saturated aqueous sodium chloride (2×200 mL), dried over sodium sulfate, and concentrated in vacuo. The residue obtained was purified using silica gel chromatography, eluting with a gradient of ethyl acetate:petroleum ether—0:100 to 20:80 to provide compound 2c. MS: m/z=238.1 [M+H].

Step C—Synthesis of Compound 2d

A mixture of compound 2c (10 g, 42.1 mmol), and ammonia (7 M in methanol) (150 mL, 1050 mmol) was allowed to stir for 2 days at 80° C. The resulting reaction was then quenched with water (200 mL), and extracted with ethyl acetate (3×200 mL). The combined organic extracts were washed with saturated aqueous sodium chloride (200 mL), dried over sodium sulfate, and concentrated in vacuo. The residue obtained was purified using silica gel chromatography, eluting with a gradient of ethyl acetate:petroleum ether—0:100 to 50:50 to provide compound 2d. MS: m/z=223.2 [M+H].

Step D—Synthesis of Compound 2e

To a mixture of 4-methylbenzenesulfonic acid hydrate (1.8 g, 9.45 mmol) in toluene (200 mL) was added compound 2d (10 g, 45.0 mmol). The resulting reaction was heated to 90° C., and allowed to stir for 3 hours. The resulting reaction was cooled to room temperature, water (200 mL) added, and the resulting solution was extracted with ethyl acetate (3×200 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate: petroleum ether—0:100 to 20:80 to provide compound 2e. MS: m/z=177.1 [M+H].

Step E—Synthesis of Compound 2f

To a mixture of compound 2e (1.5 g, 8.51 mmol), and 1-chloro-4-(chloromethyl)benzene (1.6 g, 10.2 mmol) in DMF (50 mL) was added potassium carbonate (4.7 g, 34 mmol). The resulting reaction was allowed to stir for 6 hours at room temperature. Water (100 mL) was added, and the reaction mixture was extracted with ethyl acetate (3×100 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate:petroleum ether—0:1 to 1:1 to provide compound 2f. MS: m/z=301.1 [M+H].

Step F—Synthesis of Compound 2g

A mixture of compound 2f (1 g, 3.33 mmol) in hydrobromic acid (48% in water) (10 mL) was allowed to stir for 8 hours at 80° C. under an atmosphere of dinitrogen. The resulting reaction was cooled, and diluted with water (100 mL), and the reaction mixture was extracted with ethyl acetate (3×100 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate:petroleum ether—0:100 to 50:50 to provide compound 2g. MS: m/z=287.0 [M+H].

Step G—Synthesis of Compound 2

To a mixture of triphenylphosphine (1.4 g, 5.23 mmol) in toluene (30 mL) at 0° C. under an atmosphere of dinitrogen was added di-tert-butyl diazene-1,2-dicarboxylate (1.2 g, 5.23 mmol). The resulting reaction was allowed to stir for 10 minutes Compound 2g (500 mg, 1.744 mmol), and (7R, 8aS)-7-hydroxytetrahydro-1H-oxazolo[3,4-a]pyridin-3 (5H)-one (329 mg, 2.09 mmol) were added, and the resulting reaction was allowed to warm to room temperature and allowed to stir for 3 hours. Water (80 mL) was added, and the resulting solution was extracted with ethyl acetate (3×100 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate:petroleum ether—0:100 to 50:50 to provide compound 2. MS: m/z=426.1 [M+H]. $^1$H NMR (400 MHz, dimethyl sulfoxide-$d_6$, ppm): δ 8.77 (s, 1H), 7.50-7.33 (m, 6H), 6.74 (d, J=7.2 Hz, 1H), 5.49 (s, 1H), 5.17 (s, 2H), 4.36 (t, J=8.0 Hz, 1H), 4.08-4.03 (m, 1H), 3.91-3.87 (m, 1H), 3.59-3.55 (m, 1H), 3.24-3.16 (m, 1H), 2.17-2.13 (m, 1H), 1.97-1.93 (m, 1H), 1.77-1.65 (m, 2H).

Example 3

Preparation of Compound 3

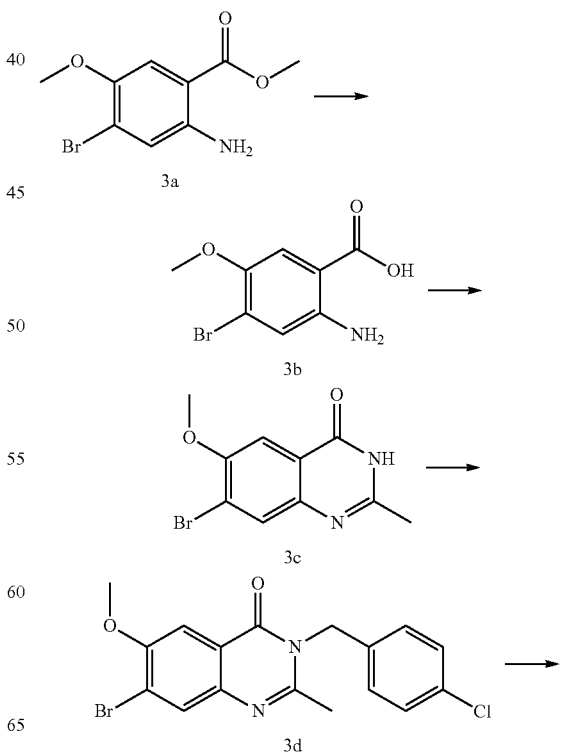

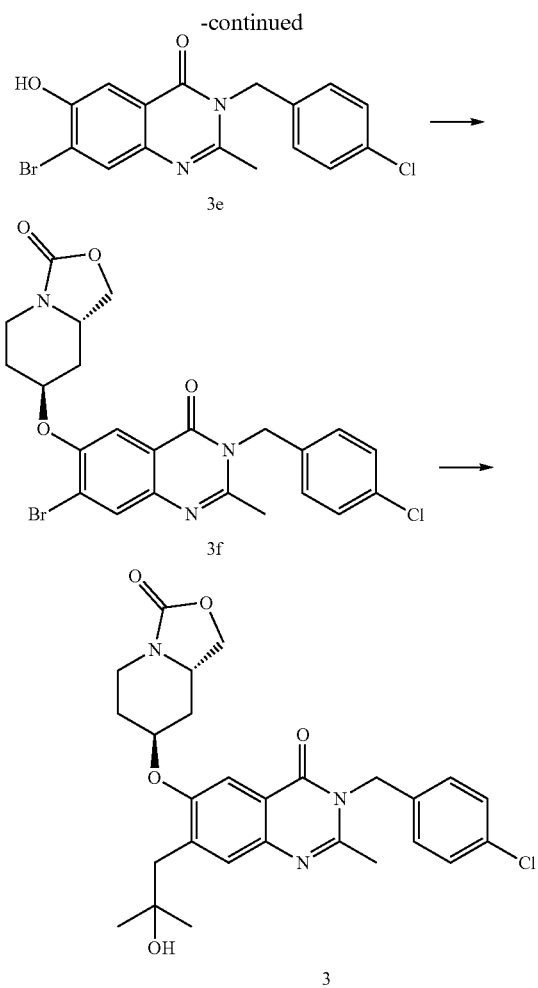

Step A—Synthesis of Compound 3b

To a mixture of methyl 2-amino-4-bromo-5-methoxybenzoate (3a, 1.00 g, 3.84 mmol) in tetrahydrofuran (3 mL), methanol (1 mL), and water (1 mL) was added sodium hydroxide (1.54 g, 38.4 mmol). The resulting reaction was allowed to stir for 16 hours. The resulting reaction was concentrated in vacuo, and diluted with water (5 mL). The resulting reaction was acidified with hydrochloric acid (1 M, 39 mL). The solid was collected by filtration and dried in vacuo to provide compound 3b, which was used without further purification. MS: m/z=246.1, 248.1 [M+H].

Step B—Synthesis of Compound 3c

A mixture of 2-amino-4-bromo-5-methoxybenzoic acid (900 mg, 3.66 mmol) in acetic anhydride (20 mL) was allowed to stir at 120° C. for 2 hours. The resulting reaction was concentrated in vacuo, and the residue obtained was diluted with ammonium hydroxide (20 mL). The resulting reaction was heated to 65° C., and allowed to stir for 2 hours. The solid was collected by filtration and dried in vacuo to provide compound 3c, which was used without further purification. MS: m/z=269.1, 271.1 [M+H].

Step C—Synthesis of Compound 3d

To a mixture of 7-bromo-6-methoxy-2-methylquinazolin-4(3H)-one (980 mg, 3.28 mmol), and sodium hydride (60% in mineral oil) (262 mg, 6.56 mmol) in N,N-dimethylformamide (5 mL) was added 1-(bromomethyl)-4-chlorobenzene (1010 mg, 4.92 mmol) at 0° C. The resulting reaction was allowed to stir at room temperature for 2 hours. The reaction was quenched with the water (10 mL), and extracted with ethyl acetate (3×50 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate:petroleum ether—40:60 to 60:40 to provide compound 3d. MS: m/z=395.0 [M+H].

Step D—Synthesis of Compound 3e

To a mixture of 7-bromo-3-(4-chlorobenzyl)-6-methoxy-2-methylquinazolin-4(3H)-one (150 mg, 0.381 mmol) in dichloromethane (5 mL) at 0° C. was added boron tribromide (0.360 mL, 3.81 mmol). The resulting reaction was heated to 40° C., and allowed to stir for 16 hours. The resulting reaction was quenched with methanol (20 mL), and the resulting reaction concentrated in vacuo. The residue obtained was purified using silica gel chromatography, eluting with a gradient of ethyl methanol:dichloromethane—0:100 to 20:80 to provide compound 3e. MS: m/z=381.0 [M+H].

Step E—Synthesis of Compound 3f

To a mixture of triphenylphosphine (42 mg, 0.158 mmol) in tetrahydrofuran (2 mL) at 0° C. under an atmosphere of argon was added (E)-di-tert-butyl diazene-1,2-dicarboxylate (36.4 mg, 0.158 mmol). The resulting reaction was allowed to stir for 30 minutes (7R,8aS)-7-hydroxytetrahydro-1H-oxazolo[3,4-a]pyridin-3(5H)-one (24.8 mg, 0.158 mmol), and compound 3e (60 mg, 0.158 mmol) were added, and the reaction mixture allowed to warm to room temperature and allowed to stir for 2 hours. Water (10 mL) was added, and the resulting solution was extracted with ethyl acetate (3×20 mL). The combined organic extracts were washed with saturated aqueous sodium chloride (2×50 mL), dried over sodium sulfate, and concentrated in vacuo. The residue obtained was purified using preparative HPLC, eluting with a gradient of acetonitrile:water (0.5% trifluoroacetic acid)—25:75 to 30:70 to provide compound 3f. MS: m/z=520.2 [M+H].

Step F—Synthesis of Compound 3

To a mixture of compound 3f (100 mg, 0.193 mmol), [4,4'-bis(1,1-dimethylethyl)-2,2'-bipyridine-N1,N1']bis[3,5-difluoro-2-[5-(trifluoromethyl)-2-pyridinyl-N]phenyl-C]iridium(III) hexafluorophosphate (4.3 mg, 3.86 μmol), 2,6-dimethylpyridine (41 mg, 0.386 mmol), 1-bromo-2-methylpropan-2-ol (44 mg, 0.289 mmol), and tris(trimethylsilyl)silane (96 mg, 0.386 mmol) in 1,2-dimethoxyethane (1 mL) under an atmosphere of argon was added a mixture of 4,4'-di-tert-butyl-2,2'-bipyridine (0.5 mg, 1.928 μmol), and nickel (II) chloride ethylene glycol dimethyl ether complex (0.4 mg, 1.928 μmol) in 1,2-dimethoxyethane (1 mL). The resulting reaction was irradiated with blue LED light (400 nm, 15 W), and placed in the path of an active cooling fan for 16 hours. Water (10 mL) was added, and the resulting solution was extracted with dichloromethane (3×20 mL). The combined organic extracts were washed with saturated aqueous sodium chloride (50 mL), dried over sodium sulfate, and concentrated in vacuo. The residue obtained was purified using preparative HPLC, eluting with a gradient of acetonitrile:water (containing 20 mmol/L ammonium bicarbonate)—40:60 to 45:55 to provide compound 3. MS: m/z=512.2 [M+H]. $^1$H NMR (300 MHz, methanol-$d_4$, ppm) δ 7.67 (s, 1H), 7.61 (s, 1H), 7.36 (d, J 8.4 Hz, 2H), 7.21 (d, J 8.7 Hz, 2H), 5.44 (s, 2H), 5.07 (s, 1H), 4.49 (t, J 8.4 Hz, 1H), 4.26-4.16 (m, 1H), 4.03-3.97 (m, 1H), 3.80-3.73 (m, 1H), 3.40-3.34 (m, 1H), 3.05 (s, 2H), 2.55 (s, 3H), 2.38-2.36 (m, 1H), 2.17-2.14 (m, 1H), 1.96-1.73 (m, 2H), 1.26 (s, 6H).

Example 4

Preparation of Compound 4

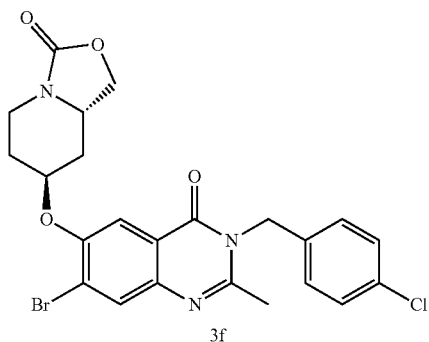

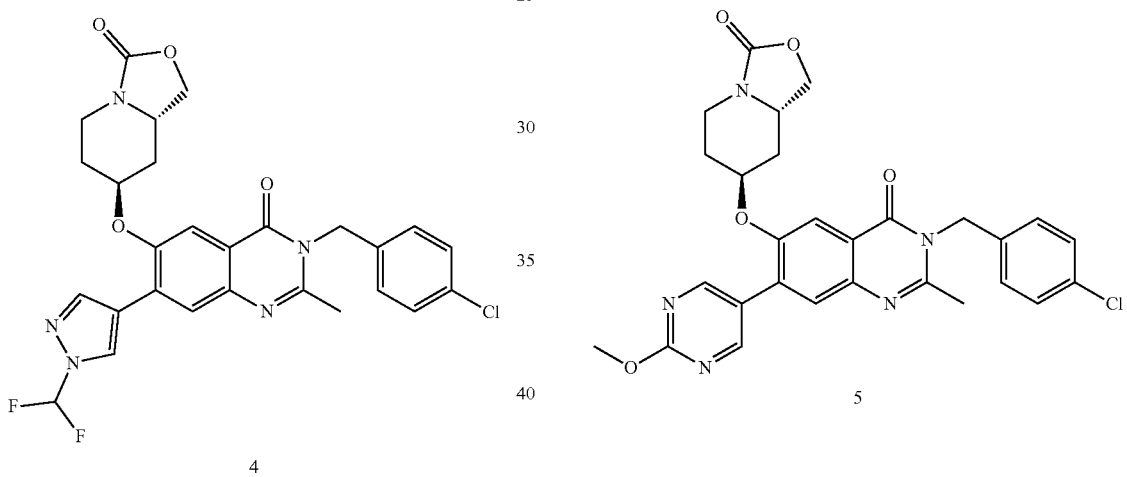

Step A—Synthesis of Compound 4

To a vial containing compound 3f (26 mg, 0.050 mmol), 1-(difluoromethyl)-4-(4,4,5,5-tetramethyl-1,3,2-dioxaborolan-2-yl)-1H-pyrazole (13.45 mg, 0.055 mmol), potassium phosphate (31.9 mg, 0.150 mmol), and PdCl2(dppf) (3.67 mg, 5.01 µmol) under vacuum was added dioxane (334 µl), and water (167 µl), and then the reaction mixture was placed under an atmosphere of dinitrogen. The resulting reaction was heated to 130° C., and allowed to stir for 30 minutes. The reaction mixture was cooled to room temperature and concentrated in vacuo. The residue obtained was purified using silica gel column chromatography, eluting with a gradient of ethanol:ethyl acetate:hexanes—3:7:90 to 25:75:0 to provide compound 4. MS: m/z=556 [M+H]. $^1$H NMR $^1$H NMR (600 MHz, dimethyl sulfoxide-$d_6$, ppm) δ 8.73 (s, 1H), 8.43 (s, 1H), 7.98 (s, 1H), 7.92 (t, J=58.9 Hz, 1H), 7.66 (s, 1H), 7.42 (d, J=8.3 Hz, 2H), 7.23 (d, J=8.3 Hz, 2H), 5.37 (s, 2H), 5.17 (s, 1H), 4.38-4.33 (m, 1H), 3.94-3.89 (m, 2H), 3.60 (dd, J=13.2, 5.2 Hz, 1H), 3.11-3.04 (m, 1H), 2.47 (s, 3H), 2.29 (d, J=13.4 Hz, 1H), 2.05 (d, J=14.0 Hz, 1H), 1.84-1.71 (m, 2H).

Example 5

Preparation of Compound 5

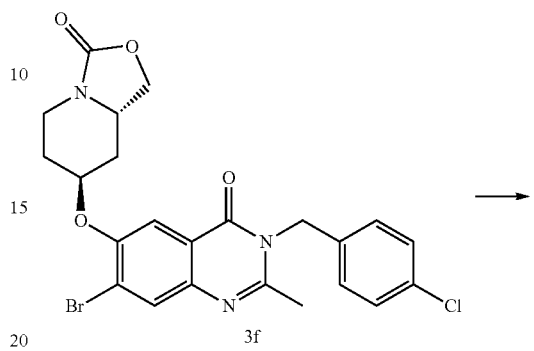

Step A—Synthesis of Compound 5

To a mixture of compound 3 (200 mg, 0.386 mmol), tetrakis(triphenylphosphine)palladium(0) (44.5 mg, 0.039 mmol), and potassium carbonate (107 mg, 0.771 mmol) in ethylene glycol dimethyl ether (5 mL), and water (1 mL) at room temperature was added (2-methoxypyrimidin-5-yl) boronic acid (89 mg, 0.578 mmol). The resulting reaction was heated to 85° C., and allowed to stir at this temperature for 1 hour. Water (20 mL) was added, and the resulting solution was extracted with ethyl acetate (3×20 mL). The combined organic extracts were washed with saturated aqueous sodium chloride (50 mL), dried over sodium sulfate, and concentrated in vacuo. The residue obtained was purified using silica gel column chromatography, eluting with a gradient of methanol:dichloromethane—0:100 to 10:90 to provide compound 5. MS: m/z=548.2 [M+H]. $^1$H NMR (300 MHz, chloroform-d, ppm): δ 8.78 (s, 2H), 7.75 (s, 1H), 7.65 (s, 1H), 7.33-7.27 (m, 2H), 7.16-7.14 (m, 2H), 5.38 (s, 2H), 5.05 (s, 1H), 4.39 (t, J=7.8 Hz, 1H), 4.13 (s, 3H), 3.91-3.73 (m, 3H), 3.05-2.95 (m, 1H), 2.56 (s, 3H), 2.29-2.24 (m, 1H), 2.14-2.10 (m, 1H), 1.86-1.65 (m, 2H).

Example 6

Preparation of Compound 6

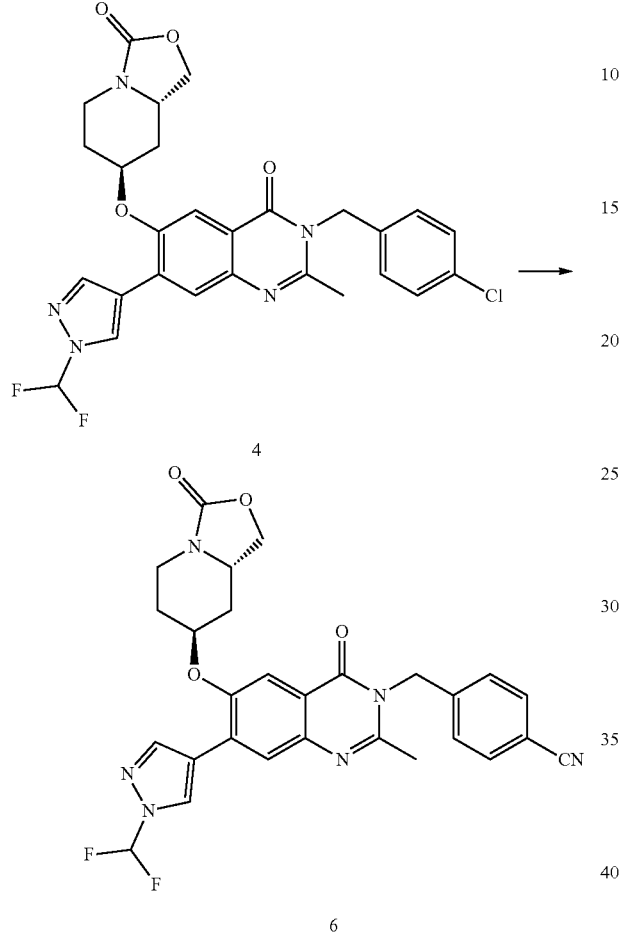

Step A—Synthesis of Compound 6

To a vial containing compound 4 (110 mg, 0.198 mmol), zinc cyanide (34.8 mg, 0.297 mmol), potassium phosphate (84 mg, 0.396 mmol), and chloro(2-dicyclohexylphosphino-2',4',6'-tri-i-propyl-1,1'-biphenyl)(2'-amino-1,1'-biphenyl-2-yl) palladium(II) (16 mg, 0.020 mmol) under vacuum was added N,N-dimethyl formamide (2.0 mL), and the resulting reaction was placed under an atmosphere of dinitrogen. The reaction mixture was heated to 150° C., and allowed to stir at this temperature for 30 minutes. The reaction mixture was was cooled to room temperature, and diluted with water, and filtered. The collected solid was taken up in dichloromethane and purified using silica gel column chromatography, eluting with a gradient of ethanol:ethyl acetate:hexanes—3:7:90 to 25:75:0 to provide compound 6. MS: m/z=547 [M+H]. $^1$H NMR (500 MHz, dimethyl sulfoxide-d, ppm) δ 8.74 (s, 1H), 8.44 (s, 1H), 8.00 (s, 1H), 7.93 (t, J=58.7 Hz, 1H), 7.83 (d, J=8.0 Hz, 2H), 7.65 (s, 1H), 7.39 (d, J=7.9 Hz, 2H), 5.46 (s, 2H), 5.17 (s, 1H), 4.36 (s, 1H), 3.92 (d, J=5.6 Hz, 2H), 3.60 (dd, J=13.0, 4.9 Hz, 1H), 3.08 (t, J=12.0 Hz, 1H), 2.46 (s, 3H), 2.29 (d, J=13.5 Hz, 1H), 2.05 (d, J=14.0 Hz, 1H), 1.77 (dt, J=24.7, 12.7 Hz, 2H).

Example 7

Preparation of Compound 7

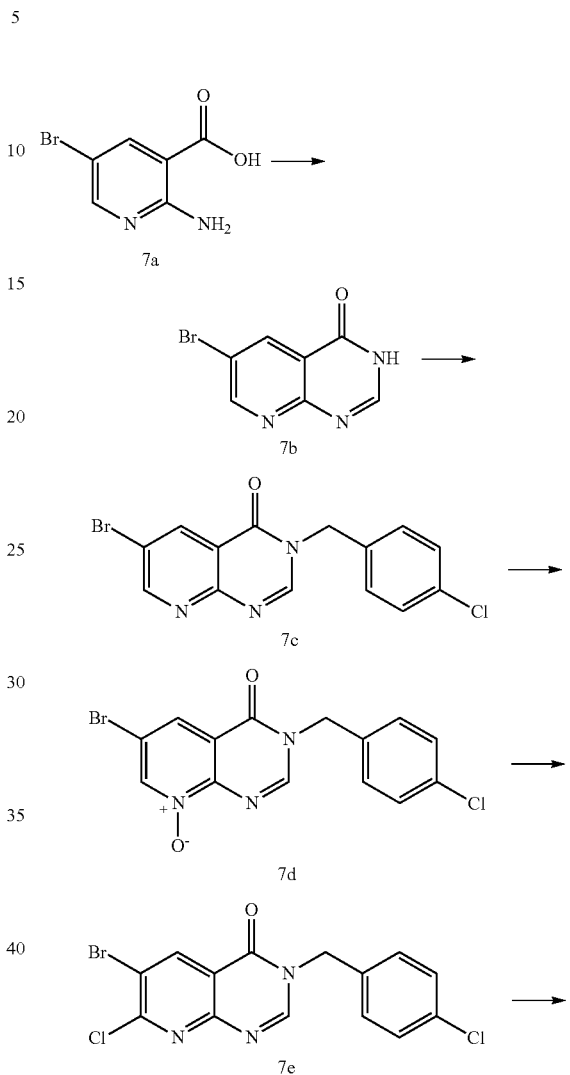

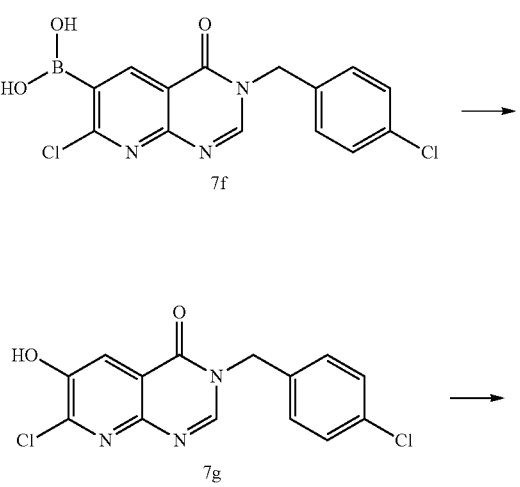

-continued

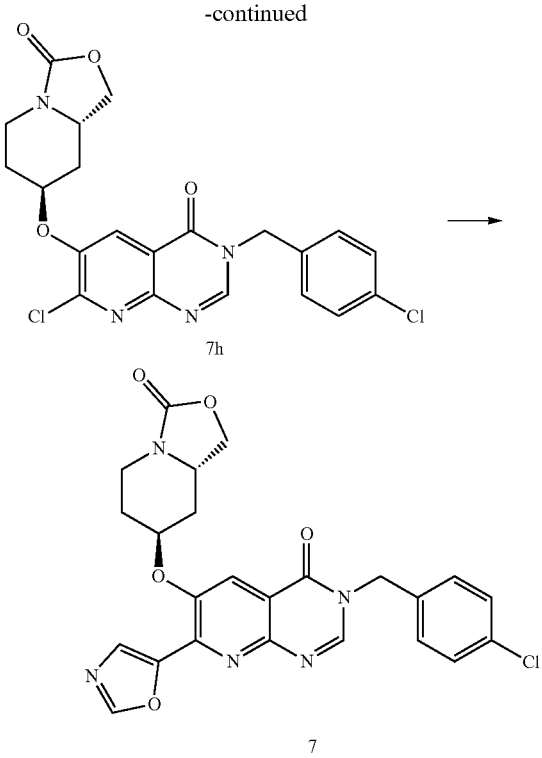

Step A—Synthesis of Compound 7b

A mixture of formamidine acetate (7a, 863 mg, 8.29 mmol), and 2-amino-5-bromonicotinic acid (900 mg, 4.15 mmol) in formamide (10 mL) was allowed to stir for 16 hours at 150° C. The resulting reaction was cooled to room temperature, and filtered. The collected solid was washed with ethyl acetate (2×20 mL), and dried in vacuo to provide compound 7b, which was used without further purification. MS: m/z=225.9, 227.9 [M+H].

Step B—Synthesis of Compound 7c

To a mixture of compound 7b (300 mg, 1.327 mmol) in DMF (2 mL) at 0° C. was added sodium hydride (60% in mineral oil) (106 mg, 2.65 mmol). The resulting reaction was allowed to warm to room temperature and stirred at this temperature for 30 minutes. 1-chloro-4-(chloromethyl)benzene (321 mg, 1.991 mmol) was then added, and the resulting reaction was allowed to stir for 16 hours at room temperature. The reaction was quenched with water (30 mL), and extracted with ethyl acetate (3×40 mL). The combined organic extracts were washed with saturated aqueous sodium chloride (30 mL), dried over sodium sulfate, and concentrated in vacuo. The residue obtained was purified using silica gel chromatography, eluting with a gradient of ethyl acetate:petroleum ether—1:3 to 1:0 to provide compound 7c. MS: m/z=350.0, 352.0 [M+H].

Step C—Synthesis of Compound 7d

To a mixture of compound 7c (2 g, 5.70 mmol) in acetonitrile (20 mL) at 0° C. was added hydrogen peroxide—urea (1:1) (2.7 g, 28.5 mmol). Trifluoroacetic anhydride (6.0 g, 28.5 mmol) was added dropwise, and the resulting reaction was allowed to warm to room temperature and stir at this temperature for 3 hours. Water (50 mL) was added, and the resulting solution was extracted with ethyl acetate (3×100 mL). The combined organic extracts were washed with saturated aqueous sodium chloride (100 mL), dried over sodium sulfate, and concentrated in vacuo. The residue obtained was purified using silica gel chromatography, eluting with a gradient of methanol:dichloromethane—5:95 to 10:90 to provide compound 7d. MS: m/z=366.0, 368.0 [M+H].

Step D—Synthesis of Compound 7e

To a mixture of compound 7d (2 g, 5.46 mmol) in dichloromethane (20 mL) at 0° C. were added oxalyl dichloride (0.9 mL, 10.91 mmol), and triethylamine (1.6 mL, 10.9 mmol). The resulting reaction was allowed to stir for 3 hours at 0° C., then was quenched with water (20 mL), and the resulting solution was extracted with ethyl acetate (3×50 mL). The combined organic extracts were washed with saturated aqueous sodium chloride (50 mL), dried over sodium sulfate, and concentrated in vacuo. The residue obtained was purified using silica gel chromatography, eluting with a gradient of ethyl acetate:petroleum ether—0:100 to 67:33 to provide compound 7e. MS: m/z=383.9, 385.9 [M+H].

Step E—Synthesis of Compound 7f

To a mixture of compound 7e (700 mg, 1.818 mmol) in 1,4-dioxane (14 mL) under an atmosphere of dinitrogen were added potassium acetate (714 mg, 7.27 mmol), 1,1'-bis(diphenylphosphino)ferrocene-palladium(II)dichloride dichloromethane complex (148 mg, 0.182 mmol), and 4,4,4',4',5,5,5',5'-octamethyl-2,2'-bi(1,3,2-dioxaborolane) (692 mg, 2.73 mmol). The resulting reaction was heated to 100° C., and allowed to stir at this temperature for 3 hours. The reaction mixture was cooled, and concentrated in vacuo. The residue obtained was diluted with ethyl acetate (100 mL), washed with water (15 mL), and saturated aqueous sodium chloride (15 mL), dried over sodium sulfate, and concentrated in vacuo to provide compound 7f, which was used without further purification. MS: m/z=350.1 [M+H].

Step F—Synthesis of Compound 7g

To a mixture of compound 7f (636 mg, 1.817 mmol) in tetrahydrofuran (9 mL) were added hydrogen peroxide (30% in water) (3 mL, 29.4 mmol). The resulting reaction was allowed to stir for 40 minutes at room temperature. Saturated aqueous sodium thiosulfate (10 mL) was added, and the resulting solution was extracted with ethyl acetate (5×20 mL). The combined organic extracts were washed with saturated aqueous sodium chloride (5 mL), dried over sodium sulfate, and concentrated in vacuo. The residue obtained was purified using preparative HPLC, eluting with a gradient of acetonitrile:water (0.8% ammonium bicarbonate)—0:100 to 20:80 to provide compound 7g. MS: m/z=322.1 [M+H].

Step G—Synthesis of Compound 7h

To a mixture of triphenylphosphine (472 mg, 1.800 mmol) in tetrahydrofuran (2 mL) at 0° C. under an atmosphere of dinitrogen was added di-tert-butyl azodicarboxylate (415 mg, 1.800 mmol). The resulting reaction was allowed to stir at 0° C. for 30 minutes, then Compound 7g (145 mg, 0.360 mmol), and (7R,8aS)-7-hydroxytetrahydro-1H-oxazolo[3,4-a]pyridin-3(5H)-one (85 mg, 0.540 mmol) were added, and the reaction mixture was heated to room temperature and allowed to stir at this temperature for 3 hours. Water (5 mL) was added, and the resulting solution was extracted with ethyl acetate (3×25 mL). The combined organic extracts were washed with saturated aqueous sodium chloride (10 mL), dried over sodium sulfate, and concentrated in vacuo. The residue obtained was purified using preparative thin layer chromatography, eluting with ethyl acetate:ethanol:petroleum ether—38:10:52 to provide compound 7h. MS: m/z=461.1 [M+H].

Step H—Synthesis of Compound 7

To a mixture of compound 7h (40 mg, 0.069 mmol) in 1,4-dioxane (3 mL), and water (1 mL), under an atmosphere of argon, was added potassium phosphate (44 mg, 0.208 mmol), 5-(4,4,5,5-tetramethyl-1,3,2-dioxaborolan-2-yl)oxazole (20 mg, 0.104 mmol), and 1,1'-bis(di-tert-butylphosphino)ferrocene palladium dichloride (5 mg, 6.94 µmol). The resulting reaction was heated to 110° C., and allowed to stir at this temperature for 3 hours. The resulting reaction was diluted with water (5 mL), and the resulting solution was extracted with ethyl acetate (3×30 mL). The combined organic extracts were washed with saturated aqueous sodium chloride (10 mL), dried over sodium sulfate, and concentrated in vacuo. The residue obtained was purified using preparative HPLC, eluting with a gradient of acetonitrile:water (0.8% ammonium bicarbonate)—35:65 to 70:30 to provide the crude product. The crude was purified using chiral-prep-HPLC (Column: CHIRAL ART Cellulose-SB), eluting with a gradient of methyl tert-butyl ether (containing 10 mM ammonia in methanol):methanol—50:50 to provide compound 7. MS: m/z=494.2 [M+H]. $^1$H NMR (400 MHz, chloroform-d, ppm): δ 8.31 (s, 1H), 8.14 (s, 1H), 8.07 (s, 1H), 7.98 (s, 1H), 7.37-7.30 (m, 4H), 5.18 (s, 3H), 4.47 (t, J 8.0 Hz, 1H), 4.15-4.08 (m, 1H), 3.98-3.91 (m, 2H), 3.36-3.28 (m, 1H), 2.37-2.16 (m, 2H), 2.00-1.82 (m, 2H).

Example 8

Preparation of Compound 8

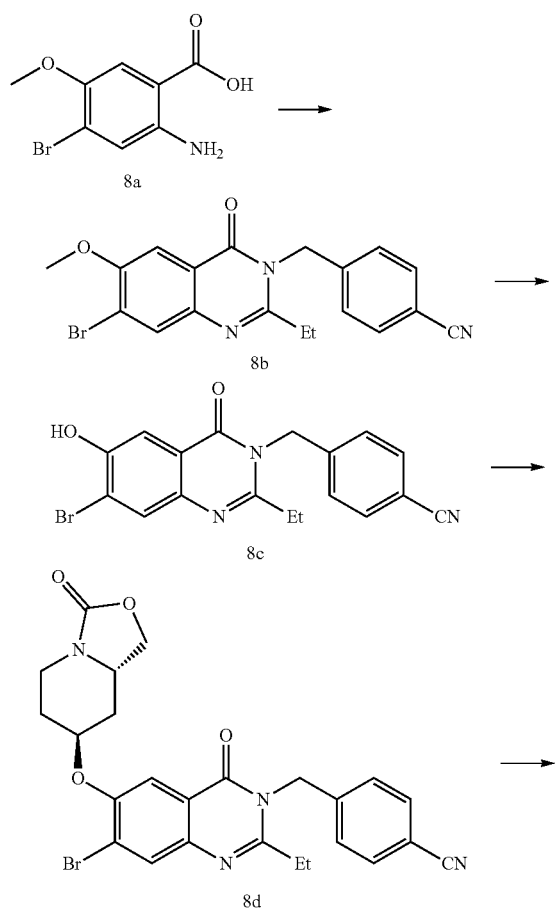

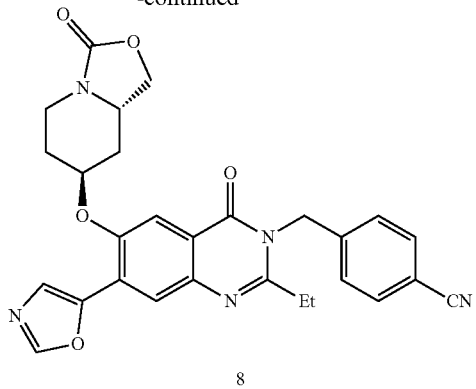

Step A—Synthesis of Compound 8b

A mixture of 2-amino-4-bromo-5-methoxybenzoic acid (8a, 5.0 g, 20.32 mmol) in propionic anhydride (100 mL, 20.32 mmol) was allowed to stir at 120° C. for 4 hours. The resulting reaction was cooled to room temperature, and concentrated in vacuo. The residue obtained was taken up in acetic acid (100 mL). 4-(aminomethyl)benzonitrile (5.37 g, 40.6 mmol) was added, and the reaction mixture was allowed to stir at 120° C. for 16 hours. The reaction was cooled to room temperature, and concentrated in vacuo. The residue obtained was purified using silica gel chromatography, eluting with a gradient of ethyl acetate:petroleum ether—0:10 to 10:0 to provide compound 8b. MS: m/z=398.0, 400.0 [M+H].

Step B—Synthesis of Compound 8c

A mixture of compound 8b (2.0 g, 5.02 mmol) in a solution of boron tribromide in dichloromethane (1 M, 50 mL, 50.0 mmol) was allowed to stir at 40° C. for 16 hours. The resulting reaction was cooled to −20° C., and then diluted with methanol and saturated aqueous sodium bicarbonate (v:v=1:1, 200 mL). The resulting reaction was concentrated in vacuo, and then extracted with ethyl acetate (3×100 mL). The combined organic extracts were washed with saturated aqueous sodium chloride (100 mL), dried over sodium sulfate, and concentrated in vacuo to provide compound 8c, which was used without further purification. MS: m/z=384.0, 386.0 [M+H].

Step C—Synthesis of Compound 8d

To a mixture of tricyclohexylphosphine (841 mg, 3.00 mmol) in toluene (10 mL) were added (E)-di-tert-butyl diazene-1,2-dicarboxylate (691 mg, 3.00 mmol), compound 8c (384 mg, 1 mmol), and (7R,8aS)-7-hydroxytetrahydro-1H-oxazolo[3,4-a]pyridin-3(5H)-one (189 mg, 1.200 mmol). The resulting reaction was allowed to stir for 3 hours at 40° C., and concentrated in vacuo. The residue obtained was purified using silica gel chromatography, eluting with a gradient of ethyl acetate:dichloromethane 1:99 to 40:60 to provide compound 8d. MS: m/z=523.2, 525.2 [M+H].

Step D—Synthesis of Compound 8

To a solution of compound 8d (240 mg, 0.46 mmol) in 1,4-dioxane (8.00 mL), and water (4.00 mL) under an atmosphere of argon were added [1,1'-bis(diphenylphosphino)ferrocene]dichloropalladium (II) (33.6 mg, 0.046 mmol), potassium phosphate (292 mg, 1.38 mmol), and 1-(difluoromethyl)-4-(4,4,5,5-tetramethyl-1,3,2-dioxaborolan-2-yl)-1H-pyrazole (123 mg, 0.51 mmol). The resulting reaction was heated to 130° C., and allowed to stir at this temperature for 1 hour. The resulting reaction was cooled to room temperature, and diluted with saturated aqueous ammonium chloride (30 mL), and extracted with ethyl acetate (3×30 mL). The combined organic extracts were washed with saturated aqueous sodium chloride (30 mL), dried over sodium sulfate, and concentrated in vacuo. The residue obtained was purified using silica gel chromatography, eluting with a gradient of methanol:dichloromethane 0:100 to 10:90 to provide compound 8. MS: m/z=561.1 [M+H]. $^1$H NMR (400 MHz, chloroform-d, ppm): δ 8.30 (s, 1H), 8.11 (s, 1H), 7.88 (s, 1H), 7.73 (s, 1H), 7.65-7.63 (m, 2H), 7.43-7.13 (m, 3H), 5.46 (s, 2H), 5.12 (s, 1H), 4.41 (t, J=8.0 Hz, 1H), 3.99-3.90 (m, 2H), 3.88-3.83 (m, 1H), 3.21-3.14 (m, 1H), 2.76-2.71 (m, 2H), 2.37-2.34 (m, 1H), 2.21-2.18 (m, 1H), 1.92-1.85 (m, 1H), 1.78-1.72 (m, 1H), 1.35 (t, J=7.6 Hz, 3H).

Example 9

Preparation of Compound 9

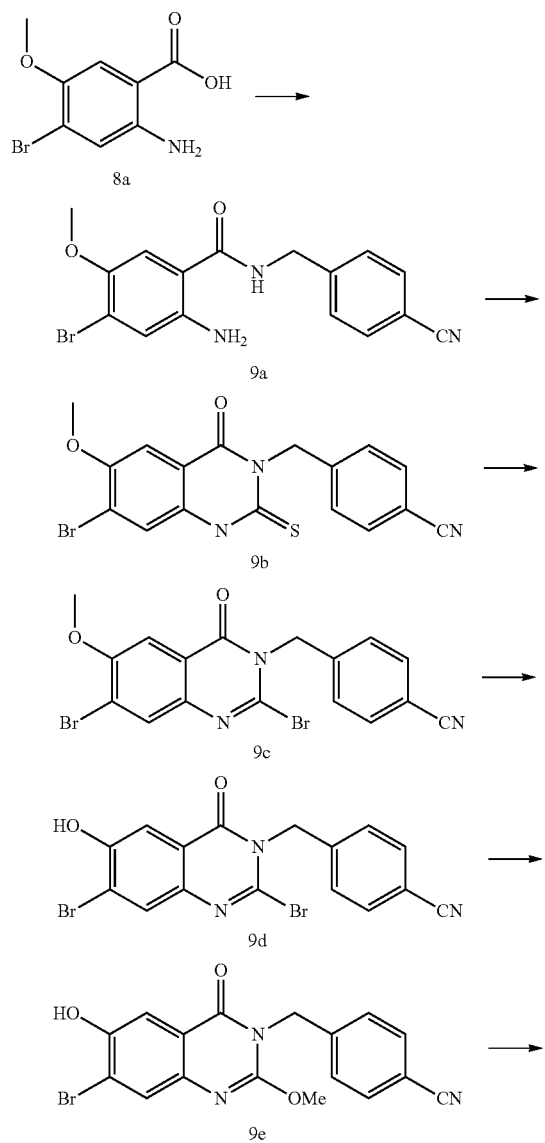

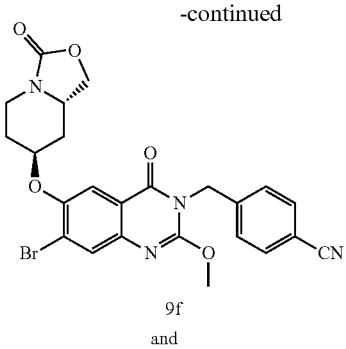

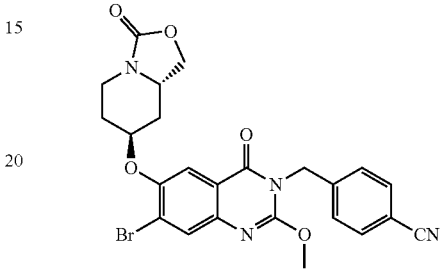

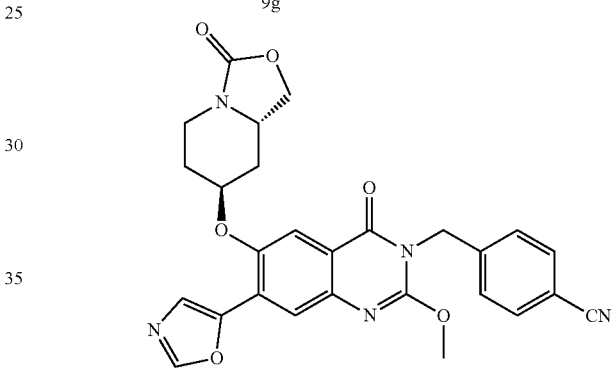

Step A—Synthesis of Compound 9a

To a solution of 2-amino-4-bromo-5-methoxybenzoic acid (9a, 5 g, 20.41 mmol) in N,N-dimethylformamide (20 mL) under an atmosphere of argon were added N-ethyl-N-5 isopropylpropan-2-amine (5.27 g, 41 mmol), and N,N,N,N-tetramethyl-O-(7-azabenzotriazol-1-yl)uronium hexafluorophospate (9.3 g, 24.5 mmol), and the reaction mixture allowed to stir for 30 minutes. 4-(aminomethyl)benzonitrile (3.52 g, 26.5 mmol) was added, and the reaction mixture was allowed to stir for an additional 2 hours. The resulting reaction was diluted with ethyl acetate (80 mL), and washed with water (3×40 mL). The organic phase was washed with saturated aqueous sodium chloride (3×50 mL), dried over sodium sulfate, and concentrated in vacuo. The residue obtained was purified using silica gel column chromatography, eluting with a gradient of ethyl acetate:petroleum ether—0:100 to 33:67 to provide compound 9a.

Step B—Synthesis of Compound 9b

A mixture of potassium hydroxide (1.168 g, 20.82 mmol), carbon disulfide (35 mL, 13.88 mmol) in ethanol (350 mL) was allowed to stir for 30 minutes under an atmosphere of dinitrogen. Compound 9a (5 g, 13.88 mmol) was added, and the reaction mixture was heated to 90° C., and allowed to stir at this temperature for 16 hours. The resulting reaction was cooled to room temperature, and concentrated in vacuo, and the residue obtained was filtered, and washed with water to provide compound 9b, which was used without further purification. MS: m/z=402.0, 404.0 [M+H].

Step C—Synthesis of Compound 9c

To a solution of compound 9b (2.9 g, 7.21 mmol) in acetonitrile (100 mL) under an atmosphere of dinitrogen was added dibromine (15 mL, 7.21 mmol), and the reaction mixture was allowed to stir for 4 hours. The resulting reaction was cooled to −40° C., and then diluted with saturated aqueous sodium thiosulfate (20 mL). The resulting solution was concentrated in vacuo, and the residue obtained was purified using silica gel column chromatography, eluting with a gradient of ethyl acetate:petroleum ether—0:100 to 20:80 to provide compound 9c. MS: m/z=448.0, 450.0, 452.0 [M+H].

Step D—Synthesis of Compound 9d

A mixture of compound 9c (1.6 g, 3.56 mmol) in a solution of boron tribromide in dichloromethane (1 M, 40 mL, 40.0 mmol) under an atmosphere of dinitrogen was heated to 40° C., and allowed to stir at this temperature for 16 hours. The resulting reaction was cooled to 0° C., diluted with methanol and saturated aqueous sodium hydrogen carbonate (v:v 1:1, 200 mL) was added. The resulting solution was filtered, and concentrated in vacuo. The residue obtained was purified using silica gel column chromatography, eluting with a gradient of ethyl acetate:petroleum ether—0:100 to 60:40 to provide compound 9d. MS: m/z=434.0, 436.0, 438.0 [M+H].

Step E—Synthesis of Compound 9e

A mixture of sodium methoxide (2.483 g, 46.0 mmol), and compound 9d (2 g, 4.60 mmol) in methanol (100 mL) was allowed to stir at room temperature for 16 hours, then the reaction mixture was concentrated in vacuo. The residue obtained was purified using silica gel column chromatography, eluting with a gradient of methanol:dichloromethane—0:100 to 10:90 to provide compound 9e. MS: m/z=386.1, 388.0 [M+H].

Step F—Synthesis of Compound 9f

A mixture of di-tert-butyl azodicarboxylate (537 mg, 2.330 mmol) (917 mg, 3.50 mmol), and triphenylphosphine (805 mg, 3.50 mmol) in tetrahydrofuran (10 mL) under dinitrogen was allowed to stir for 30 minutes at room temperature. Compound 9e (450 mg, 1.165 mmol), and (7R,8aS)-7-hydroxytetrahydro-1H-oxazolo[3,4-a]pyridin-3 (5H)-one (220 mg, 1.398 mmol) were added, and the resulting reaction was allowed to stir for 16 hours at room temperature. The reaction mixture was diluted with methanol (15 mL), filtered, and concentrated in vacuo. The residue obtained was purified using silica gel column chromatography, eluting with a gradient of ethyl acetate:dichloromethane—0:1 to 1:1 to provide compound 9f (MS: m/z=525.1, 527.1 [M+H]⁺), and compound 9g. MS: m/z=511.2, 513.2 [M+H].

Step G—Synthesis of Compound 9

To a mixture of 1,1'-bis(di-tert-butylphosphino)ferrocene palladium dichloride (4.96 mg, 7.61 µmol), compound 9f (80 mg, 0.152 mmol), and 5-(4,4,5,5-tetramethyl-1,3,2-dioxaborolan-2-yl)oxazole (35.6 mg, 0.183 mmol) in 1,4-dioxane (3 mL) under an atmosphere of argon was added potassium phosphate (1 M in water) (0.457 mL, 0.457 mmol). The resulting reaction was heated to 110° C., and allowed to stir at this temperature for 1 hour. The reaction mixture was cooled to room temperature, diluted with water (10 mL), and the resulting solution was extracted with ethyl acetate (3×30 mL). The combined organic extracts were washed with saturated aqueous sodium chloride (2×10 mL), dried over sodium sulfate, and concentrated in vacuo. The residue obtained was purified using silica gel column chromatography, eluting with a gradient of methanol:dichloromethane—0:100 to 10:90 to provide compound 9. MS: m/z=514.1 [M+H].

¹H NMR (400 MHz, chloroform-d, ppm): δ 8.01 (d, J=14.0 Hz, 2H), 7.69-7.68 (m, 2H), 7.63-7.61 (m, 2H), 7.48-7.46 (m, 2H), 5.33 (s, 2H), 5.15 (s, 1H), 4.45 (t, J=8.2 Hz, 1H), 4.14-4.08 (m, 4H), 3.96-3.86 (m, 2H), 3.34-3.27 (m, 1H), 2.37 (d, J=13.6 Hz, 1H), 2.21 (d, J=14.8 Hz, 1H), 1.95-1.91 (m, 2H).

Example 10

Preparation of Compound 10

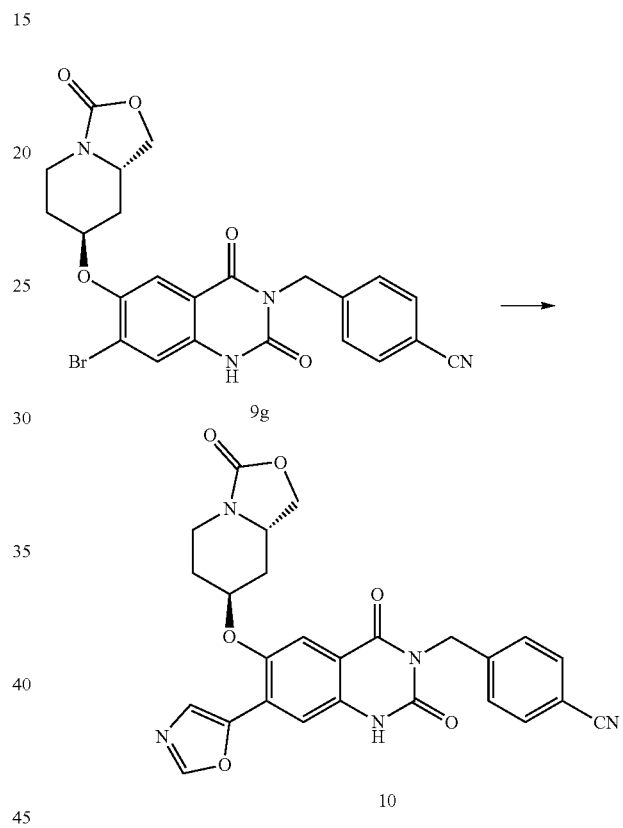

Step A—Synthesis of Compound 10

To a mixture of 1,1'-bis(di-tert-butylphosphino)ferrocene palladium dichloride (5.10 mg, 7.82 µmol), compound 9g (80 mg, 0.156 mmol), and 5-(4,4,5,5-tetramethyl-1,3,2-dioxaborolan-2-yl)oxazole (36.6 mg, 0.188 mmol) in 1,4-dioxane (3 mL) under an atmosphere of argon was added potassium phosphate (1 M in water) (0.469 mL, 0.469 mmol). The resulting reaction was heated to 110° C., and allowed to stir at this temperature for 1 hour. The reaction mixture was cooled, diluted with water (10 mL), and the resulting solution was extracted with ethyl acetate (3×30 mL). The combined organic extracts were washed with saturated aqueous sodium chloride (2×10 mL), dried over sodium sulfate, and concentrated in vacuo. The residue obtained was purified using silica gel column chromatography, eluting with a gradient of methanol:dichloromethane—0:100 to 10:90 to provide compound 10. MS: m/z=500.0 [M+H].

¹H NMR (300 MHz, chloroform-d, ppm): δ 8.86 (s, 1H), 8.80 (s, 1H), 7.80 (s, 1H), 7.73-7.61 (m, 5H), 7.50 (s, 1H), 5.29 (s, 2H), 5.12 (s, 1H), 4.48-4.43 (m, 1H), 4.18-4.08 (m, 1H), 3.99-3.79 (m, 2H), 3.30-3.22 (m, 1H), 2.37-2.32 (m, 1H), 2.26-2.16 (m, 1H), 1.95-1.76 (m, 2H).

Example 11

Preparation of Compound 11

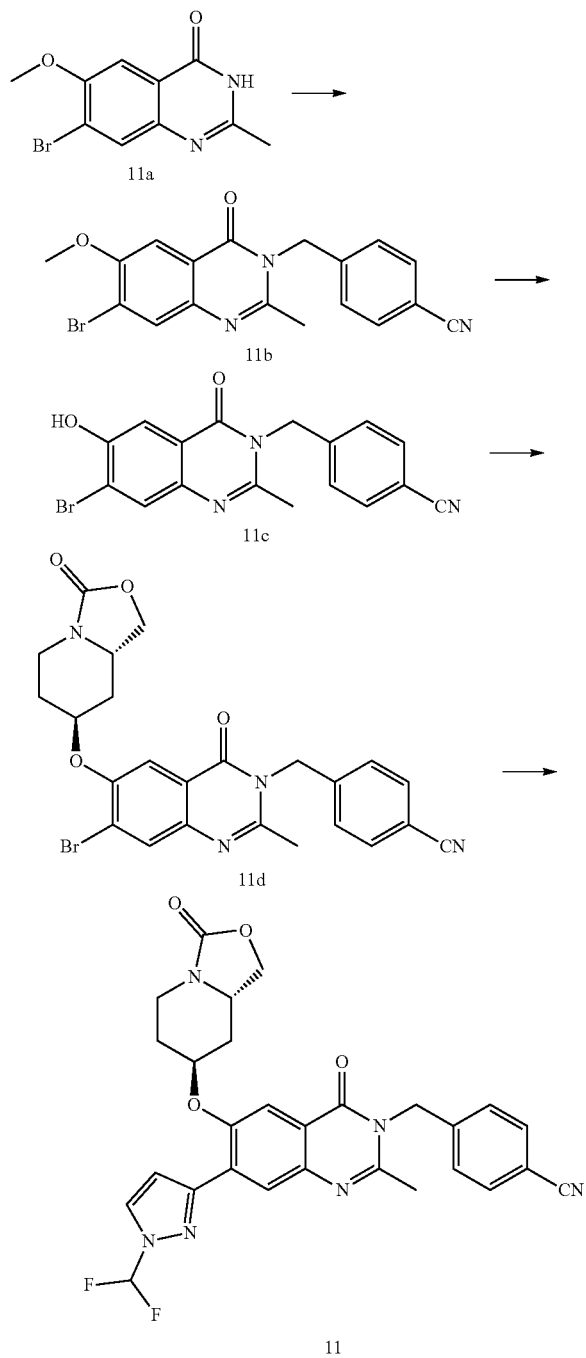

Step A—Synthesis of Compound 11b

To a mixture of 7-bromo-6-methoxy-2-methylquinazolin-4(3H)-one (11a, 1.5 g, 5.57 mmol) in N,N-dimethylformamide (20 mL) at 0° C. under an atmosphere of dinitrogen was added sodium hydride (60% in mineral oil, 334 mg, 8.36 mmol), and the resulting mixture allowed to stir for 30 minutes. 4-(bromomethyl)benzonitrile (1.20 g, 6.13 mmol) was added, and the resulting reaction was warmed to room temperature and allowed to stir at this temperature for 16 hours. The reaction mixture was diluted with water (80 mL), and the resulting mixture was extracted with ethyl acetate (3 □ 100 mL). The combined organic extracts were washed with saturated aqueous sodium chloride (100 mL), dried over sodium sulfate, and concentrated in vacuo. The residue obtained was purified using silica gel chromatography, eluting with a gradient of ethyl acetate:petroleum ether—17:83 to 50:50 to provide compound 11b. MS: m/z=384.0, 386.0 [M+H].

Step B—Synthesis of Compound 11c

A mixture of compound 11b (1 g, 2.60 mmol), and a solution of boron tribromide in dichloromethane (1 M, 10 mL, 10.0 mmol), under an atmosphere of dinitrogen, was heated to 40° C., and allowed to stir at this temperature for 16 hours. The reaction mixture was cooled to 0° C., then diluted with methanol (5 mL), and filtered.

The collected solid was dried in vacuo to provide compound 11c, which was used without further purification. MS: m/z=370.1, 372.1 [M+H].

Step C—Synthesis of Compound 11d

To a mixture of triphenylphosphine (4.25 g, 16.21 mmol) in toluene (80 mL) at 0° C. under an atmosphere of dinitrogen was added di-tert-butyl azodicarboxylate (3.73 g, 16.21 mmol), and the reaction mixture was allowed to stir at 0° C. for 15 minutes. Compound 11c (2 g, 5.40 mmol), and (7R,8aS)-7-hydroxytetrahydro-1H-oxazolo[3,4-a]pyridin-3(5H)-one (1.0 g, 6.48 mmol) were added, and the resulting reaction was warmed to room temperature and allowed to stir at this temperature for 2 hours. The reaction mixture was diluted with water (100 mL), and the resulting solution was extracted with ethyl acetate (3×150 mL). The combined organic extracts were washed with saturated aqueous sodium chloride (250 mL), dried over sodium sulfate, and concentrated in vacuo. The residue obtained was diluted with methanol (15 mL). The solid was collected by filtration and dried in vacuo to provide compound 11d, which was used without further purification. MS: m/z=509.1, 511.1 [M+H].

Step D—Synthesis of Compound 11

To a mixture of compound 11d (50 mg, 0.098 mmol), 1-(difluoromethyl)-3-(4,4,5,5-tetramethyl-1,3,2-dioxaborolan-2-yl)-1H-pyrazole (47.9 mg, 0.196 mmol), potassium phosphate (62.5 mg, 0.294 mmol) in 1,4-dioxane (3 mL), and water (0.5 mL) was added 1,1'-bis(di-tert-butylphosphino)ferrocene palladium dichloride (6.40 mg, 9.82 μmol) at room temperature. The resulting reaction was heated to at 95° C., and allowed to stir at this temperature for 2 hours. The reaction was then quenched with water (10 mL), and extracted with ethyl acetate (30 mL). The organic extract was washed with saturated aqueous sodium chloride (20 mL), dried over sodium sulfate, and concentrated in vacuo. The residue obtained was purified using preparative HPLC, eluting with a gradient of acetonitrile:water (0.5% formic acid)—0:1 to 45:55 to provide compound 11. MS: m/z=547.2 [M+H]. $^1$H NMR (300 MHz, chloroform-d, ppm): δ 8.16 (s, 1H), 7.93 (d, J=2.4 Hz, 1H), 7.75 (s, 1H), 7.71-7.65 (m, 2H), 7.56-7.48 (m, 1H), 7.34-7.07 (s, 2H), 6.93 (d, J=2.4 Hz, 1H), 5.45 (s, 2H), 5.12 (s, 1H), 4.40 (t, J=8.1 Hz, 1H), 4.08-3.98 (m, 1H), 3.93-3.89 (m, 1H), 3.85-3.81 (m, 1H), 3.31-3.22 (m, 1H), 2.54 (s, 3H), 2.35-2.31 (m, 1H), 2.19-2.14 (m, 1H), 1.91-1.65 (m, 2H).

Example 12

Preparation of Compound 12

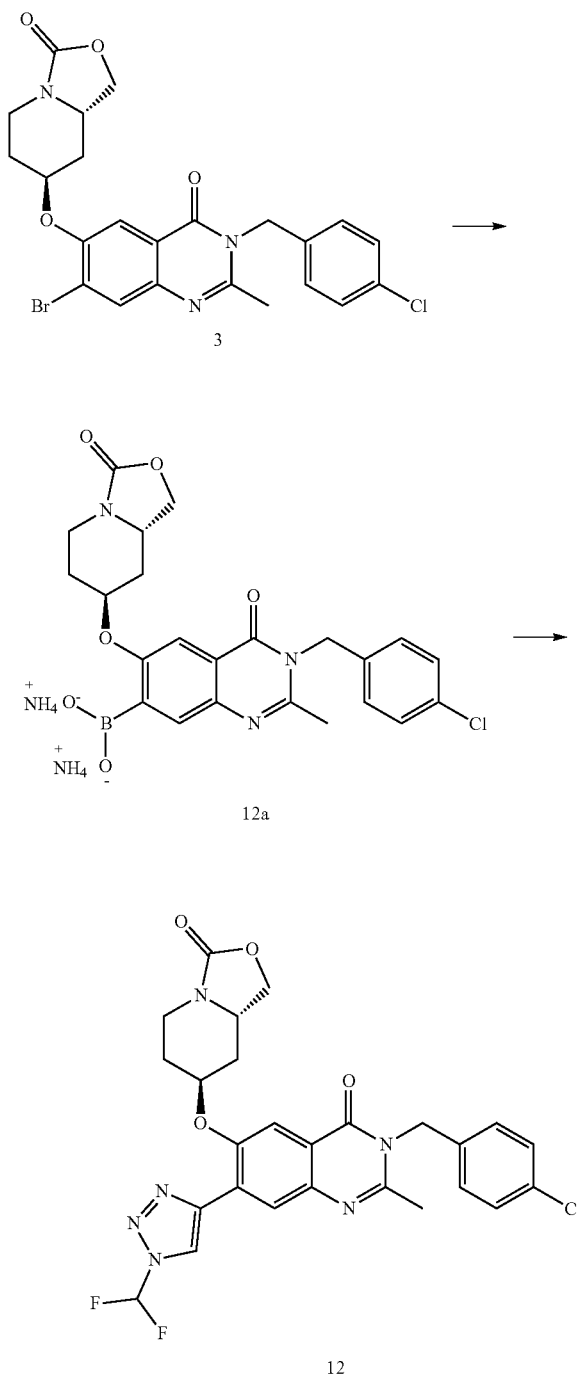

Step A—Synthesis of Compound 12a

A mixture of compound 3 (500 mg, 0.964 mmol), chloro(2-dicyclohexylphosphino-2',4',6'-tri-i-propyl-1,1'-biphenyl)(2'-amino-1,1'-biphenyl-2-yl) palladium(II) (37.9 mg, 0.048 mmol), potassium acetate (284 mg, 2.89 mmol), and 4,4,4',4',5,5,5',5'-octamethyl-2,2'-bi(1,3,2-dioxaborolane) (367 mg, 1.446 mmol) in N,N-dimethylacetamide (15 mL) under an atmosphere of dinitrogen, was heated to 100° C., and allowed to stir at this temperature for 1.5 hours. The resulting reaction was cooled, and diluted with saturated aqueous ammonium chloride (50 mL). The resulting solution was extracted with ethyl acetate (3×50 mL). The combined organic extracts were dried over sodium sulfate, and concentrated in vacuo. The residue obtained was purified using preparative HPLC, eluting with acetonitrile:water (containing 1 mM ammonium carbonate)—35:65 to provide compound 12a. MS: m/z=484.05 [M+H]. $^1$H NMR (400 MHz, d$_6$-DMSO, ppm) δ 7.61 (s, 1H), 7.51 (s, 1H), 7.46-7.40 (m, 2H), 7.23 (d, J=8.4 Hz, 2H), 5.38 (s, 2H), 5.03-5.00 (m, 1H), 4.37 (t, J=8.4 Hz, 1H), 4.08-4.04 (m, 1H), 3.93 (dd, J=8.4, 5.6 Hz, 1H), 3.57-3.53 (m, 1H), 3.27-3.20 (m, 1H), 2.49 (s, 3H), 2.23-2.16 (m, 1H), 1.98-1.95 (m, 1H), 1.75-1.65 (m, 2H).

Step B—Synthesis of Compound 12

To a solution of compound 12a (240 mg, 0.48 mmol) in 1,4-dioxane (5.00 mL), and water (1.00 mL) under an atmosphere of argon, were added 1,1'-bis(di-tert-butylphosphino)ferrocene palladium dichloride (15.6 mg, 0.024 mmol), potassium phosphate (305 mg, 1.44 mmol), and 4-bromo-1-(difluoromethyl)-1H-1,2,3-triazole (142 mg, 0.72 mmol). The resulting reaction was heated to 85° C., and allowed to stir at this temperature for 2 hours. The resulting reaction was cooled to room temperature, diluted with saturated aqueous ammonium chloride (30 mL), and the resulting solution was extracted with ethyl acetate (3×40 mL). The combined organic extracts were dried over sodium sulfate, and concentrated in vacuo. The residue obtained was purified using preparative HPLC, eluting with a gradient of acetonitrile:water (containing 10 mM ammonium bicarbonate)—30:70 to 75:25 to provide compound 12. MS: m/z=557.2 [M+H]. $^1$H NMR (400 MHz, chloroform-d, ppm): δ 8.56 (s, 1H), 8.43 (s, 1H), 7.83-7.54 (m, 2H), 7.35-7.33 (m, 2H), 7.18 (d, J=8.4 Hz, 2H), 5.43-5.35 (m, 2H), 5.21 (s, 1H), 4.46-4.41 (m, 1H), 4.04-3.92 (m, 3H), 3.26-3.19 (m, 1H), 2.59 (s, 3H), 2.45-2.42 (m, 1H), 2.27-2.23 (m, 1H), 2.01-1.91 (m, 1H), 1.82-1.75 (m, 1H).

Example 13

Preparation of Compound 13

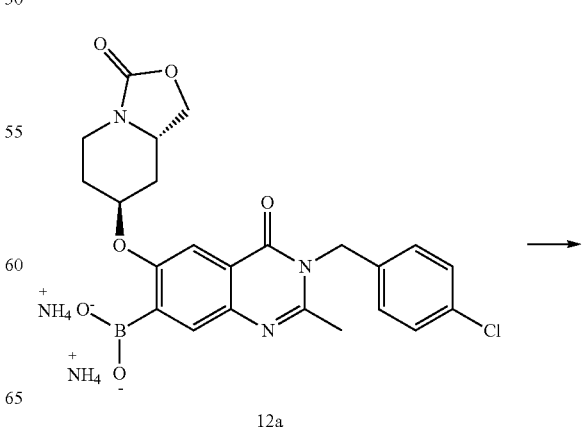

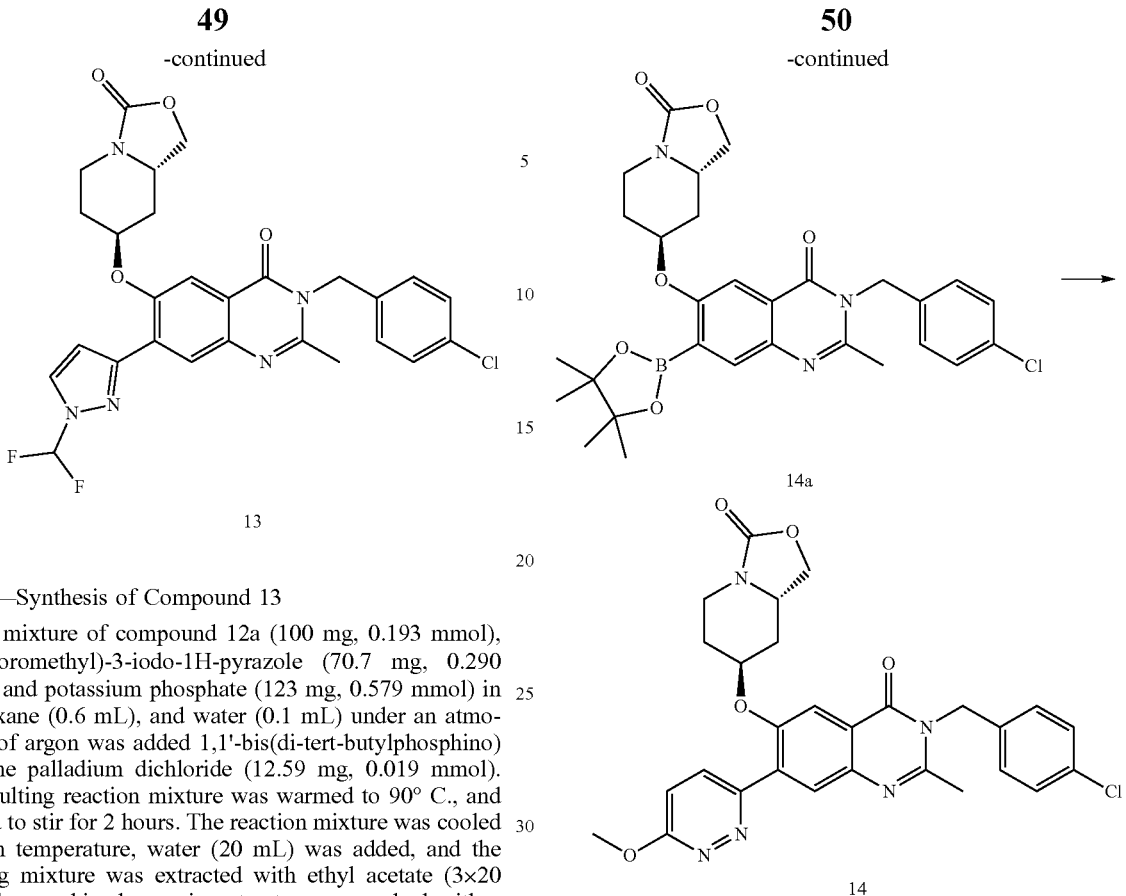

Step A—Synthesis of Compound 13

To a mixture of compound 12a (100 mg, 0.193 mmol), 1-(difluoromethyl)-3-iodo-1H-pyrazole (70.7 mg, 0.290 mmol), and potassium phosphate (123 mg, 0.579 mmol) in 1,4-dioxane (0.6 mL), and water (0.1 mL) under an atmosphere of argon was added 1,1'-bis(di-tert-butylphosphino) ferrocene palladium dichloride (12.59 mg, 0.019 mmol). The resulting reaction mixture was warmed to 90° C., and allowed to stir for 2 hours. The reaction mixture was cooled to room temperature, water (20 mL) was added, and the resulting mixture was extracted with ethyl acetate (3×20 mL). The combined organic extracts were washed with a saturated aqueous solution of sodium chloride (20 mL), dried over sodium sulfate, filtered, and the filtrate concentrated in vacuo. The residue obtained was purified using preparative HPLC, eluting with a gradient of acetonitrile:water (0.5% formic acid)—10:90 to 45:55 to provide compound 13. MS: m/z=556.1 [M+H]. $^1$H NMR (400 MHz, methanol-$d_4$, ppm): δ 8.16 (d, J=2.4 Hz, 1H), 8.06 (s, 1H), 7.74-7.45 (m, 2H), 7.35 (d, J=8.8 Hz, 2H), 7.22 (d, J=8.4 Hz, 2H), 7.04 (d, J=2.8 Hz, 1H), 5.40 (s, 2H), 5.11 (s, 1H), 4.41 (t, J=8.0 Hz, 1H), 4.09-4.05 (m, 1H), 3.97-3.93 (m, 1H), 3.71-3.67 (m, 1H), 3.32-3.20 (m, 1H), 2.53 (s, 3H), 2.35-2.32 (m, 1H), 2.14-2.12 (m, 1H), 1.88-1.72 (m, 2H).

Example 14

Preparation of Compound 14

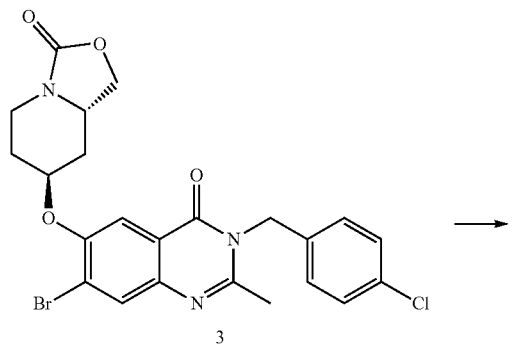

Step A—Synthesis of Compound 14a

To a mixture of compound 3 (10 g, 17.4 mmol), 4,4,4',4',5,5,5',5'-octamethyl-2,2'-bi(1,3,2-dioxaborolane) (5.29 g, 20.8 mmol), and potassium acetate (5.11 g, 52.0 mmol) in 1,4-dioxane (80 mL) at room temperature under an atmosphere of dinitrogen was added 1,1'-bis(di-tert-butylphosphino)ferrocene palladium dichloride (1.42 g, 1.74 mmol). The resulting reaction mixture was warmed to 110° C., and allowed to stir for 15 hours. The mixture was cooled to room temperature, water (150 mL) was added, and the resulting mixture was extracted with ethyl acetate (3×150 mL). The combined organic extracts were dried over sodium sulfate, filtered, and the filtrate was concentrated in vacuo. The residue obtained was purified using silica gel column chromatography, eluting with a gradient of ethyl acetate:hexanes—0:100 to 100:0 to provide compound 14a. MS: m/z=566.2 [M+H]. $^1$H NMR $^1$H NMR (400 MHz, chloroform-d, ppm) δ 8.03-8.11 (m, 1H), 7.60-7.65 (m, 1H), 7.28-7.33 (m, 2H), 7.13 (d, J=8.54 Hz, 2H), 5.34 (s, 2H), 5.05 (s, 1H), 4.33-4.41 (m, 2H), 3.89-3.96 (m, 1H), 3.77 (dd, $J_1$=13.4 Hz, $J_2$=5.0 Hz, 1H), 3.50-3.56 (m, 1H), 2.49-2.54 (m, 3H), 2.22-2.32 (m, 1H), 2.08-2.13 (m, 1H), 1.73-1.80 (m, 1H), 1.64-1.69 (m, 1H), 1.33-1.38 (m, 12H).

Step B—Synthesis of Compound 14

Using the methodology described in Example 12, step B, and using 3-bromo-6-methoxypyridazine in place of 4-bromo-1-(difluoromethyl)-1H-1,2,3-triazole and compound 14a in place of compound 12a, compound 14 was obtained. MS: m/z=548.2 [M+H]. $^1$H NMR $^1$H NMR (400 MHz, methanol-$d_4$, ppm) δ 8.02 (d, J=9.0 Hz, 1H), 7.86 (s, 1H), 7.74 (s, 1H), 7.31-7.39 (m, 2H), 7.25 (dd, $J_1$=18.4 Hz, $J_2$=9.0 Hz, 3H), 5.41 (s, 2H), 5.05 (br s, 1H), 4.36 (t, J=8.2 Hz, 1H), 4.14 (s, 3H), 3.90 (dd, $J_1$=6.1 Hz, $J_2$=8.4 Hz, 1H), 3.77-3.87 (m, 1H), 3.61 (dd, $J_1$=13.3 Hz, $J_2$=5.1 Hz, 1H), 2.97 (dt, $J_1$=13.1 Hz, J=3.1 Hz, 1H), 2.54 (s, 3H), 2.28 (br d, J=12.1 Hz, 1H), 2.00-2.10 (m, 1H), 1.64-1.84 (m, 2H).

Example 15

Preparation of Compound 15

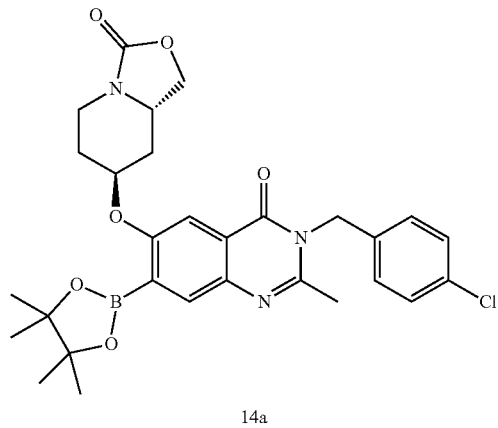

14a

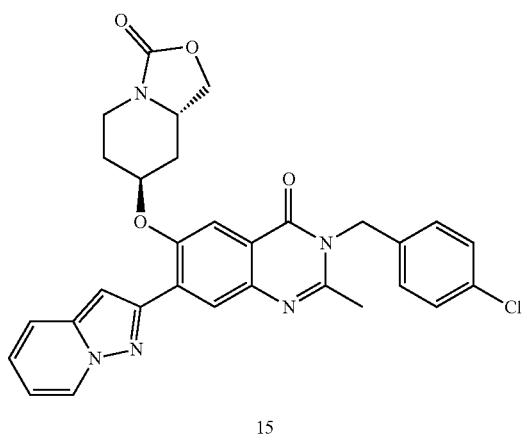

15

Using the methodology described in Example 12, step B, but using 2-bromopyrazolo[1,5-a]pyridine in place of 4-bromo-1-(difluoromethyl)-1H-1,2,3-triazole and compound 14a in place of compound 12a, compound 15 was obtained. MS: m/z=556.2 [M+H]. $^1$H NMR (400 MHz, chloroform-d, ppm) δ 8.63 (s, 1H), 8.12-8.19 (m, 2H), 7.76 (s, 1H), 7.66 (d, J=9.61 Hz, 1H), 7.29-7.35 (m, 2H), 7.20-7.25 (m, 1H), 7.16 (d, J=8.39 Hz, 2H), 6.84 (td, $J_1$=6.79 Hz, $J_2$=0.92 Hz, 1H), 5.31-5.40 (m, 2H), 5.21 (s, 1H), 4.38 (t, J=8.32 Hz, 1H), 3.97-4.07 (m, 1H), 3.87-3.95 (m, 2H), 3.40 (td, $J_1$=13.20 Hz, $J_2$=3.36 Hz, 1H), 2.53-2.58 (m, 3H), 2.44 (d, J=13.89 Hz, 1H), 2.26 (d, J=14.50 Hz, 1H), 1.90-1.98 (m, 1H), 1.67-1.76 (m, 1H).

Example 16

Preparation of Compound 16

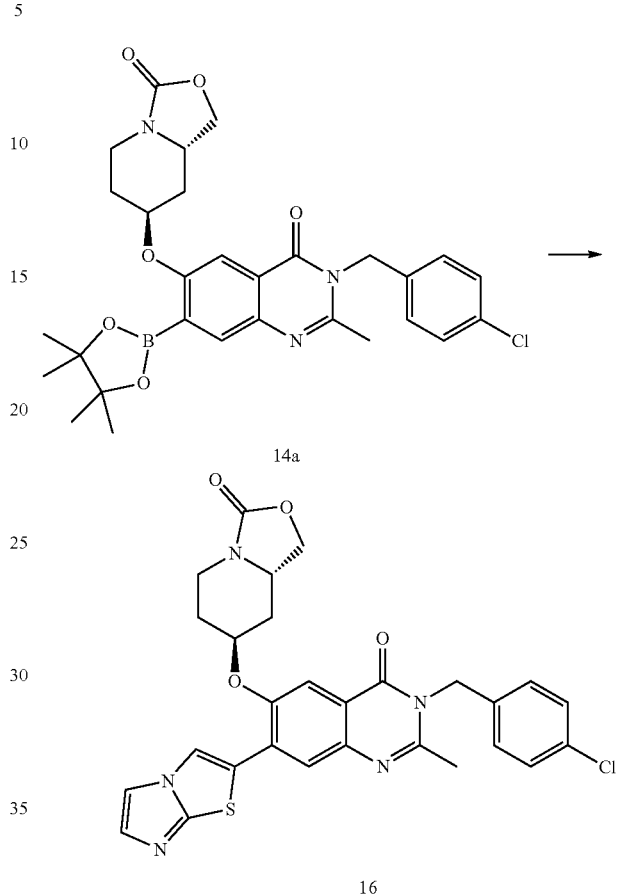

Using the methodology described in Example 12, step B, but using 2-bromoimidazo[2,1-b]thiazole in place of 4-bromo-1-(difluoromethyl)-1H-1,2,3-triazole and compound 14a in place of compound 12a, compound 16 was obtained. MS: m/z=562.8 [M+H]. $^1$H NMR (500 MHz, chloroform-d, ppm) δ 8.53 (s, 1H), 7.77-7.88 (m, 2H), 7.42 (s, 1H), 7.32 (d, J=8.39 Hz, 2H), 7.15 (d, J=8.39 Hz, 2H), 5.36 (s, 2H), 5.23 (s, 1H), 4.49 (t, J=8.24 Hz, 1H), 4.27-4.31 (m, 1H), 3.97 (dd, $J_1$=8.70 Hz, $J_2$=5.04 Hz, 1H), 3.90 (dd, $J_1$=13.81 Hz, $J_2$=5.26 Hz, 1H), 3.42 (td, $J_1$=13.28 Hz, $J_2$=3.20 Hz, 1H), 2.57 (s, 3H), 2.39 (d, J=13.89 Hz, 1H), 2.25 (d, J=14.65 Hz, 1H), 1.91-1.98 (m, 1H), 1.80-1.89 (m, 1H).

Example 17

Preparation of Compound 17

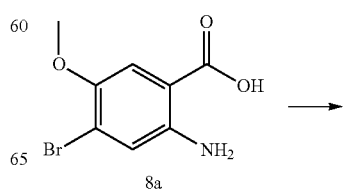

8a

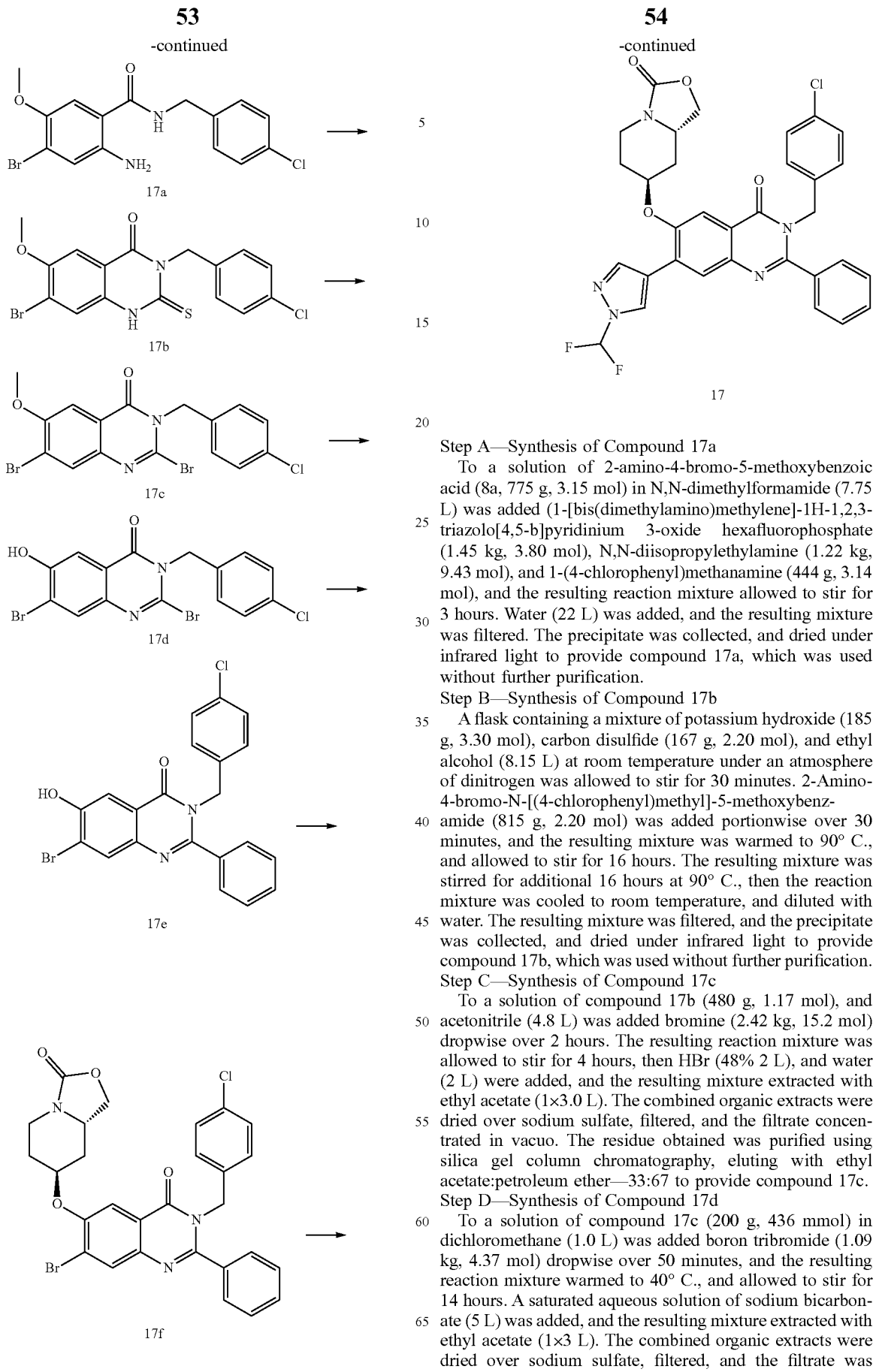

Step A—Synthesis of Compound 17a

To a solution of 2-amino-4-bromo-5-methoxybenzoic acid (8a, 775 g, 3.15 mol) in N,N-dimethylformamide (7.75 L) was added (1-[bis(dimethylamino)methylene]-1H-1,2,3-triazolo[4,5-b]pyridinium 3-oxide hexafluorophosphate (1.45 kg, 3.80 mol), N,N-diisopropylethylamine (1.22 kg, 9.43 mol), and 1-(4-chlorophenyl)methanamine (444 g, 3.14 mol), and the resulting reaction mixture allowed to stir for 3 hours. Water (22 L) was added, and the resulting mixture was filtered. The precipitate was collected, and dried under infrared light to provide compound 17a, which was used without further purification.

Step B—Synthesis of Compound 17b

A flask containing a mixture of potassium hydroxide (185 g, 3.30 mol), carbon disulfide (167 g, 2.20 mol), and ethyl alcohol (8.15 L) at room temperature under an atmosphere of dinitrogen was allowed to stir for 30 minutes. 2-Amino-4-bromo-N-[(4-chlorophenyl)methyl]-5-methoxybenz-amide (815 g, 2.20 mol) was added portionwise over 30 minutes, and the resulting mixture was warmed to 90° C., and allowed to stir for 16 hours. The resulting mixture was stirred for additional 16 hours at 90° C., then the reaction mixture was cooled to room temperature, and diluted with water. The resulting mixture was filtered, and the precipitate was collected, and dried under infrared light to provide compound 17b, which was used without further purification.

Step C—Synthesis of Compound 17c

To a solution of compound 17b (480 g, 1.17 mol), and acetonitrile (4.8 L) was added bromine (2.42 kg, 15.2 mol) dropwise over 2 hours. The resulting reaction mixture was allowed to stir for 4 hours, then HBr (48% 2 L), and water (2 L) were added, and the resulting mixture extracted with ethyl acetate (1×3.0 L). The combined organic extracts were dried over sodium sulfate, filtered, and the filtrate concentrated in vacuo. The residue obtained was purified using silica gel column chromatography, eluting with ethyl acetate:petroleum ether—33:67 to provide compound 17c.

Step D—Synthesis of Compound 17d

To a solution of compound 17c (200 g, 436 mmol) in dichloromethane (1.0 L) was added boron tribromide (1.09 kg, 4.37 mol) dropwise over 50 minutes, and the resulting reaction mixture warmed to 40° C., and allowed to stir for 14 hours. A saturated aqueous solution of sodium bicarbonate (5 L) was added, and the resulting mixture extracted with ethyl acetate (1×3 L). The combined organic extracts were dried over sodium sulfate, filtered, and the filtrate was concentrated in vacuo. The residue obtained was purified using silica gel column chromatography, eluting with ethyl acetate:petroleum ether—33:67 to provide compound 17d. MS: m/z=445 [M+H]. $^1$H NMR (300 MHz, dimethyl sulfoxide-$d_6$, ppm) δ 11.21 (s, 1H), 7.91 (s, 1H), 7.58 (s, 1H), 7.41 (d, J=8.4 Hz, 2H), 7.30 (d, J=8.4 Hz, 2H), 5.41 (s, 2H).

Step E—Synthesis of Compound 17e

To a solution of compound 17d in tetrahydrofuran (4 mL), and water (0.8 mL) under an atmosphere of dinitrogen was added sodium bicarbonate (94 mg, 1.13 mmol), phenylboronic acid (60.3 mg, 0.495 mmol), and tetrakis(triphenylphosphine) palladium(0) (52.0 mg, 0.045 mmol). The resulting reaction mixture was warmed to 80° C., and allowed to stir at this temperature for 3 hours. The reaction mixture was cooled to room temperature, water (4 mL) was added, and the resulting mixture extracted with ethyl acetate (3×5 mL). The combined organic extracts were dried over sodium sulfate, filtered, and the filtrate concentrated in vacuo. The residue obtained was purified using preparative HPLC, eluting with a gradient of acetonitrile:water (0.1% trifluoroacetic acid)—59:41 to 89:11 to provide compound 17e. MS: m/z=443.2 [M+H]. $^1$H NMR (300 MHz, methanol-$d_4$, ppm) δ 7.86-7.92 (m, 1H), 7.67 (s, 1H), 7.51 (d, J=7.3 Hz, 1H), 7.43 (t, J=7.6 Hz, 2H), 7.33-7.39 (m, 2H), 7.20 (d, J=8.6 Hz, 2H), 6.86 (d, J=8.3 Hz, 2H), 5.21 (s, 2H).

Step F—Synthesis of Compound 17f

To a solution of compound 17e (110 mg, 0.249 mmol), rac-(7R,8aS)-7-hydroxytetrahydro-1H-oxazolo[3,4-a]pyridin-3(5H)-one (58.7 mg, 0.374 mmol), and triphenylphosphine (144 mg, 0.548 mmol) in tetrahydrofuran (4 mL) was added di-tert-butyl azodicarboxylate (126 mg, 0.548 mmol). The resulting reaction mixture was warmed to 40° C., and allowed to stir at this temperature for 1 hour. The reaction mixture was cooled, water (10 mL) added, and the resulting mixture extracted with ethyl acetate (3×10 mL). The combined organic extracts were dried over sodium sulfate, filtered, and the filtrate concentrated in vacuo. The residue obtained was purified using silica gel column chromatography, eluting with a gradient of ethyl acetate:petroleum ether—10:90 to 25:75 to provide compound 17f. MS: m/z=582.0 [M+H]. $^1$H NMR (500 MHz, chloroform-d, ppm) δ 8.05 (s, 1H), 7.72 (s, 1H), 7.57-7.57 (m, 1H), 7.50 (s, 1H), 7.41-7.44 (m, 1H), 7.31-7.34 (m, 2H), 7.18 (d, J=8.39 Hz, 2H), 6.84 (d, J=8.39 Hz, 2H), 5.22 (s, 2H), 5.09 (s, 1H), 4.46 (t, J=8.32 Hz, 1H), 4.21-4.29 (m, 1H), 3.95 (dd, $J_1$=8.54 Hz, $J_2$=5.49 Hz, 1H), 3.84 (dd, $J_1$=13.50 Hz, $J_2$=5.11 Hz, 1H), 3.41 (td, $J_1$=13.16 Hz, $J_2$=3.28 Hz, 1H), 2.31 (d, J=15.26 Hz, 1H), 2.15 (d, J=14.50 Hz, 1H), 1.79-1.87 (m, 1H), 1.70-1.76 (m, 1H).

Step G—Synthesis of Compound 17

To a solution of compound 17f (90 mg, 0.16 mmol) in 1,4-dioxane (2 mL), and water (0.2 mL) under an atmosphere of dinitrogen was added [1,1'-bis(di-tert-butylphosphino) ferrocene]dichloropalladium(II) (10.1 mg, 0.015 mmol), potassium phosphate (65.8 mg, 0.310 mmol), and 1-(difluoromethyl)-4-(4,4,5,5-tetramethyl-1,3,2-dioxaborolan-2-yl)-1H-pyrazole (41.6 mg, 0.170 mmol). The resulting reaction mixture was warmed to 85° C., and allowed to stir at this temperature for 1 hour. The reaction mixture was cooled, water (10 mL) added, and the resulting mixture extracted with dichloromethane (3×10 mL). The combined organic extracts were dried over sodium sulfate, filtered, and the filtrate concentrated in vacuo. The residue obtained was purified using preparative HPLC, eluting with a gradient of acetonitrile:water (0.1% trifluoroacetic acid)—53:47 to 83:17 to provide compound 17. MS: m/z=618.0 [M+H].

$^1$H NMR (400 MHz, chloroform-d, ppm) δ 8.26 (s, 1H), 8.05 (s, 1H), 7.92 (s, 1H), 7.78 (s, 1H), 7.26-7.53 (m, 5H), 7.07-7.23 (m, 2H), 6.85 (d, J=8.31 Hz, 2H), 5.23 (s, 2H), 5.15 (s, 1H), 4.36-4.46 (m, 1H), 3.79-4.01 (m, 3H), 3.10-3.23 (m, 1H), 2.37 (d, J=13.45 Hz, 1H), 2.20 (d, J=14.18 Hz, 1H), 1.85-1.93 (m, 1H), 1.75-1.80 (m, 1H).

Example 18

Preparation of Compound 18

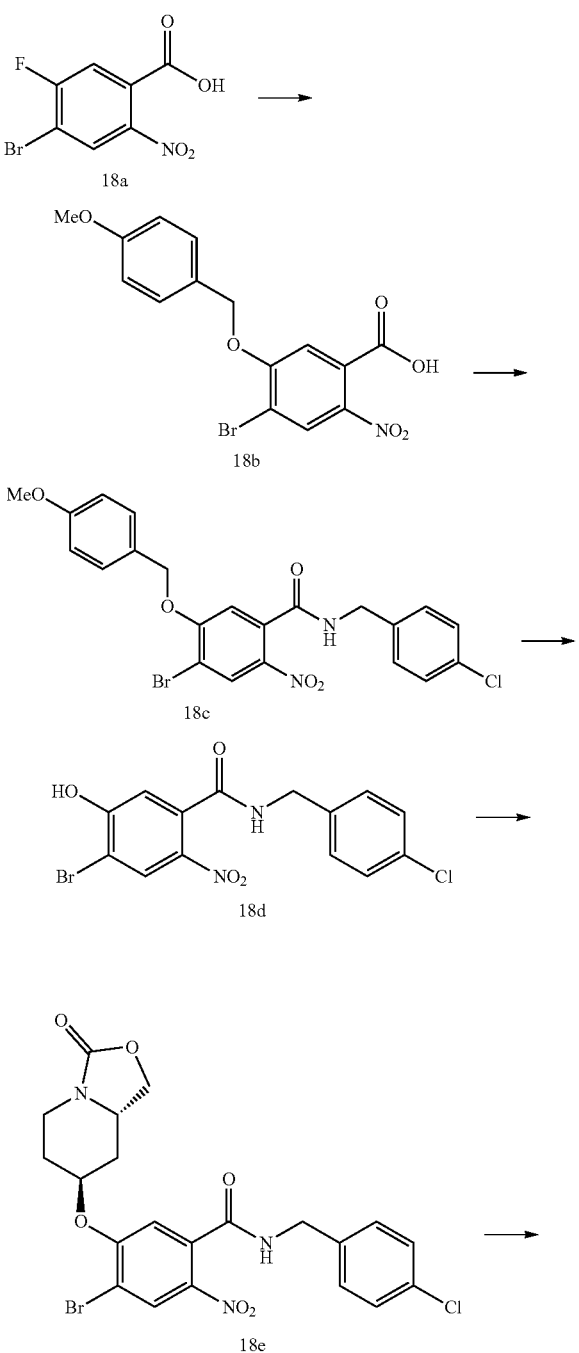

-continued

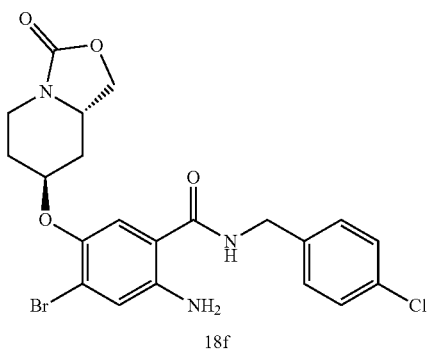

18f

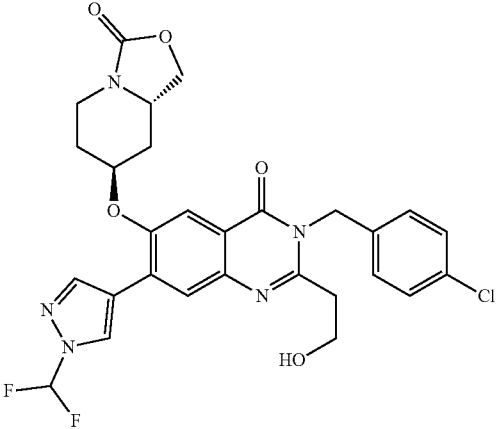

18

18g

18h

Step A—Synthesis of Compound 18b

To a solution of (4-methoxyphenyl)methanol (15.7 g, 114 mmol) in N,N-dimethylformamide (200 mL) at 0° C. under an atmosphere of dinitrogen was added sodium hydride (60% dispersion in mineral oil, 4.54 g, 114 mmol). The resulting reaction mixture was allowed to stir for 20 min and then 4-bromo-5-fluoro-2-nitrobenzoic acid (15 g, 56.8 mmol) was added portionwise. The resulting reaction mixture was allowed to warm to 20° C., and stir at this temperature for 2 hours. The reaction mixture was mixture was diluted with water (50 mL), and the resulting mixture extracted with ethyl acetate (2×50 mL). The aqueous layer was acidified to pH 2 by addition of an aqueous solution of HCl (2 N), and then extracted with ethyl acetate (3×50 mL). The combined organic extracts were dried over sodium sulfate, filtered, and the filtrate concentrated in vacuo to provide compound 18b. $^1$H NMR (400 MHz, methanol-$d_4$, ppm) δ 8.21-8.28 (m, 1H), 7.36-7.44 (m, 3H), 6.90-6.97 (m, 2H), 5.22 (s, 2H), 3.79 (s, 3H).

Step B—Synthesis of Compound 18c

To a solution of compound 18b (21.7 g, 56.8 mmol) in N,N-dimethylformamide (300 mL) was added N-ethyl-N-isopropylpropan-2-amine (29.8 mL, 170 mmol), and (1-[bis(dimethylamino)methylene]-1H-1,2,3-triazolo[4,5-b]pyridinium 3-oxide hexafluorophosphate (25.9 g, 68.1 mmol), and the resulting reaction mixture allowed to stir for 10 minutes. (4-Chlorophenyl)methanamine (9.65 g, 68.1 mmol) was added, and the resulting reaction mixture allowed to stir for 2 hours. Water (100 mL) was added, and the resulting mixture was filtered, and the precipitate collected was dried to provide compound 18c, which was used without further purification. MS: m/z=528.5 [M+Na].

Step C—Synthesis of Compound 18d

To a solution of compound 18c (28.7 g, 56.7 mmol) in 1,4-dioxane (100 mL) was added a solution of hydrogen chloride in 1,4-dioxane (100 mL, 400 mmol, 4 M). The resulting reaction mixture was warmed to 40° C., and allowed to stir at this temperature for 2 hours. The reaction mixture was cooled, and concentrated in vacuo, and the residue obtained was purified using silica gel column chromatography, eluting with a gradient of ethyl acetate:petroleum ether—0:100 to 50:50 to provide compound 18d. MS: m/z=387.0 [M+H]. $^1$H NMR (400 MHz, methanol-$d_4$, ppm) δ 8.35 (s, 1H), 7.27-7.46 (m, 4H), 6.92 (s, 1H), 4.42-4.58 (m, 2H).

Step D—Synthesis of Compound 18e

To a solution of compound 18d (11.6 g, 30.1 mmol), and (7R,8aS)-7-hydroxytetrahydro-1H-oxazolo[3,4-a]pyridin-3(5H)-one (Int-1, 7.09 g, 45.1 mmol) in tetrahydrofuran (300 mL) under an atmosphere of dinitrogen was added triphenylphosphine (17.4 g, 66.2 mmol), and di-tert-butyl diazene-1,2-dicarboxylate (15.2 g, 66.2 mmol). The resulting reaction mixture was warmed to 40° C., and allowed to stir at this temperature for 12 hours. The reaction mixture was cooled, and filtered, and the collected solid was washed with tetrahydrofuran (3×50 mL) to provide compound 18e, which was used without further purification. MS: m/z=526.0 [M+H].

$^1$H NMR (400 MHz, dimethyl sulfoxide-$d_6$, ppm) δ 9.13 (t, J=5.7 Hz, 1H), 8.36 (s, 1H), 7.40 (d, J=2.3 Hz, 5H), 5.28 (br s, 1H), 4.31-4.49 (m, 3H), 4.00 (br d, J=5.5 Hz, 1H), 3.82-3.93 (m, 1H), 3.53-3.66 (m, 1H), 3.09-3.21 (m, 1H), 2.14 (br d, J=14.1 Hz, 1H), 1.93 (br d, J=14.1 Hz, 1H), 1.65-1.79 (m, 2H).

Step E—Synthesis of Compound 18f

To a solution of compound 18e (10 g, 19.1 mmol) in tetrahydrofuran (150 mL), methanol (50 mL), and water (50 mL) was added iron (4.26 g, 76 mmol), and ammonium chloride (4.08 g, 76 mmol). The resulting reaction mixture was warmed to 60° C., and allowed to stir at this temperature for 2 hours. The reaction mixture was cooled, and filtered, and the filtrate concentrated in vacuo. Water (50 mL) was added, the aqueous layer adjusted to pH 9 by addition of a saturated aqueous solution of sodium bicarbonate, and the resulting mixture extracted with ethyl acetate (3×50 mL). The combined organic extracts were dried over sodium sulfate, filtered, and the filtrate concentrated in vacuo to provide compound 18f. MS: m/z=494.0, 496.0 [M+H]. $^1$H NMR (400 MHz, methanol-$d_4$, ppm) δ 7.33 (s, 4H), 7.23 (s, 1H), 7.04 (s, 1H), 4.76 (br s, 1H), 4.42-4.52 (m, 3H), 4.19-4.32 (m, 1H), 3.96 (dd, $J_1$=5.5, $J_2$=8.6 Hz, 1H), 3.68 (dd, $J_1$=5.5, $J_2$=13.3 Hz, 1H), 3.44 (dt, J=3.3, 13.0 Hz, 1H), 2.23 (br d, J=14.1 Hz, 1H), 1.55-1.80 (m, 2H).

Step F—Synthesis of Compound 18g

To a solution of compound 18f (4.6 g, 9.3 mmol), and 1-(difluoromethyl)-4-(4,4,5,5-tetramethyl-1,3,2-dioxaborolan-2-yl)-1H-pyrazole (2.50 g, 10.2 mmol) in 1,4-dioxane (75 mL), and water (15 mL) under an atmosphere of dinitrogen was added tribasic potassium phosphate (3.95 g, 18.6 mmol), and [1,1-bis(di-tert-butylphosphino)ferrocene]dichloropalladium(II) (0.606 g, 0.930 mmol). The resulting reaction mixture was warmed to 90° C., and allowed to stir at this temperature for 2 hours. The reaction mixture was cooled, water (80 mL) was added, and the resulting mixture was extracted with ethyl acetate (3×50 mL). The combined organic extracts were dried over sodium sulfate, filtered, and the filtrate concentrated in vacuo. The residue obtained was purified using silica gel column chromatography, eluting with a gradient of ethyl acetate:petroleum ether—0:100 to 50:50 to provide compound 18g. MS: m/z=532.2 [M+H].

$^1$H NMR (400 MHz, chloroform-d, ppm) δ 8.13 (s, 1H), 7.94 (s, 1H), 7.25-7.45 (m, 6H), 6.78-7.22 (m, 3H), 6.56 (br s, 1H), 5.07 (s, 2H), 4.69 (br s, 1H), 4.59 (d, J=5.9 Hz, 2H), 4.26-4.43 (m, 1H), 3.78-3.93 (m, 2H), 3.72 (dd, $J_1$=5.3 Hz, $J_2$=13.1 Hz, 1H), 3.06 (dt, $J_1$=3.5 Hz, $J_2$=13.3 Hz, 1H), 2.12 (br d, J=14.1 Hz, 1H), 1.98 (br d, J=14.5 Hz, 1H).

Step G—Synthesis of Compound 18h

To a solution of compound 18g (200 mg, 0.376 mmol), and 3-hydroxypropanoic acid (40.6 mg, 0.451 mmol) in pyridine (3 mL) was added N-(3-dimethylaminopropyl)-N'-ethylcarbodiimide hydrochloride (144 mg, 0.752 mmol), and the resulting reaction mixture was allowed to stir for 12 hours. Water (10 mL) was added, and the resulting mixture extracted with dichloromethane (3×10 mL). The combined organic extracts were dried over sodium sulfate, filtered, and the filtrate concentrated in vacuo. The residue obtained was purified using silica gel column chromatography, eluting with a gradient of ethyl acetate:petroleum ether—0:100 to 80:20 to provide compound 18h. MS: m/z=604.1 [M+H].

Step H—Synthesis of Compound 18

To a solution of compound 18h (90 mg, 0.149 mmol) in N,N-dimethylformamide (1.5 mL) under an atmosphere of dinitrogen was added bis(trimethylsilyl)amine (0.094 mL, 0.447 mmol), and zinc chloride (10.2 mg, 0.075 mmol). The resulting reaction mixture was warmed to 90° C., and allowed to stir at this temperature for 5 hours. The reaction mixture was cooled, water (5 mL) added, and the resulting mixture extracted with ethyl acetate (3×5 mL). The combined organic extracts were dried over sodium sulfate, filtered, and the filtrate concentrated in vacuo. The residue obtained was purified using preparative HPLC, eluting with a gradient of acetonitrile:water (0.05% ammonium hydroxide and 10 mM ammonium carbonate)—35:65 to 65:35 to provide compound 18. MS: m/z=586.2 [M+H]. $^1$H NMR (400 MHz, chloroform-d, ppm) δ 8.57 (s, 1H), 8.25 (s, 1H), 7.92 (s, 1H), 7.77 (s, 1H), 7.44-7.75 (m, 1H), 7.35 (d, J=8.2 Hz, 2H), 7.21 (d, J=8.6 Hz, 2H), 5.47 (s, 2H), 5.15 (br s, 1H), 4.36-4.48 (m, 1H), 3.92-4.07 (m, 4H), 3.73 (dd, $J_1$=5.3 Hz, $J_2$=12.7 Hz, 1H), 3.07-3.25 (m, 1H), 2.98 (t, J=6.1 Hz, 2H), 2.39 (br d, J=12.9 Hz, 1H), 2.17 (br d, J=14.9 Hz, 1H), 1.72-1.95 (m, 2H).

Example 19

Preparation of Compound 19

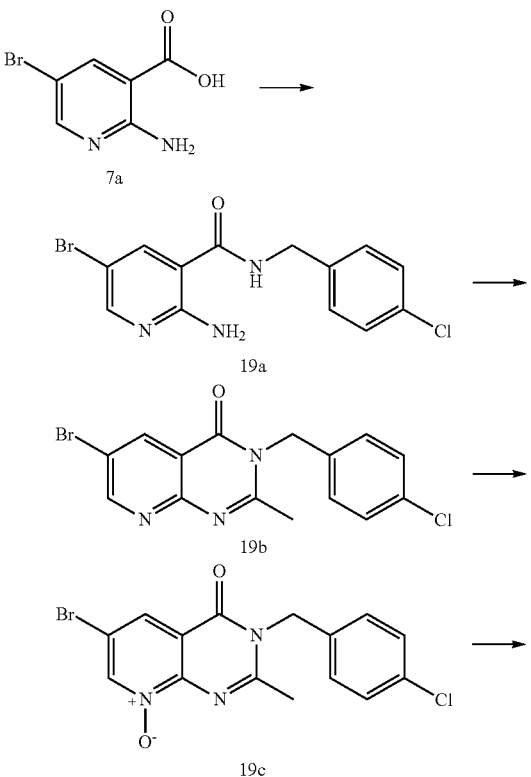

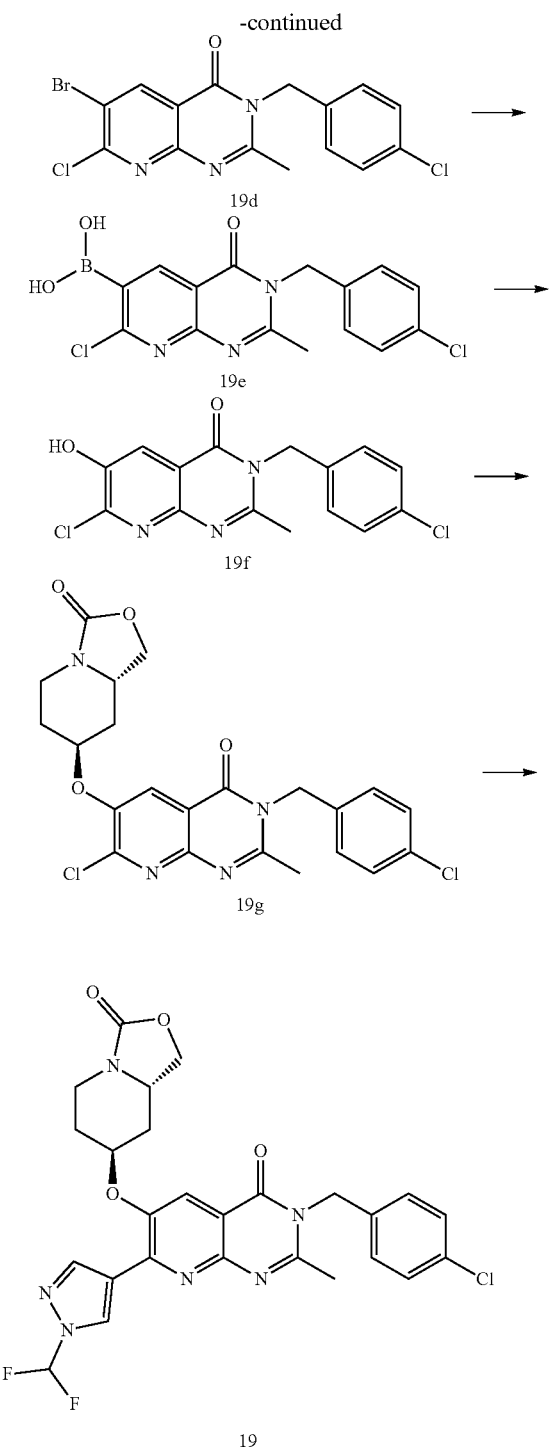

Step A—Synthesis of Compound 19a

To a solution of 2-amino-5-bromonicotinic acid (7a, 500 g, 2.30 mol), and (4-chlorophenyl)methanamine (343 g, 2.42 mol) in acetonitrile (2.50 L) was added N,N-diisopropylethylamine (602 mL, 3.46 mol). A solution of propylphosphonic anhydride in ethyl acetate (50% w/w, 1.44 L, 2.42 mol) was added dropwise and the resulting reaction mixture allowed to stir for 3 hours. Water (400 mL) was added, and the resulting mixture was allowed to stir for 10 min and then filtered. The precipitate was collected, washed with water, and dried in vacuo to provide compound 19a, which was used without further purification. MS: m/z=340.0 [M+H]. $^1$H NMR (400 MHz, chloroform-d, ppm) δ 9.11 (br t, J=5.6 Hz, 1H), 8.17 (s, 2H), 7.37-7.43 (m, 2H), 7.32-7.37 (m, 2H), 7.28 (br s, 2H), 4.42 (d, J=5.6 Hz, 2H).

Step B—Synthesis of Compound 19b

To a solution of compound 19a (250 g, 734 mmol) in triethyl orthoacetate (2.52 L) at 15° C. under an atmosphere of dinitrogen was added an aqueous solution of HCl (12.2 mL, 12 M, 144 mmol), and the resulting reaction mixture was warmed to 140° C., and allowed to stir at this temperature for 48 hours. The reaction mixture was cooled to 15° C., and filtered. The collected solide was dried to proved compound 19b, which was used without further purification. MS: m/z=364.0 [M+H]. $^1$H NMR (400 MHz, dimethyl sulfoxide-$d_6$, ppm) δ 9.06 (d, J=2.8 Hz, 1H), 8.66 (d, J=2.8 Hz, 1H), 7.38-7.45 (m, 2H), 7.29 (d, J=8.4 Hz, 2H), 5.36 (s, 2H), 2.53 (s, 3H).

Step C—Synthesis of Compound 19c

To a solution of compound 19b (200 g, 549 mmol) in trifluoroacetic acid (1.0 L) was added an aqueous solution of hydrogen peroxide (105 mL, 30% w/w, 1.10 mol) dropwise and the resulting reaction mixture allowed to stir for 16 hours. The pH of the reaction mixture was adjusted to ~8 by addition of an aqueous solution of potassium carbonate. The resulting mixture was filtered, and the precipitate was collected, and dried to provide compound 19c, which was used without further purification. MS: m/z=379.9 [M+H]. $^1$H NMR (400 MHz, dimethyl sulfoxide-$d_6$, ppm) δ 9.01 (d, J=2.0 Hz, 1H), 8.03 (d, J=2.0 Hz, 1H), 7.38-7.46 (m, 2H), 7.31 (d, J=8.4 Hz, 2H), 5.35 (s, 2H), 2.54 (s, 3H).

Step D—Synthesis of Compound 19d

To a solution of compound 19c (256 g, 673 mmol), and triethylamine (187 mL, 1.35 mol) in dichloromethane (1.25 L) under an atmosphere of dinitrogen at −40° C. was added oxalyl dichloride (88.3 mL, 1.01 mol) dropwise and the resulting reaction mixture allowed to warm to room temperature and stir at this temperature for 4 hours. The reaction mixture was cooled to 5° C., and water (3.0 L), and dichloromethane (2.0 L) were added. The organic layer was washed with water (3×2.0 L), dried over sodium sulfate, filtered, and the filtrate concentrated in vacuo.

The residue obtained was purified using silica gel column chromatography, eluting with a gradient of ethyl acetate:petroleum ether—25:75 to 50:50 to provide compound 19d. MS: m/z=397.9 [M+H]. $^1$H NMR (400 MHz, dimethyl sulfoxide-$d_6$, ppm) δ 8.72-8.87 (m, 1H), 7.33-7.39 (m, 2H), 7.16 (d, J=8.4 Hz, 2H), 5.35 (s, 2H), 2.64 (s, 3H).

Step E—Synthesis of Compound 19e

To a solution of compound 19d (118 g, 296 mmol), and bis(pinacolato)diboron (113 g, 444 mmol) in 1,4-dioxane (1.18 L) under an atmosphere of dinitrogen was added potassium acetate (58.0 g, 591 mmol), and [1,1'-bis(diphenylphosphino)ferrocene]dichloropalladium(II) (38.9 g, 53.2 mmol), and the resulting reaction mixture warmed to 110° C., and allowed to stir at this temperature for 16 hours. The reaction mixture was cooled, and concentrated in vacuo. Dichloromethane (4.0 L) was added, and the resulting mixture washed with water (2×3.0 L). The organic layer was concentrated in vacuo to provide compound 19e, which was used without further purification. MS: m/z=364.0 [M+H].

Step F—Synthesis of Compound 19f

To a solution of compound 19e (247 g, 679 mmol), and pyridine (26.8 g, 339 mmol) in tetrahydrofuran (2.25 L) at 0° C. was added an aqueous solution of hydrogen peroxide (78.2 mL, 30% w/w, 814 mmol) dropwise and the resulting reaction mixture allowed to warm to room temperature and stir at this temperature for 16 hours. A saturated aqueous solution of sodium sulfite (5.0 L), and dichloromethane (3.0 L) were added, and the layers separated. The organic layer was washed with water (2×2.0 L), and concentrated in vacuo. The residue obtained was purified using silica gel column chromatography, eluting with a gradient of ethyl acetate:petroleum ether—10:90 to 50:50. The product containing fractions were combined and concentrated in vacuo. To the resulting residue was added dichloromethane (333 mL), and methanol (167 mL), and the resulting mixture filtered, and the filtrate concentrated in vacuo. The resulting residue was crystallized from dichloromethane (200 mL), and methanol (100 mL) to provide compound 19f. MS: m/z=336.0 [M+H]. $^1$H NMR (400 MHz, dimethyl sulfoxide-d$_6$, ppm) δ 11.44 (br s, 1H), 7.84 (s, 1H), 7.38 (d, J=8.4 Hz, 2H), 7.23 (d, J=8.4 Hz, 2H), 5.31 (s, 2H), 2.48 (s, 3H).

Step G—Synthesis of Compound 19g

To a solution of compound 19f (200 mg, 0.595 mmol), and (7R,8aS)-7-hydroxyhexahydro-3H-oxazolo[3,4-a]pyridin-3-one (Int-1, 140 mg, 0.892 mmol) in tetrahydrofuran (10 mL) under an atmosphere of dinitrogen was added triphenylphosphine (343 mg, 1.31 mmol), and di-tert-butyl azodicarboxylate (301 mg, 1.31 mmol). The resulting reaction mixture was warmed to 40° C., and allowed to stir at this temperature for 2 hours. The reaction mixture was cooled, and concentrated in vacuo. The residue obtained was purified using silica gel column chromatography, eluting with a gradient of ethyl acetate:petroleum ether—0:100 to 30:70 to provide compound 19g. MS: m/z=475.1 [M+H].

Step H—Synthesis of Compound 19

To a solution of compound 19g (200 mg, 0.421 mmol), and 1-(difluoromethyl)-4-(4,4,5,5-tetramethyl-1,3,2-dioxaborolan-2-yl)-1H-pyrazole (123 mg, 0.505 mmol) in 1,4-dioxane (10 mL), and water (2 mL) under an atmosphere of dinitrogen was added tribasic potassium phosphate (268 mg, 1.26 mmol), and [1,1-bis(di-tert-butylphosphino)ferrocene]dichloropalladium(II) (27.4 mg, 0.042 mmol). The resulting reaction mixture was warmed to 90° C., and allowed to stir at this temperature for 1 hour. The reaction mixture was cooled, water (10 mL) was added, and the resulting mixture extracted with ethyl acetate (3×10 mL). The combined organic extracts were dried over sodium sulfate, filtered, and the filtrate concentrated in vacuo. The residue obtained was purified using preparative HPLC, eluting with a gradient of acetonitrile:water (0.05% ammonium hydroxide and 10 mM ammonium carbonate)—35:65 to 65:35 to provide compound 19. MS: m/z=557.2 [M+H]. $^1$H NMR (500 MHz, chloroform-d, ppm) δ 8.59-8.72 (m, 1H), 8.44 (s, 1H), 7.85-8.05 (m, 1H), 7.32 (s, 1H), 7.25 (d, J=8.5 Hz, 1H), 7.16-7.22 (m, 1H), 7.03-7.10 (m, 2H), 5.29 (s, 2H), 5.22 (s, 1H), 5.07 (br s, 1H), 4.38 (t, J=8.2 Hz, 1H), 3.94-4.04 (m, 1H), 3.81-3.92 (m, 2H), 3.20 (dt, J=3.4, 13.4 Hz, 1H), 2.57 (s, 3H), 2.30 (br dd, J$_1$=1.7, J$_2$=14.0 Hz, 1H), 2.15 (br d, J=14.6 Hz, 1H), 1.83-1.95 (m, 1H), 1.68-1.80 (m, 1H).

Example 20

Preparation of Compound 20

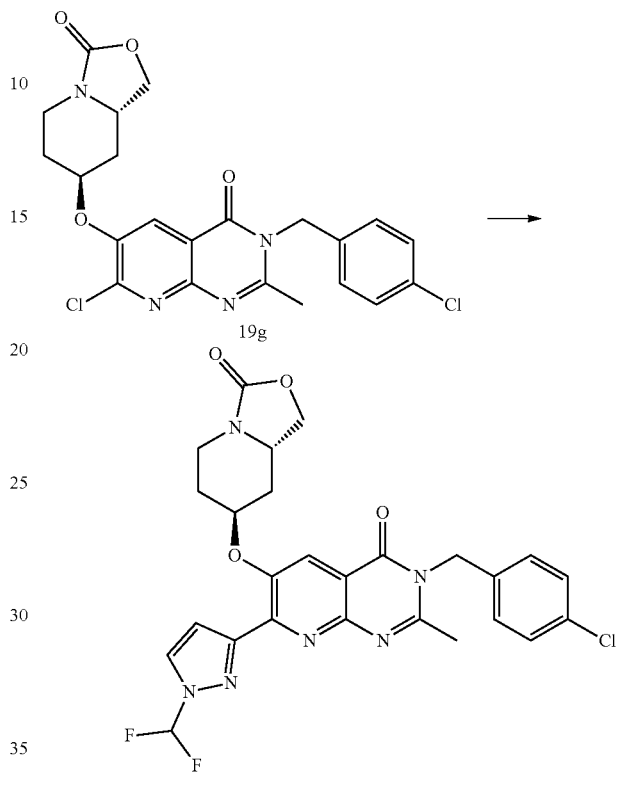

To a solution of compound 19g (200 mg, 0.421 mmol), and 1-(difluoromethyl)-3-(4,4,5,5-tetramethyl-1,3,2-dioxaborolan-2-yl)-1H-pyrazole (205 mg, 0.842 mmol) in 1,4-dioxane (10 mL), and water (2 mL) under an atmosphere of dinitrogen were added tribasic potassium phosphate (268 mg, 1.26 mmol), and [1,1-bis(di-tert-butylphosphino)ferrocene]dichloropalladium(II) (30 mg, 0.046 mmol). The resulting reaction mixture was warmed to 90° C., and allowed to stir at this temperature for 18 hours. The reaction mixture was cooled, water (10 mL) added, and the resulting mixture was extracted with ethyl acetate (20 mL). The combined organic extracts were washed with water (10 mL), dried over sodium sulfate, filtered, and the filtrate concentrated in vacuo. The residue obtained was purified using preparative HPLC, eluting with a gradient of acetonitrile:water (0.1% ammonium carbonate)—33:67 to 63:37 to provide compound 19. MS: m/z=557.3 [M+H]. $^1$H NMR (400 MHz, chloroform-d, ppm) δ 8.06 (s, 1H) 7.89 (d, J=2.4 Hz, 1H) 7.28-7.34 (m, 2H) 7.38 (s, 1H) 7.21-7.26 (m, 1H) 7.07-7.16 (m, 2H) 5.35 (s, 2H) 5.11 (br s, 1H) 4.38-4.47 (m, 1H) 4.25-4.35 (m, 1H) 3.90-4.00 (m, 1H) 3.80 (dd, J$_1$=13.3 Hz, J$_2$=5.0 Hz, 1H) 3.46 (td, J$_1$=13.0 Hz, J$_2$=3.2 Hz, 1H) 2.62 (s, 3H) 2.27 (br J=12.2 Hz, 1H) 2.11 (br d, J=14.4 Hz, 1H) 1.79-1.93 (m, 1H) 1.71-1.77 (m, 1H) 1.60 (s, 2H).

Using the methods described in the Examples above, and substituting the appropriate reactants and reagents, the following compounds of the present invention were made:

| Compound | Structure | Stereochemistry Comment | m/z |
|---|---|---|---|
| 21 | | | 368.3 |
| 22 | | | 411.2 |
| 23 | | S,S | 425.2 |
| 24 | | S,S | 426.1 |
| 25 | | S,S | 426.2 |

-continued

| Compound | Structure | Stereochemistry Comment | m/z |
|---|---|---|---|
| 26 | | S,S | 439.2 |
| 27 | | S,S | 541.2 |
| 28 | | S,S | 427.1 |
| 29 | | S,S | 455.2 |

-continued
| Compound | Structure | Stereochemistry Comment | m/z |
|---|---|---|---|
| 30 | 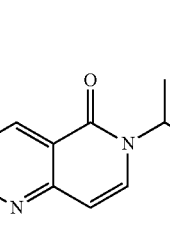 | Single isomer | 440.2 |
| 31 | 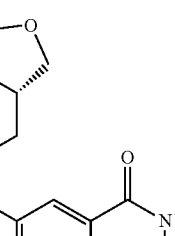 | S,S | 542.3 |
| 32 |  | S,S | 496.1 |
| 33 | 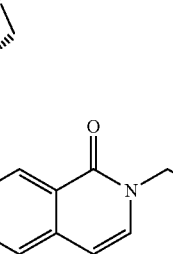 | Single isomer | 484.1 |

-continued

| Compound | Structure | Stereochemistry Comment | m/z |
|---|---|---|---|
| 34 | | S,S | 498.2 |
| 35 | | Single isomer | 426.4 |
| 36 | | S,S | 542.3 |
| 37 | | S,S | 534.3 (M + CH$_3$CN) |

| Compound | Structure | Stereochemistry Comment | m/z |
|---|---|---|---|
| 38 | | S,S | 493.3 |
| 39 | | S,S | 456.1 |
| 40 | | S,S | 440.2 |
| 41 | | S,S | 451.37 |

-continued

| Compound | Structure | Stereochemistry Comment | m/z |
|---|---|---|---|
| 42 | | S,S | 493.27 |
| 43 | | R | 453.3 |
| 44 | | Single isomer | 439.2 |
| 45 | | S,S | 498.3 |

-continued

| Compound | Structure | Stereochemistry Comment | m/z |
|---|---|---|---|
| 46 | | S,S | 456.2 |
| 47 | | Single isomer | 400.2 |
| 48 | | S,S | 498.31 |
| 49 | | S,S | 466.2 |

-continued

| Compound | Structure | Stereochemistry Comment | m/z |
|---|---|---|---|
| 50 | | R | 499.2 |
| 51 | | S,S | 507.1 |
| 52 | | S,S | 520.3 |
| 53 | | S,S | 506.3 |

-continued

| Compound | Structure | Stereochemistry Comment | m/z |
|---|---|---|---|
| 54 | | S,S | 517.3 |
| 55 | | R | 455.2 |
| 56 | | S,S | 465.1 |
| 57 | | S,S | 533.2 |

-continued

| Compound | Structure | Stereochemistry Comment | m/z |
|---|---|---|---|
| 58 | | S,S | 456.1 |
| 59 | | S,S | 431.2 |
| 60 | | S,S | 498.4 |
| 61 | | Single isomer | 510.1 |

-continued

| Compound | Structure | Stereochemistry Comment | m/z |
|---|---|---|---|
| 62 | | Single isomer | 510.1 |
| 63 | | R | 431.1 |
| 64 | | S,S | 565.1 |
| 65 | | S,S | 512.3 |

-continued

| Compound | Structure | Stereochemistry Comment | m/z |
|---|---|---|---|
| 66 | | S,S | 565.2 |
| 67 | | S,S | 512.1 |
| 68 | | S,S | 445.3 |
| 69 | | S,S | 441.3 |

-continued

| Compound | Structure | Stereochemistry Comment | m/z |
|---|---|---|---|
| 70 | | S,S | 527.1 |
| 71 | | S,S | 594.2 |
| 72 | | S,S | 501.2 |

-continued

| Compound | Structure | Stereochemistry Comment | m/z |
|---|---|---|---|
| 73 | | S,S | 552.3 |
| 74 | | S,S | 515.3 |
| 75 | | S,S | 539.2 |
| 76 | | S,S | 565.1 |

| Compound | Structure | Stereochemistry Comment | m/z |
|---|---|---|---|
| 77 | | Single isomer | 524.05 |
| 78 | | S,S | 562.0 |
| 79 | | S,S | 575.0 |
| 80 | | S,S | 547.10 |

| Compound | Structure | Stereochemistry Comment | m/z |
|---|---|---|---|
| 81 | | S,S | 576.5 |
| 82 | | S,S | 556.00 |
| 83 | | Single isomer | 500.2 |
| 84 | | S,S | 561.1 |

-continued

| Compound | Structure | Stereochemistry Comment | m/z |
|---|---|---|---|
| 85 | | Single isomer | 501.3 |
| 86 | | S,S | 575.2 |
| 87 | | S,S | 566.2 |
| 88 | | S,S | 548.2 |

| Compound | Structure | Stereochemistry Comment | m/z |
|---|---|---|---|
| 89 | | S,S | 557.2 |
| 90 | | S,S | 532.2 |
| 91 | | S,S | 557.1 |

-continued

| Compound | Structure | Stereochemistry Comment | m/z |
|---|---|---|---|
| 92 | | S,S | 570.1 |
| 93 | | S,S | 562.2 |
| 94 | | S,S | 548.2 |

-continued

| Compound | Structure | Stereochemistry Comment | m/z |
|---|---|---|---|
| 95 | | S,S | 558.2 |
| 96 | | S,S | 557.1 |
| 97 | | S,S | 603.1 |

-continued

| Compound | Structure | Stereochemistry Comment | m/z |
|---|---|---|---|
| 98 | | S,S | 562.1 |
| 99 | | S,S | 556.1 |
| 100 | | S,S | 557.21 |
| 101 | | S,S | 558.2 |

-continued
| Compound | Structure | Stereochemistry Comment | m/z |
|---|---|---|---|
| 102 | 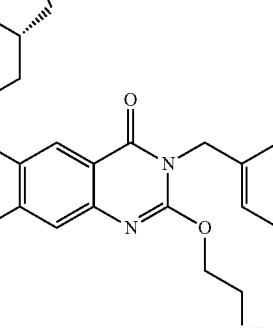 | S,S | 602.1 |
| 103 | 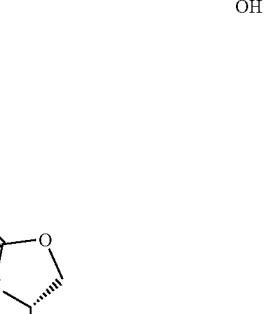 | S,S | 558.0 |
| 104 | 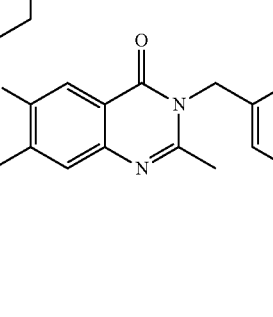 | S,S | 556.0 |

| Compound | Structure | Stereochemistry Comment | m/z |
|---|---|---|---|
| 105 | | S,S | 557.2 |
| 106 | | S,S | 567.1 |
| 107 | | S,S | 557.2 |

-continued

| Compound | Structure | Stereochemistry Comment | m/z |
|---|---|---|---|
| 108 | | S,S | 645.2 |
| 109 | | S,S | 618.1 |
| 110 | | S,S | 532.2 |
| 111 | | S,S | 557.1 |

-continued

| Compound | Structure | Stereochemistry Comment | m/z |
|---|---|---|---|
| 112 | | S,S | 547.2 |
| 113 | | S,S | 548.2 |
| 114 | | S,S | 574.1 |
| 115 | | S,S | 602.1 |

-continued

| Compound | Structure | Stereochemistry Comment | m/z |
|---|---|---|---|
| 116 | | S,S | 557.0 |
| 117 | | S,S | 532.2 |
| 118 | | S,S | 518.2 |
| 119 | | S,S | 518.2 |

-continued

| Compound | Structure | Stereochemistry Comment | m/z |
|---|---|---|---|
| 120 | | S,S | 655.3 |
| 121 | | S,S | 640.3 |
| 122 | | S,S | 518.2 |

-continued

| Compound | Structure | Stereochemistry Comment | m/z |
|---|---|---|---|
| 123 | | S,S | 523.2 |
| 124 | | S,S | 568.2 |
| 125 | | S,S | 641.3 |

-continued

| Compound | Structure | Stereochemistry Comment | m/z |
|---|---|---|---|
| 126 | | S,S | 642.3 |
| 127 | | S,S | 518.2 |
| 128 | | S,S | 532.2 |

-continued

| Compound | Structure | Stereochemistry Comment | m/z |
|---|---|---|---|
| 129 | | S,S | 611.2 |
| 130 | | S,S | 518.2 |
| 131 | | S,S | 532.1 |

| Compound | Structure | Stereochemistry Comment | m/z |
|---|---|---|---|
| 132 | | S,S | 548.2 |
| 133 | | S,S | 653.2 |
| 134 | | S,S | 641.2 |

-continued

| Compound | Structure | Stereochemistry Comment | m/z |
|---|---|---|---|
| 135 | | S,S | 612.2 |
| 136 | | S,S | 532.2 |
| 137 | | S,S | 547.2 |

-continued

| Compound | Structure | Stereochemistry Comment | m/z |
|---|---|---|---|
| 138 | | S,S | 549.2 |
| 139 | | S,S | 548.3 |
| 140 | | S,S | 614.3 |

-continued

| Compound | Structure | Stereochemistry Comment | m/z |
|---|---|---|---|
| 141 | | Single isomer | 656.2 |
| 142 | | S,S | 627.3 |
| 143 | | Single isomer | 656.2 |

-continued

| Compound | Structure | Stereochemistry Comment | m/z |
|---|---|---|---|
| 144 | | S,S | 534.2 |
| 145 | | S,S | 613.2 |
| 146 | | S,S | 554.2 |

-continued

| Compound | Structure | Stereochemistry Comment | m/z |
|---|---|---|---|
| 147 | | S,S | 643.3 |
| 148 | | S,S | 572.0 |
| 149 | | S,S | 562.0 |

-continued

| Compound | Structure | Stereochemistry Comment | m/z |
|---|---|---|---|
| 150 | | S,S | 558.1 |
| 151 | | Single isomer | 643.2 |
| 152 | | Single isomer | 643.1 |

-continued

| Compound | Structure | Stereochemistry Comment | m/z |
|---|---|---|---|
| 153 | | S,S | 547.3 |
| 154 | | S,S | 576.3 |
| 155 | | S,S | 586.2 |

| Compound | Structure | Stereochemistry Comment | m/z |
|---|---|---|---|
| 156 | | S,S,R | 653.2 |
| 157 | | S,S,S | 653.2 |

Example 13

Viral qPCR Assays

MRC5 cells, Vero cells, and MeWo cells were obtained from ATCC, and were maintained at 37° C./5% $CO_2$/90% relative humidity in Minimal Essential Medium with 10% fetal bovine serum, 2.0 nM L-glutamine, 100 units/ml penicillin and 100 ug/ml streptomycin. Assay plates were prepared by dispensing compounds dissolved in DMSO into wells of 384 well collagen-coated plates using an ECHO acoustic dispenser. Each test compound was tested in a 10-point, serial 3-fold dilution. Controls included uninfected cells and infected cells treated only with DMSO. Assays were initiated by mixing selected cells, in suspension, with virus, and dispensing 50 μl/well infected cells to pre-plated compounds. Plates were incubated at 37° C./5% $CO_2$/90% relative humidity for ~72 hrs to permit genomic replication, and infected cells were lysed by the addition of an equal volume of lysis buffer (10 mM Tris-HCl, pH8, 50 mM KCl, 2 mM $MgCl_2$, 0.45% NP-40, 0.45% Tween-20, and 100 g/ml proteinase K). An aliquot of the lysate was then transferred to a 384-well PCR plate and incubated at 56° C. for 1 hour, and then at 95° C. for 10 minutes. Levels of the selected viral gene and of the cellular control, PPIA, were measured in separate 10 μl qPCR assays using TaqMan® Gene Expression Master Mix (Applied Biosystems), and an 7900HT Fast Real-Time PCR System with 384-Well Block Module. 7-point, serial 10-fold dilutions of a plasmid standard were run on each plate to generate a standard curve, and genome copies numbers were calculated by plotting experimental Ct onto linear regression of the standard curve. Viral genome copy numbers were normalized by cellular control copy number, and compound effects were normalized to the window defined by the controls. Calculated % effects were fit using a 4-parameter algorithm, and $EC_{50}$ was reported.

Example 14

CMV and VZV Polymerase Assays

Human cytomegalovirus and varicella zoster virus DNA polymerases were expressed via baculovirus vector in SF21 cells and purified. Heterodimeric nucleic acid substrate used in the herpesvirus polymerase reactions were generated by annealing a 59-mer template to a 17-mer digoxigenin-labeled primer. Polymerase (HCMV final concentration of 0.2 nM; VZV final concentration of 0.4 nM) was combined with an inhibitor compound or DMSO in assay buffer (10 mM HEPES, pH 7.5, 25 mM KCl, 25 mM NaCl, 5 mM $MgCl_2$, 5% glycerol, 0.67 mg/ml bovine serum albumin, and 1 mM tris(2-carboxyethyl)phosphine)), and this mixture was pre-incubated for 30 minutes at room temperature in 384-well microtiter plates. The polymerization reaction was initiated by the addition of template/primer substrate (final concentration: 1.6 nM), and dNTPs (final concentration: 24 nM dCTP, 24 nMdGTP, 16 nM dATP, 16 nM dTTP, and 0.8 nM biotin-dUTP). After a 60 minute incubation period at 37° C., the reactions were terminated using quench buffer (25 mM HEPES pH 7.5, 100 mM NaCl, 0.25% Tween-20, 12 mM EDTA, and 1 mg/ml bovine serum albumin). Incorporation of biotinylated UTP was detected with 2.5-5 μg/mL anti-DIG AlphaLISA acceptor beads and 5-10 μg/mL streptavidin AlphaLISA donor beads (PerkinElmer). Compound effects were normalized to the window defined by the controls (DMSO only and pre-quenched wells), and were fit using a 4-parameter algorithm to report an $IC_{50}$.

Illustrative compounds of the present invention were tested in one or more of the above assays and results are provided in the table below:

| Example | CMV $IC_{50}$ (nM) | CMV Cell $EC_{50}$ (nM) | VZV $IC_{50}$ (nM) | HSV1 Cell $EC_{50}$ (nM) | HSV2 Cell $EC_{50}$ (nM) |
|---|---|---|---|---|---|
| 1 | 69 | 1040 | 75 | 2696 | 1540 |
| 2 | 49 | 872 | 44 | 1697 | 1047 |
| 3 | 2.4 | 37 | 0.5 | 75 | 55 |
| 4 | 1.1 | 51 | 3.1 | 60 | 26 |
| 5 | 15 | 107 | N/A | 131 | 85 |
| 6 | 1.8 | 56 | 5.0 | 47 | 29 |
| 7 | 4.6 | 104 | 9.2 | 118 | 89 |
| 8 | 4.0 | 77 | 1.0 | 53 | 50 |
| 9 | 0.44 | 35 | 0.44 | 20 | 13 |
| 10 | 0.24 | 70 | 0.28 | 109 | 68 |
| 11 | 0.55 | 54 | 2.5 | 51 | 35 |
| 12 | 0.47 | 112 | 0.47 | 73 | 61 |
| 13 | 1.0 | 49 | 3.5 | 37 | 38 |
| 14 | 13 | 280 | 14 | 374 | 268 |
| 15 | N/A | 60 | N/A | 74 | 41 |
| 16 | N/A | 33 | N/A | 42 | 18 |
| 17 | N/A | 217 | N/A | 484 | 156 |
| 18 | N/A | 91 | N/A | 74 | 73 |
| 19 | N/A | 39 | N/A | 67 | 37 |
| 20 | N/A | 117 | N/A | 247 | 209 |
| 21 | 5853 | N/A | 7326 | N/A | N/A |
| 22 | 386 | 4242 | 71 | 5626 | 4281 |
| 23 | 40 | 482 | 26 | 1316 | 961 |
| 24 | 27 | 216 | 35 | 501 | 342 |
| 25 | 76 | 569 | 55 | 1309 | 730 |
| 26 | 13 | 298 | 18 | 673 | 356 |
| 27 | 5.3 | 114 | 5.9 | 124 | 59 |
| 28 | 48 | 500 | 60 | 1252 | 884 |
| 29 | 21 | 240 | 13 | 256 | N/A |
| 30 | 207 | N/A | 157 | N/A | N/A |
| 31 | 3.0 | 101 | 2.1 | 139 | 46 |
| 32 | 15 | 392 | 33 | 772 | 402 |
| 33 | 7.4 | 156 | 13 | 266 | 234 |
| 34 | 2.1 | 74 | 1.4 | 110 | 81 |
| 35 | 66 | N/A | 82 | N/A | N/A |
| 36 | 1.9 | 37 | 1.5 | 49 | 28 |
| 37 | 1.1 | 20 | 0.22 | 19 | 11 |
| 38 | 1.1 | 24 | 0.33 | 48 | 28 |
| 39 | 28 | 520 | 41 | 1340 | 952 |
| 40 | 11 | 157 | 17 | 386 | 304 |
| 41 | 2.7 | 77 | 1.1 | 131 | 75 |
| 42 | 21 | 181 | 13 | 233 | 92 |
| 43 | 9825 | N/A | 4956 | N/A | N/A |
| 44 | 77 | 521 | 144 | 1458 | 1246 |
| 45 | 11 | 269 | 25 | 268 | 309 |
| 46 | 24 | 174 | 20 | 423 | 334 |
| 47 | 84 | 550 | 102 | 1584 | 1370 |
| 48 | 42 | 273 | 37 | 701 | 645 |
| 49 | 29 | 369 | 43 | 1127 | 1085 |
| 50 | 545 | N/A | 422 | N/A | N/A |
| 51 | 0.22 | 21 | 0.44 | 26 | 16 |
| 52 | 0.30 | 22 | 0.44 | 39 | 19 |
| 53 | 0.76 | 86 | 0.56 | 89 | 35 |
| 54 | 23 | 82 | 28 | 238 | 173 |
| 55 | 109 | N/A | 139 | N/A | N/A |
| 56 | 2.8 | 64 | 6.5 | 124 | 109 |
| 57 | 43 | N/A | 43 | N/A | N/A |
| 58 | 23 | 173 | 47 | 996 | 1143 |
| 59 | 31 | 347 | 29 | 746 | 561 |
| 60 | 0.82 | 53 | 0.44 | 84 | 40 |
| 61 | 6.5 | 173 | 11 | 250 | 202 |
| 62 | 1.0 | 57 | 4.8 | 113 | 57 |
| 63 | 235 | 498 | N/A | 3149 | 3710 |
| 64 | 2.5 | 64 | 8.9 | 71 | 51 |
| 65 | 1.2 | 28 | 0.68 | 46 | 18 |
| 66 | 2.2 | 50 | 4.8 | 43 | 34 |
| 67 | 22 | N/A | 53 | N/A | N/A |
| 68 | 65 | 511 | 42 | 978 | 1155 |
| 69 | 35 | 307 | 29 | 870 | 1304 |
| 70 | 76 | 960 | 44 | 1999 | 2228 |
| 71 | 3.7 | 197 | 13 | 234 | 171 |
| 72 | 7.5 | 195 | 4.7 | 181 | 404 |
| 73 | 1.0 | 4179 | 5.2 | 3882 | 3020 |
| 74 | 6.4 | 55 | 6.4 | 447 | 432 |
| 75 | 29 | 164 | 23 | 381 | 413 |
| 76 | 11 | 261 | 11 | 412 | 309 |
| 77 | 3.1 | 217 | 3.4 | 157 | 165 |
| 78 | 15 | 178 | 20 | 405 | 224 |
| 79 | 4.9 | 147 | 5.5 | 111 | 123 |
| 80 | 7.6 | 124 | 5.6 | 157 | 227 |
| 81 | 15 | 265 | 27 | 364 | 307 |
| 82 | 5.5 | 52 | 7.1 | 63 | 45 |
| 83 | 19 | 4603 | 20 | 6691 | 20970 |
| 84 | 0.44 | 177 | 0.44 | 113 | 102 |
| 85 | 10 | 338 | 11 | 673 | 736 |
| 86 | 0.44 | 68 | 0.44 | 58 | 41 |
| 87 | 0.44 | 198 | 0.80 | 313 | 275 |
| 88 | 28 | 718 | 25 | 543 | 225 |
| 89 | N/A | 375 | N/A | 436 | 273 |
| 90 | 18 | 241 | 16 | 214 | 115 |
| 91 | N/A | 479 | N/A | 527 | 602 |
| 92 | N/A | 379 | N/A | 796 | 506 |
| 93 | N/A | 1432 | N/A | 2590 | 3383 |
| 94 | N/A | 1470 | N/A | 2414 | 1879 |
| 95 | 18 | 366 | 19 | 301 | 182 |
| 96 | N/A | 2061 | N/A | 2916 | 3282 |
| 97 | 14 | 198 | 15 | 163 | 96 |
| 98 | 16 | 284 | 15 | 256 | 185 |
| 99 | N/A | 272 | N/A | 118 | 77 |
| 100 | N/A | 63 | N/A | 86 | 43 |
| 101 | N/A | 449 | N/A | 223 | 88 |
| 102 | N/A | 135 | N/A | 71 | 37 |
| 103 | N/A | 83 | N/A | 55 | 55 |
| 104 | N/A | 99 | N/A | 45 | 32 |
| 105 | N/A | 112 | N/A | 48 | 55 |
| 106 | N/A | 143 | N/A | 102 | 73 |
| 107 | N/A | 52 | N/A | 52 | 31 |
| 108 | N/A | 201 | N/A | 198 | 87 |
| 109 | N/A | 465 | N/A | 413 | 153 |
| 110 | N/A | 200 | N/A | 288 | 133 |
| 111 | N/A | 85 | N/A | 101 | 60 |
| 112 | N/A | 142 | N/A | 148 | 81 |
| 113 | N/A | 2970 | N/A | 2678 | 1692 |
| 114 | N/A | 348 | N/A | 323 | 124 |
| 115 | N/A | 258 | N/A | 313 | 111 |
| 116 | N/A | 127 | N/A | 106 | 62 |
| 117 | N/A | 304 | N/A | 652 | 455 |
| 118 | N/A | 135 | N/A | 244 | 180 |
| 119 | N/A | 397 | N/A | 933 | 921 |
| 120 | N/A | 957 | N/A | 2410 | 1020 |
| 121 | N/A | 299 | N/A | 188 | 128 |
| 122 | N/A | 382 | N/A | 844 | 543 |
| 123 | N/A | 555 | N/A | 732 | 747 |
| 124 | N/A | 163 | N/A | 198 | 120 |
| 125 | N/A | 4245 | N/A | 3831 | 1279 |
| 126 | N/A | 205 | N/A | 372 | 140 |

| Example | CMV IC$_{50}$ (nM) | CMV Cell EC$_{50}$ (nM) | VZV IC$_{50}$ (nM) | HSV1 Cell EC$_{50}$ (nM) | HSV2 Cell EC$_{50}$ (nM) |
|---|---|---|---|---|---|
| 127 | N/A | 280 | N/A | 484 | 793 |
| 128 | N/A | 114 | N/A | 217 | 131 |
| 129 | N/A | 115 | N/A | 178 | 135 |
| 130 | N/A | 190 | N/A | 167 | 287 |
| 131 | N/A | 102 | N/A | 223 | 157 |
| 132 | N/A | 1469 | N/A | 1468 | 822 |
| 133 | N/A | 167 | N/A | 238 | 106 |
| 134 | N/A | 119 | N/A | 171 | 98 |
| 135 | N/A | 939 | N/A | 799 | 649 |
| 136 | N/A | 826 | N/A | 1721 | 2149 |
| 137 | N/A | 77 | N/A | 52 | 47 |
| 138 | N/A | 498 | N/A | 252 | 367 |
| 139 | N/A | 49 | N/A | 45 | 43 |
| 140 | N/A | 2664 | N/A | 4311 | 3762 |
| 141 | N/A | 205 | N/A | 258 | 184 |
| 142 | N/A | 129 | N/A | 154 | 38 |
| 143 | N/A | 95 | N/A | 213 | 181 |
| 144 | N/A | 137 | N/A | 189 | 319 |
| 145 | N/A | 101 | N/A | 108 | 112 |
| 146 | N/A | 67 | N/A | 93 | 143 |
| 147 | 7.0 | 229 | 12 | 274 | 96 |
| 148 | N/A | 275 | N/A | 213 | 78 |
| 149 | N/A | 44 | N/A | 53 | 33 |
| 150 | N/A | 79 | N/A | 53 | 88 |
| 151 | N/A | 178 | N/A | 233 | 176 |
| 152 | N/A | 159 | N/A | 231 | 226 |
| 153 | N/A | 31 | N/A | 23 | 41 |
| 154 | N/A | 180 | N/A | 403 | 485 |
| 155 | N/A | 1338 | N/A | 5104 | 5404 |
| 156 | N/A | 140 | N/A | 176 | 93 |
| 157 | N/A | 170 | N/A | 176 | 81 |

N/A = not available
a = data generated using the assay described in Example 14
b = data generated using the assay described in Example 13

Uses of the Bicyclic Heterocycle Compounds

The Bicyclic Heterocycle Compounds are useful in human and veterinary medicine for treating or preventing a viral infection in a patient. In one embodiment, the Bicyclic Heterocycle Compounds can be inhibitors of viral replication. In another embodiment, the Bicyclic Heterocycle Compounds can be inhibitors of herpesvirus replication. Accordingly, the Bicyclic Heterocycle Compounds are useful for treating viral infections, such as herpesvirus. In accordance with the invention, the Bicyclic Heterocycle Compounds can be administered to a patient in need of treatment or prevention of a viral infection.

Accordingly, in one embodiment, the invention provides methods for treating or preventing a viral infection in a patient comprising administering to the patient an effective amount of at least one Bicyclic Heterocycle Compound or a pharmaceutically acceptable salt thereof.

Treatment or Prevention of Herpesvirus Infection

The Bicyclic Heterocycle Compounds are useful in the inhibition of herpesvirus replication, the treatment of herpesvirus infection and/or reduction of the likelihood or severity of symptoms of herpesvirus infection and the inhibition of herpesvirus viral replication and/or herpesvirus viral production in a cell-based system. For example, the Bicyclic Heterocycle Compounds are useful in treating infection by herpesvirus after suspected past exposure to herpesvirus by such means as blood transfusion, exchange of body fluids, bites, accidental needle stick, or exposure to patient blood during surgery or other medical procedures. Accordingly, in one embodiment, the invention provides a method for treating herpesvirus infection in a patient, the method comprising administering to the patient an effective amount of at least one Bicyclic Heterocycle Compound or a pharmaceutically acceptable salt thereof.

In one embodiment, the herpesvirus being treated or prevented is of the family α-herpesviridae. Herpesviruses of the family α-herpesviridae include, but are not limited to, herpes simplex virus 1 (HSV-1), herpes simplex 2 (HSV-2), and varicella zoster virus (VZV).

In another embodiment, the herpesvirus being treated or prevented is of the family β-herpesviridae. Herpesviruses of the family β-herpesviridae include, but are not limited to, human cytomegalovirus (CMV), human herpesvirus 6 (HHV6), and human herpesvirus 7 (HHV7).

In another embodiment, the herpesvirus being treated or prevented is of the family γ-herpesviridae. Herpesviruses of the family γ-herpesviridae include, but are not limited to, Epstein-Barr virus (EBV), human herpesvirus 4 (HHV4), and Kaposi's sarcoma-associated herpesvirus (KHSV), also known as human herpesvirus 8 (HHV8).

In one embodiment, the herpesvirus being treated or prevented is HSV-1.

In another embodiment, the herpesvirus being treated or prevented is HSV-2.

In another embodiment, the herpesvirus being treated or prevented is VZV.

In still another embodiment, the herpesvirus being treated or prevented is CMV.

In another embodiment, the herpesvirus being treated or prevented is HHV6.

In yet another embodiment, the herpesvirus being treated or prevented is HHV7.

In another embodiment, the herpesvirus being treated or prevented is EBV.

In a further embodiment, the herpesvirus being treated or prevented is HHV4.

In another embodiment, the herpesvirus being treated or prevented is KSHV.

In a specific embodiment, the amount administered is effective to treat or prevent infection by herpesvirus in the patient. In another specific embodiment, the amount administered is effective to inhibit herpesvirus viral replication and/or viral production in the patient.

The Bicyclic Heterocycle Compounds are also useful in the preparation and execution of screening assays for antiviral compounds. Furthermore, the Bicyclic Heterocycle Compounds are useful in establishing or determining the binding site of other antivirals to the herpesvirus polymerase.

The compositions and combinations of the present invention can be useful for treating a patient suffering from infection related to any herpesvirus infection. Herpesvirus types may differ in their antigenicity, level of viremia, severity of disease produced, and response to therapy. See Poole et al., *Clinical Therapeutics*, 40:8 (2018), 1282-1298.

Combination Therapy

In another embodiment, the present methods for treating or preventing herpesvirus infection can further comprise the administration of one or more additional therapeutic agents which are not Bicyclic Heterocycle Compounds.

In one embodiment, the additional therapeutic agent is an antiviral agent. In another embodiment, the additional therapeutic agent is an anti-herpes agent.

Anti-herpes agents useful in the present compositions and methods include, but are not limited to, nucleoside polymerase inhibitors, such as acyclovir, valaciclovir, famciclovir, penciclovir, cidofovir, brincidofovir (CMX-001), valmanciclovir, ganciclovir, valganciclovir, and N-methanocarbathymidine (N-MCT); pyrophosphate polymerase inhibitors, such as foscarnet; CMV terminase inhibitors, such as letermovir; viral kinase inhibitors, such as maribavir; and helicase-primase inhibitors, such as pritelivir (AIC-316) and amenamevir (ASP-2151).

In another embodiment, the additional therapeutic agent is an immunomodulatory agent, such as an immunosuppressive agent. Immunosuppressant agents useful in the present compositions and methods include, but are not limited to, cytotoxic agents, such as cyclophosphamide and cyclosporin A; corticosteroids, such as hydrocortisone and dexamethasone, and non-steroidal anti-inflammatory agents (NSAID).

Accordingly, in one embodiment, the present invention provides methods for treating a herpesvirus infection in a patient, the method comprising administering to the patient: (i) at least one Bicyclic Heterocycle Compound, or a pharmaceutically acceptable salt thereof, and (ii) at least one additional therapeutic agent that is other than an Bicyclic Heterocycle Compound, wherein the amounts administered are together effective to treat or prevent the herpesvirus infection.

When administering a combination therapy of the invention to a patient, therapeutic agents in the combination, or a pharmaceutical composition or compositions comprising therapeutic agents, may be administered in any order such as, for example, sequentially, concurrently, together, simultaneously and the like. The amounts of the various actives in such combination therapy may be different amounts (different dosage amounts) or same amounts (same dosage amounts). Thus, for non-limiting illustration purposes, an Bicyclic Heterocycle Compound and an additional therapeutic agent may be present in fixed amounts (dosage amounts) in a single dosage unit (e.g., a capsule, a tablet and the like).

In one embodiment, the at least one Bicyclic Heterocycle Compound is administered during a time when the additional therapeutic agent(s) exert their prophylactic or therapeutic effect, or vice versa.

In another embodiment, the at least one Bicyclic Heterocycle Compound and the additional therapeutic agent(s) are administered in doses commonly employed when such agents are used as monotherapy for treating a herpesvirus infection.

In another embodiment, the at least one Bicyclic Heterocycle Compound and the additional therapeutic agent(s) are administered in doses lower than the doses commonly employed when such agents are used as monotherapy for treating a herpesvirus infection.

In still another embodiment, the at least one Bicyclic Heterocycle Compound and the additional therapeutic agent(s) act synergistically and are administered in doses lower than the doses commonly employed when such agents are used as monotherapy for treating a herpesvirus infection.

In one embodiment, the at least one Bicyclic Heterocycle Compound and the additional therapeutic agent(s) are present in the same composition. In one embodiment, this composition is suitable for oral administration. In another embodiment, this composition is suitable for intravenous administration. In another embodiment, this composition is suitable for subcutaneous administration. In still another embodiment, this composition is suitable for parenteral administration.

The at least one Bicyclic Heterocycle Compound and the additional therapeutic agent(s) can act additively or synergistically. A synergistic combination may allow the use of lower dosages of one or more agents and/or less frequent administration of one or more agents of a combination therapy. A lower dosage or less frequent administration of one or more agents may lower toxicity of therapy without reducing the efficacy of therapy.

In one embodiment, the administration of at least one Bicyclic Heterocycle Compound and the additional therapeutic agent(s) may inhibit the resistance of a herpesvirus infection to these agents.

The doses and dosage regimen of the other agents used in the combination therapies of the present invention for the treatment or prevention of herpesvirus infection can be determined by the attending clinician, taking into consideration the approved doses and dosage regimen in the package insert; the age, sex and general health of the patient; and the type and severity of the viral infection or related disease or disorder. When administered in combination, the Bicyclic Heterocycle Compound(s) and the other agent(s) can be administered simultaneously (i.e., in the same composition or in separate compositions one right after the other) or sequentially. This particularly useful when the components of the combination are given on different dosing schedules, e.g., one component is administered once daily and another component is administered every six hours, or when the preferred pharmaceutical compositions are different, e.g., one is a tablet and one is a capsule. A kit comprising the separate dosage forms is therefore advantageous.

In one embodiment, one or more compounds of the present invention are administered with one or more additional therapeutic agents selected from: an immunomodulator, an anti-herpes agent, a viral replication inhibitor, an antisense agent, a therapeutic vaccine, a virion production inhibitor, a viral entry inhibitor, a viral assembly inhibitor, an antibody therapy (monoclonal or polyclonal), and any agent useful for treating any type of herpesvirus infection.

Compositions and Administration

Due to their activity, the Bicyclic Heterocycle Compounds are useful in veterinary and human medicine. As described above, the Bicyclic Heterocycle Compounds are useful for treating or preventing herpesvirus infection in a patient in need thereof.

Accordingly, in one embodiment, the present invention provides pharmaceutical compositions comprising an effective amount of a compound of formula (I), or a pharmaceutically acceptable salt thereof, and a pharmaceutically acceptable carrier.

In another embodiment, the present invention provides pharmaceutical compositions comprising (i) an effective amount of a compound of formula (I), or a pharmaceutically acceptable salt thereof, and a pharmaceutically acceptable carrier; and (ii) one or more additional therapeutic agents, wherein said additional therapeutic agents are selected from anti-herpes agents and immunomodulators.

When administered to a patient, the Bicyclic Heterocycle Compounds can be administered as a component of a composition that comprises a pharmaceutically acceptable carrier or vehicle. The present invention provides pharmaceutical compositions comprising an effective amount of at least one Bicyclic Heterocycle Compound and a pharmaceutically acceptable carrier. In the pharmaceutical compositions and methods of the present invention, the active ingredients will typically be administered in admixture with suitable carrier materials suitably selected with respect to the intended form of administration, i.e., oral tablets, capsules (either solid-filled, semi-solid filled or liquid filled), powders for constitution, oral gels, elixirs, dispersible granules, syrups, suspensions, and the like, and consistent with conventional pharmaceutical practices. For example, for oral administration in the form of tablets or capsules, the active drug component may be combined with any oral non-toxic pharmaceutically acceptable inert carrier, such as lactose, starch, sucrose, cellulose, magnesium stearate, dicalcium phosphate, calcium sulfate, talc, mannitol, ethyl alcohol (liquid forms) and the like. Solid form preparations include powders, tablets, dispersible granules, capsules, cachets and suppositories. Powders and tablets may be comprised of from about 0.5 to about 95 percent inventive composition. Tablets, powders, cachets and capsules can be used as solid dosage forms suitable for oral administration.

Moreover, when desired or needed, suitable binders, lubricants, disintegrating agents and coloring agents may also be incorporated in the mixture. Suitable binders include starch, gelatin, natural sugars, corn sweeteners, natural and synthetic gums such as acacia, sodium alginate, carboxymethylcellulose, polyethylene glycol and waxes. Among the lubricants there may be mentioned for use in these dosage forms, boric acid, sodium benzoate, sodium acetate, sodium chloride, and the like. Disintegrants include starch, methylcellulose, guar gum, and the like. Sweetening and flavoring agents and preservatives may also be included where appropriate.

Liquid form preparations include solutions, suspensions and emulsions and may include water or water-propylene glycol solutions for parenteral or intravenous injection.

Also included are solid form preparations which are intended to be converted, shortly before use, to liquid form preparations for either oral or parenteral administration. Such liquid forms include solutions, suspensions and emulsions.

For preparing suppositories, a low melting wax such as a mixture of fatty acid glycerides or cocoa butter is first melted, and the active ingredient is dispersed homogeneously therein as by stirring. The molten homogeneous mixture is then poured into convenient sized molds, allowed to cool and thereby solidify.

Additionally, the compositions of the present invention may be formulated in sustained release form to provide the rate-controlled release of any one or more of the components or active ingredients to optimize therapeutic effects, i.e., antiviral activity and the like. Suitable dosage forms for sustained release include layered tablets containing layers of varying disintegration rates or controlled release polymeric matrices impregnated with the active components and shaped in tablet form or capsules containing such impregnated or encapsulated porous polymeric matrices.

In one embodiment, the one or more Bicyclic Heterocycle Compounds are administered orally.

In another embodiment, the one or more Bicyclic Heterocycle Compounds are administered intravenously.

In still another embodiment, the one or more Bicyclic Heterocycle Compounds are administered sublingually.

In one embodiment, a pharmaceutical preparation comprising at least one Bicyclic Heterocycle Compound is in unit dosage form. In such form, the preparation is subdivided into unit doses containing effective amounts of the active components.

Compositions can be prepared according to conventional mixing, granulating or coating methods, respectively, and the present compositions can contain, in one embodiment, from about 0.1% to about 99% of the Bicyclic Heterocycle Compound(s) by weight or volume. In various embodiments, the present compositions can contain, in one embodiment, from about 1% to about 70% or from about 5% to about 60% of the Bicyclic Heterocycle Compound(s) by weight or volume.

The amount and frequency of administration of the Bicyclic Heterocycle Compounds will be regulated according to the judgment of the attending clinician considering such factors as age, condition and size of the patient as well as severity of the symptoms being treated. Generally, a total daily dosage of the at least one Bicyclic Heterocycle Compound(s) alone, or when administered as combination therapy, can range from about 1 to about 2500 mg per day, although variations will necessarily occur depending on the target of therapy, the patient and the route of administration. In one embodiment, the dosage is from about 10 to about 1000 mg/day, administered in a single dose or in 2-4 divided doses. In another embodiment, the dosage is from about 1 to about 500 mg/day, administered in a single dose or in 2-4 divided doses. In still another embodiment, the dosage is from about 1 to about 100 mg/day, administered in a single dose or in 2-4 divided doses. In yet another embodiment, the dosage is from about 1 to about 50 mg/day, administered in a single dose or in 2-4 divided doses. In another embodiment, the dosage is from about 500 to about 1500 mg/day, administered in a single dose or in 2-4 divided doses. In still another embodiment, the dosage is from about 500 to about 1000 mg/day, administered in a single dose or in 2-4 divided doses. In yet another embodiment, the dosage is from about 100 to about 500 mg/day, administered in a single dose or in 2-4 divided doses.

The compositions of the invention can further comprise one or more additional therapeutic agents, selected from those listed above herein. Accordingly, in one embodiment, the present invention provides compositions comprising: (i) at least one Bicyclic Heterocycle Compound or a pharmaceutically acceptable salt thereof; (ii) one or more additional therapeutic agents that are not an Bicyclic Heterocycle Compound; and (iii) a pharmaceutically acceptable carrier, wherein the amounts in the composition are together effective to treat herpesvirus infection.

In one embodiment, the present invention provides compositions comprising a Compound of Formula (I) and a pharmaceutically acceptable carrier.

In another embodiment, the present invention provides compositions comprising a Compound of Formula (I), a pharmaceutically acceptable carrier, and a second therapeutic agent selected from the group consisting of anti-herpes agents and immunomodulators.

In another embodiment, the present invention provides compositions comprising a Compound of Formula (I), a pharmaceutically acceptable carrier, and two additional therapeutic agents, each of which are independently selected from the group consisting of anti-herpes agents and immunomodulators.

Kits

In one aspect, the present invention provides a kit comprising a therapeutically effective amount of at least one Bicyclic Heterocycle Compound, or a pharmaceutically acceptable salt, solvate, ester or prodrug of said compound and a pharmaceutically acceptable carrier, vehicle or diluent.

In another aspect the present invention provides a kit comprising an amount of at least one Bicyclic Heterocycle Compound, or a pharmaceutically acceptable salt, solvate, ester or prodrug of said compound and an amount of at least one additional therapeutic agent listed above, wherein the amounts of the two or more active ingredients result in a desired therapeutic effect. In one embodiment, the one or more Bicyclic Heterocycle Compounds and the one or more additional therapeutic agents are provided in the same container. In one embodiment, the one or more Bicyclic Heterocycle Compounds and the one or more additional therapeutic agents are provided in separate containers.

What is claimed is:

1. A compound of structural formula (I):

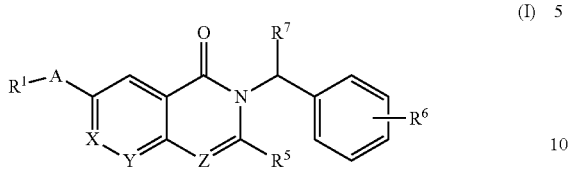

or a pharmaceutically acceptable salt thereof,
wherein:
A is a bond or —O—;
X is —N— or —C($R^2$)—;
Y is —N— or —C($R^3$)—, such that only one of X and Y can be —N—;
Z is —N— or —C($R^4$)—;
$R^1$ is 5 to 7-membered monocyclic heterocycloalkyl or 9 or 10-membered bicyclic heterocycloalkyl, wherein said 5 to 7-membered monocyclic heterocycloalkyl group, and said 9 or 10-membered bicyclic heterocycloalkyl group can be optionally substituted with up to three $R^A$ groups, which can be the same or different, and wherein said 5 to 7-membered monocyclic heterocycloalkyl group, and said 9 or 10-membered bicyclic heterocycloalkyl group can optionally have a ring carbon atom functionalized as a carbonyl group;
$R^2$ is selected from H, $C_1$-$C_6$ alkyl, —O—($C_1$-$C_6$ alkyl), $C_1$-$C_6$ hydroxyalkyl, $C_1$-$C_6$ aminoalkyl, —CN, —$NH_2$, —C(O)O—($C_1$-$C_6$ alkyl), $C_3$-$C_7$ cycloalkyl, $C_4$-$C_7$ heterocycloalkyl, $C_6$-$C_{10}$ aryl, 5 to 7-membered monocyclic heteroaryl, and 9 or 10-membered bicyclic heteroaryl, wherein said $C_3$-$C_7$ cycloalkyl group, said $C_6$-$C_{10}$ aryl group, said 5 to 7-membered monocyclic heteroaryl group, and said 9 or 10-membered bicyclic heteroaryl group can be optionally substituted with up to three RB groups, which can be the same or different, or where $R^2$ and $R^3$, together with atoms to which they are attached, are joined to form a 5-membered heteroaryl group;
$R^3$ is selected from H, $C_1$-$C_6$ alkyl, $C_1$-$C_6$ hydroxyalkyl, 5 to 7-membered monocyclic heteroaryl, —O—(5 to 7-membered monocyclic heteroaryl), $C_3$-$C_7$ cycloalkyl, wherein said $C_3$-$C_7$ cycloalkyl group, and any of said 5 to 7-membered monocyclic heteroaryl groups, can be optionally substituted with up to three RC groups, which can be the same or different;
$R^4$ is selected from H, $C_1$-$C_6$ alkyl, $C_1$-$C_6$ hydroxyalkyl, and $C_3$-$C_7$ cycloalkyl;
$R^5$ is selected from H, $C_1$-$C_6$ alkyl, —$OR^7$, —CN, —$NH_2$, $C_1$-$C_6$ hydroxyalkyl, $C_1$-$C_6$ haloalkyl, —O—($C_1$-$C_6$ hydroxyalkyl), —($C_1$-$C_6$ alkylene)—NH—($C_1$-$C_6$ haloalkyl), —O—($C_1$-$C_6$ alkylene)$_m$-($C_3$-$C_7$ cycloalkyl), —O—($C_1$-$C_6$ alkylene)$_m$-(5 to 7-membered monocyclic heterocycloalkyl), and —($C_1$-$C_6$ alkylene)$_m$-(5 to 7-membered monocyclic heterocycloalkyl), wherein said $C_1$-$C_6$ alkyl group, said $C_3$-$C_7$ cycloalkyl group, and said 5 to 7-membered monocyclic heterocycloalkyl group can each be optionally substituted with one or more substituents, each independently selected from —OH, $C_1$-$C_6$ alkyl, and $C_3$-$C_7$ cycloalkyl, and wherein said $C_1$-$C_6$ haloalkyl can be optionally substituted with one —$NH_2$ group;
$R^6$ represents up to 3 phenyl ring substituents, which can be the same or different, and are each independently selected from $C_1$-$C_6$ haloalkyl, $C_1$-$C_6$ hydroxyalkyl, —CN, —$NO_2$, —$OR^7$, and halo;
each occurrence of $R^7$ is independently selected from H, $C_1$-$C_6$ alkyl, and $C_3$-$C_7$ cycloalkyl;
each occurrence of $R^A$ is independently selected from $C_1$-$C_6$ alkyl, $C_1$-$C_6$ haloalkyl, $C_1$-$C_6$ alkoxyalkyl, 5 to 7-membered monocyclic heterocycloalkyl, —C(O)—($C_1$-$C_6$ alkyl), and halo, wherein said 5 to 7-membered monocyclic heterocycloalkyl group can be optionally substituted with up to 3 substituents, which can be the same or different, and are each independently selected from $C_1$-$C_6$ alkyl, 5 to 7-membered monocyclic heterocycloalkyl, and halo;
each occurrence of $R^B$ is independently selected from $C_1$-$C_6$ alkyl, $C_3$-$C_7$ cycloalkyl, —O—($C_3$-$C_7$ cycloalkyl), —$OR^7$, $C_1$-$C_6$ haloalkyl, $C_1$-$C_6$ hydroxyalkyl, —O—($C_1$-$C_6$ alkylene)$_m$-(5 to 7-membered monocyclic heterocycloalkyl), and —($C_1$-$C_6$ alkylene)$_m$-(5 to 7-membered monocyclic heterocycloalkyl), and —$NH_2$;
each occurrence of $R^C$ is independently selected from $C_1$-$C_6$ alkyl, —$OR^7$, $C_1$-$C_6$ haloalkyl, and 5 to 7-membered monocyclic heterocycloalkyl; and
each occurrence of m is independently 0 or 1.

2. The compound of claim 1, wherein —A—$R^1$ is:

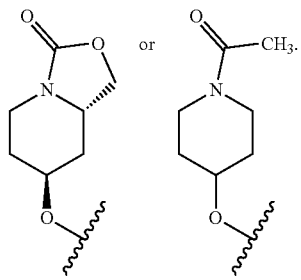

3. The compound of claim 1, wherein X is N.
4. The compound of claim 1, wherein Y is N.
5. The compound of claim 1, wherein Z is N.
6. The compound of claim 1, wherein none of X, Y and Z is N.
7. The compound of claim 1, wherein $R^2$ is selected from H, —CN, cyclobutyl, pyrazolyl, pyridyl, trizolyl, oxazolyl, —$CH_2C(CH_3)_2NH_2$, —$CH_2C(CH_3)_2OH$, —$CH_2CH(CH_3)$OH,

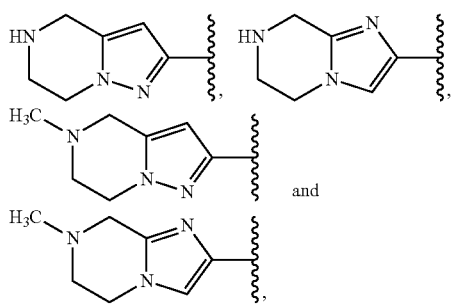

and wherein said pyrazolyl group, said triazolyl group, said pyridyl group, and said cyclobutyl group can be optionally substituted with up to 2 groups, which are independently selected from —CHF$_2$, —CF$_3$, piperdinyl, —OCH$_3$, —OH, and methyl.

8. The compound of claim 1, wherein Y is —C(R$^3$)— and R$^3$ is selected from H, —O-pyrazolyl, oxazolyl, —CH$_2$OH, —CH$_2$C(CH$_3$)$_2$OH, and —CH$_2$CH(CH$_3$)OH.

9. The compound of claim 1, wherein Z is —C(R$^4$)— and R$^4$ is selected from H, —CH$_2$OH, and cyclopropyl.

10. The compound of claim 1, wherein R$^5$ is selected from H, —OH, —OCH$_3$, methyl, ethyl, and cyclopropyl.

11. The compound of claim 1, wherein X and Y are each —CH—.

12. The compound of claim 1, wherein R$^6$ is 4-Cl or 4-CN.

13. The compound of claim 1, wherein R$^7$ is H or methyl.

14. A compound of the structure:

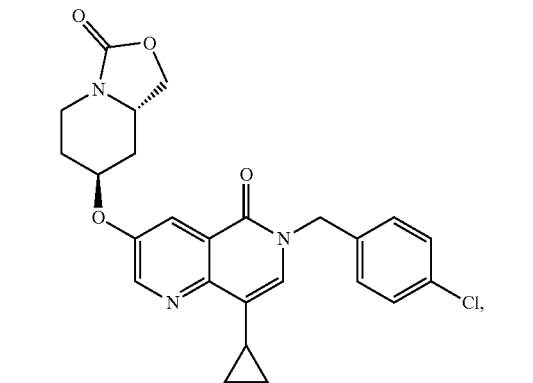

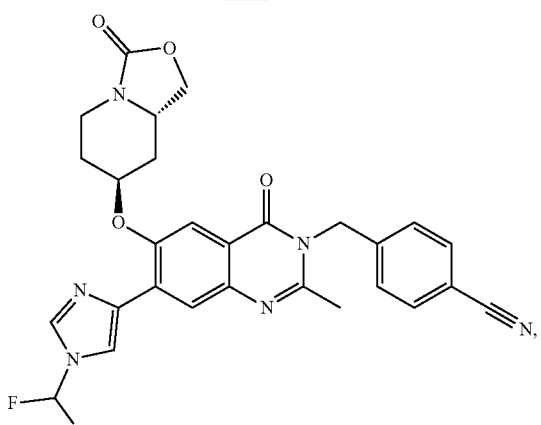

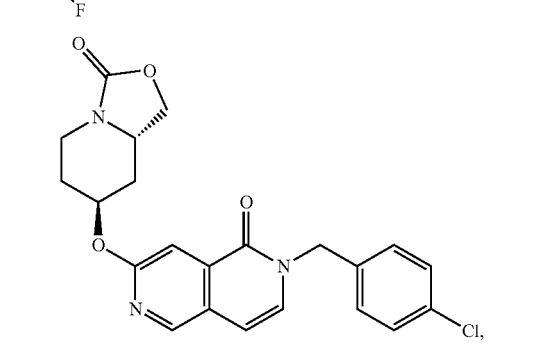

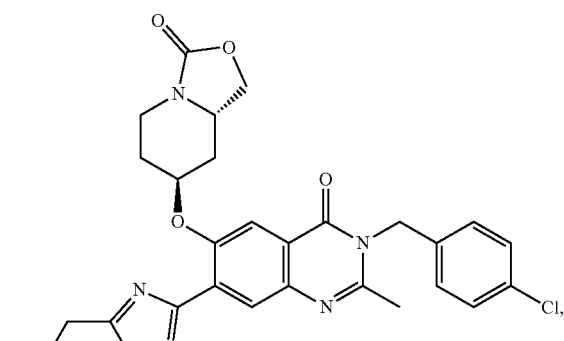

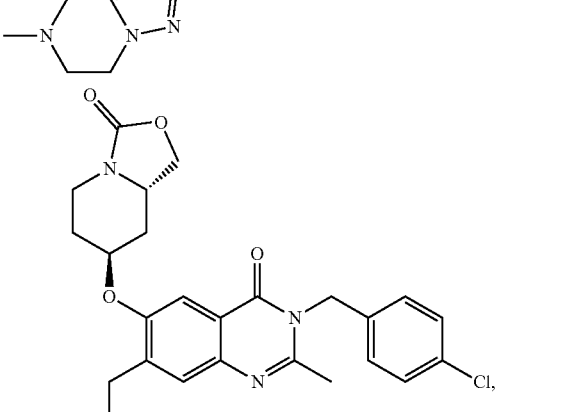

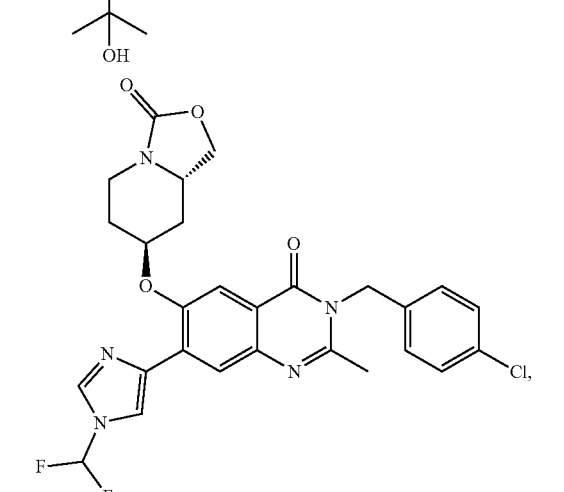

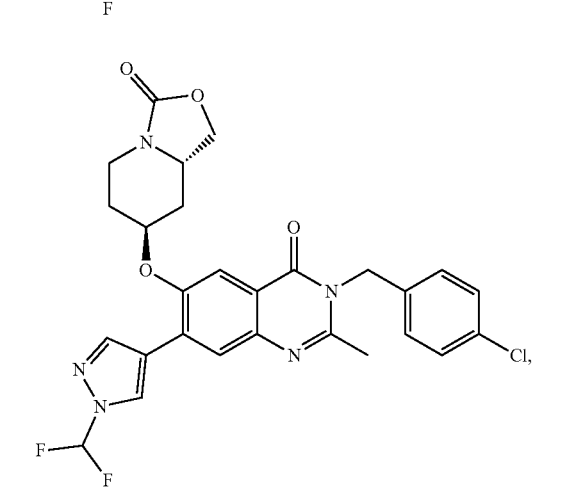

155
-continued
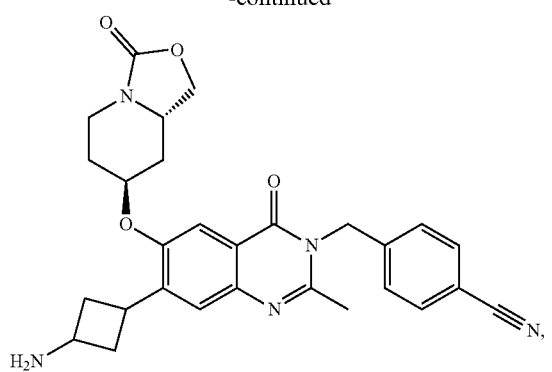
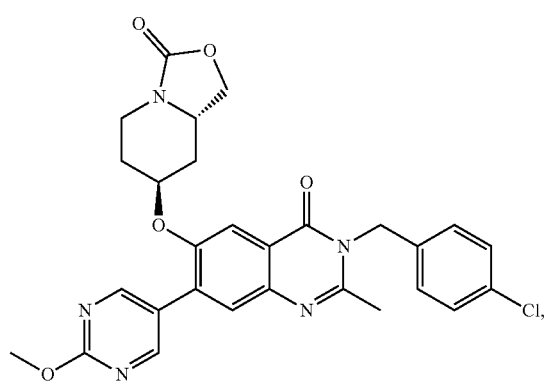
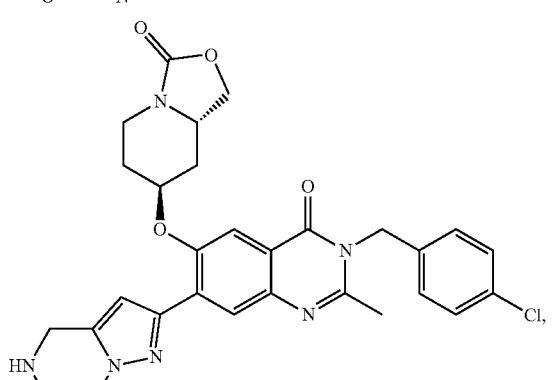
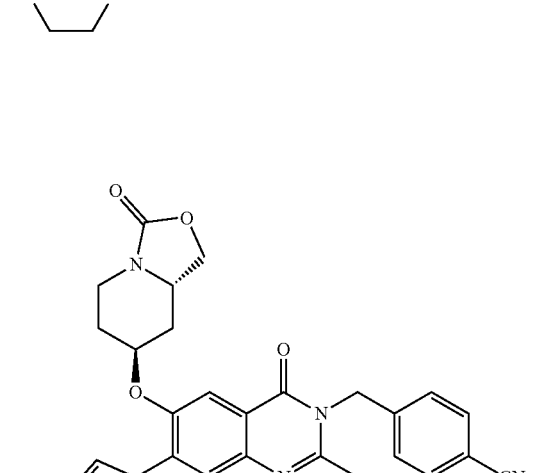
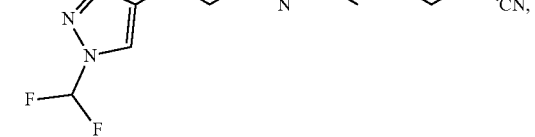
156
-continued
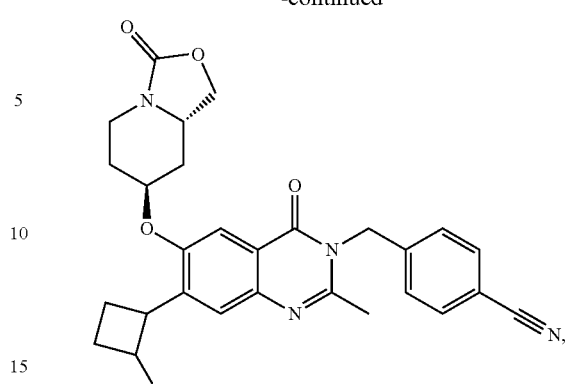
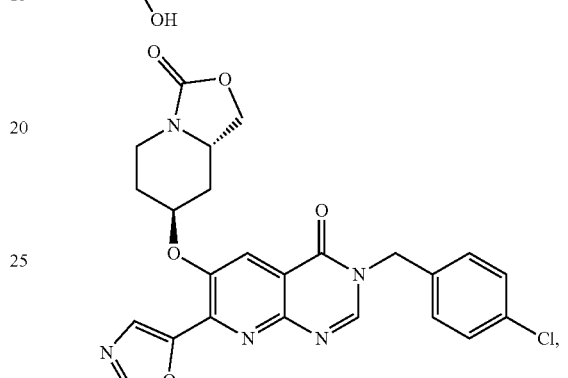
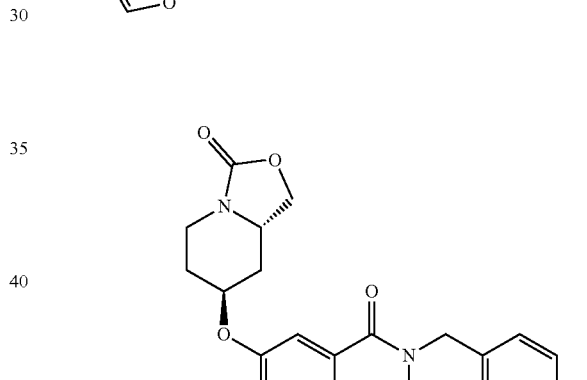
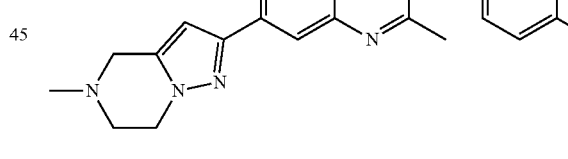
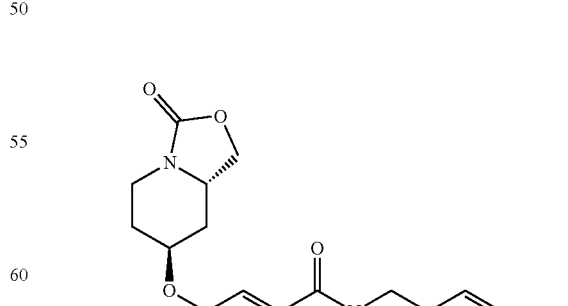
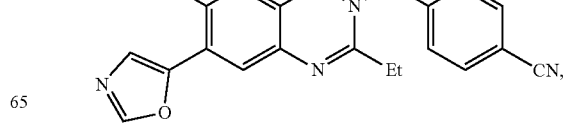

157
-continued
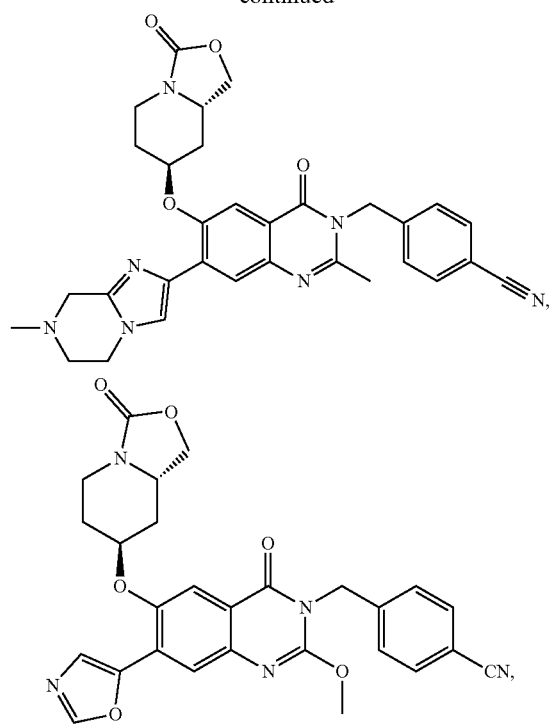
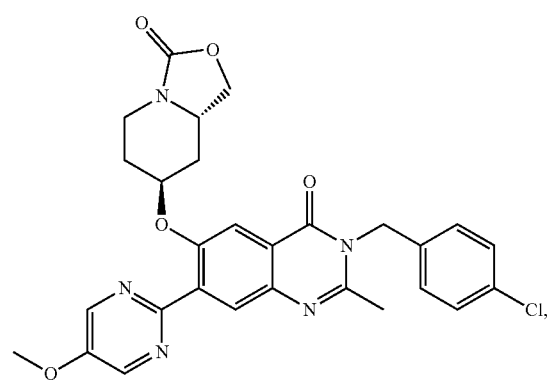
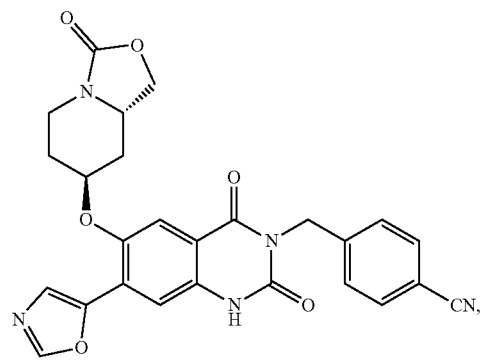
158
-continued
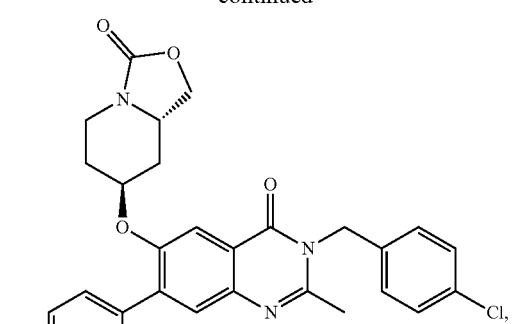
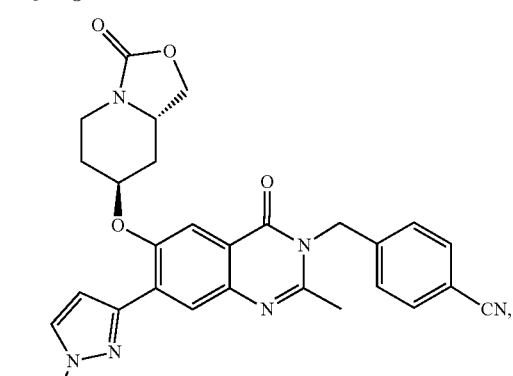
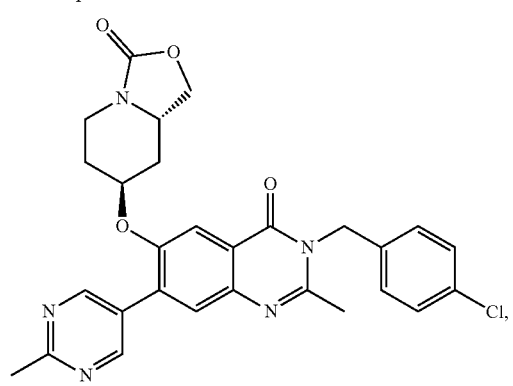
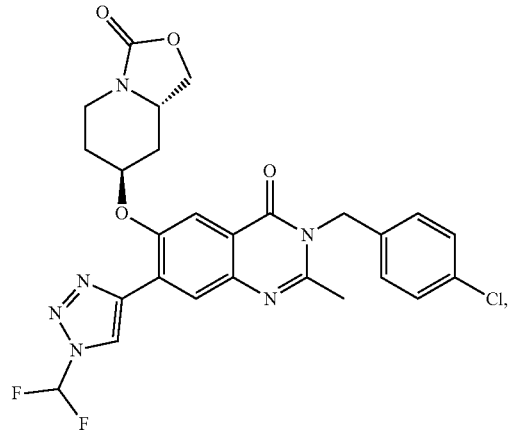

159
-continued
160
-continued
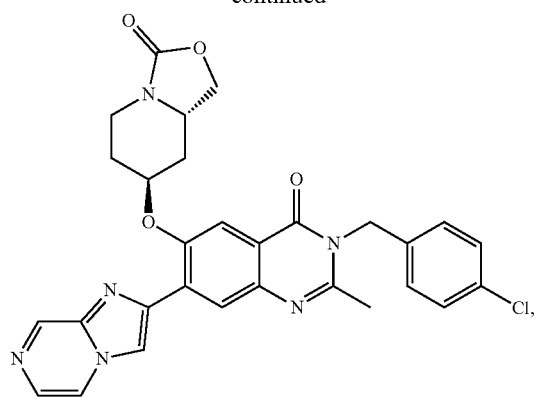
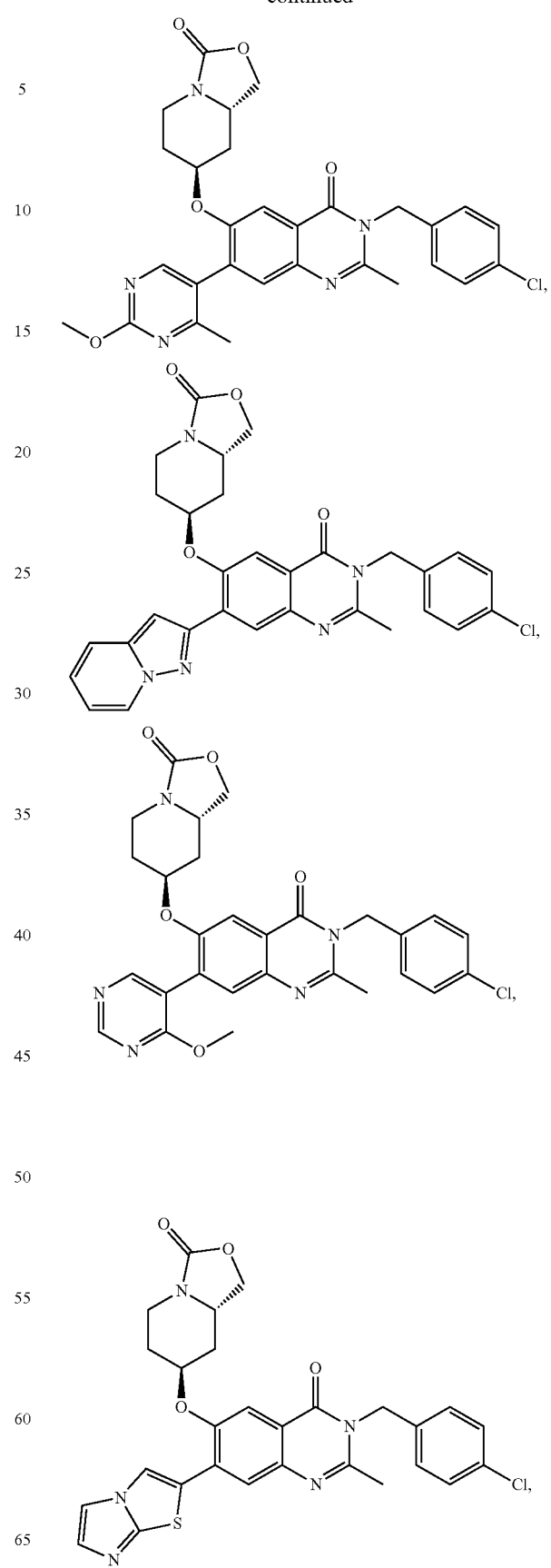

161 162
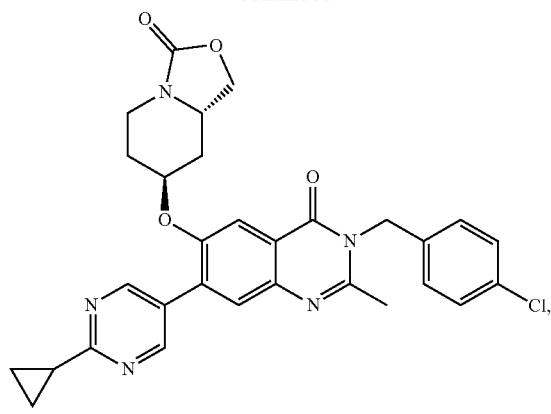
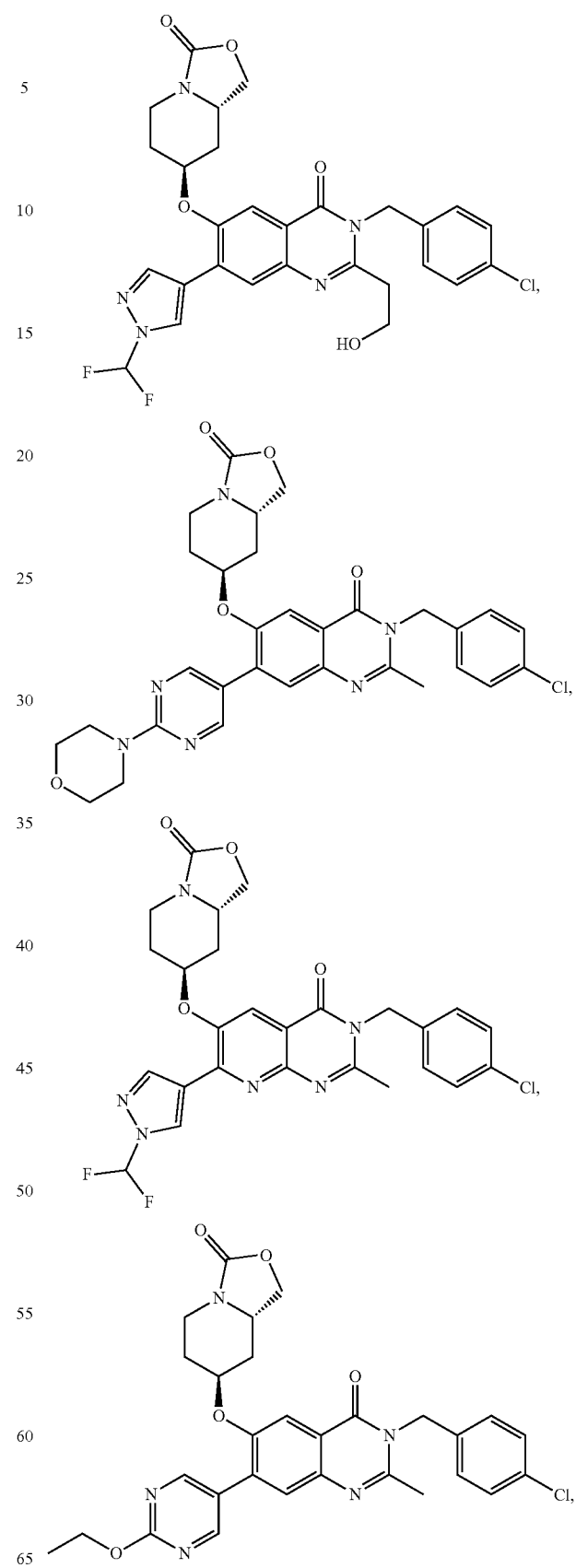

163
-continued
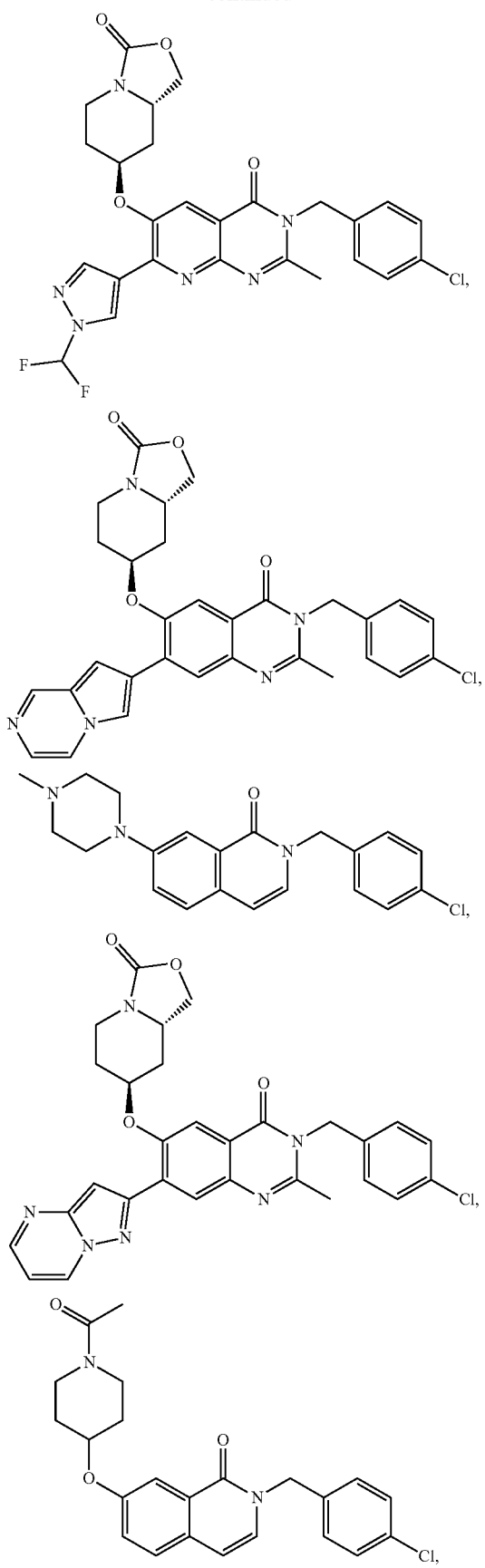
164
-continued
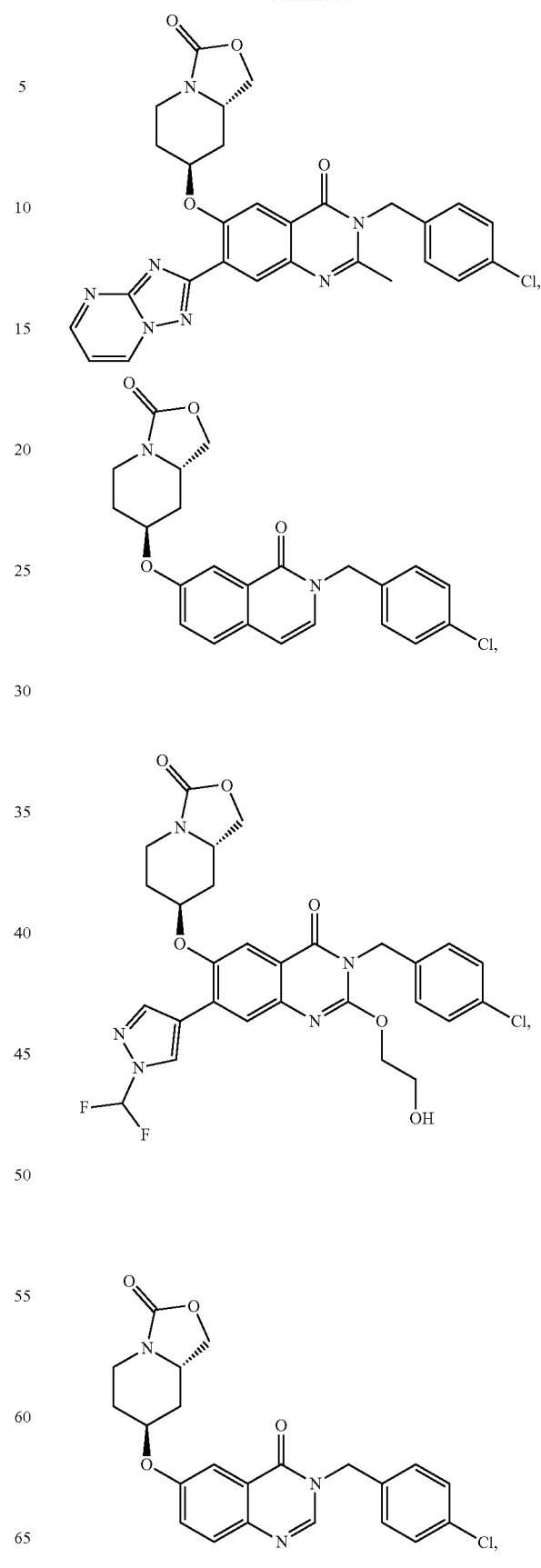

165
-continued
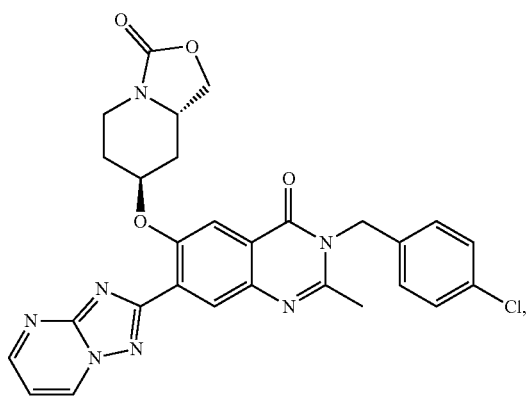
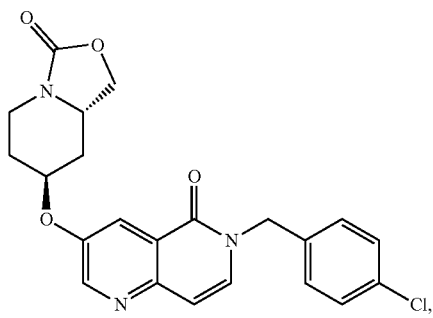
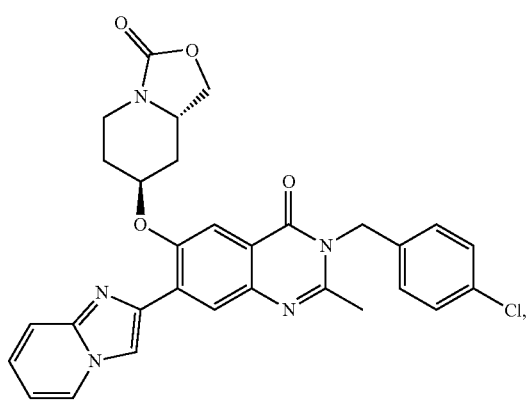
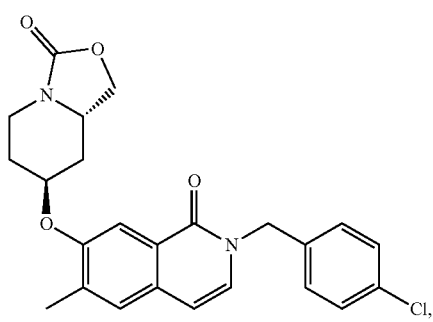
166
-continued
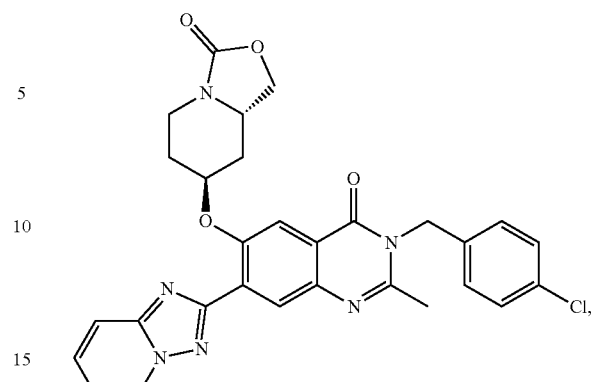
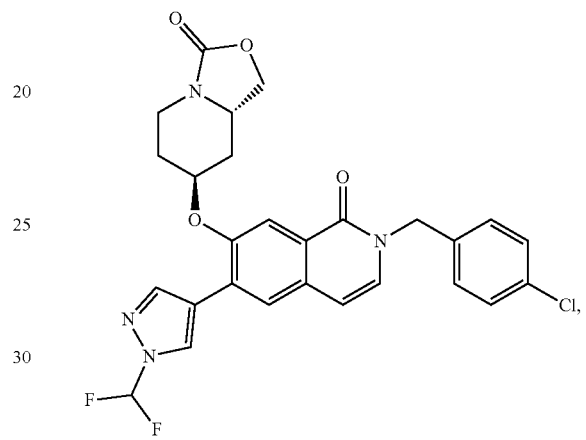
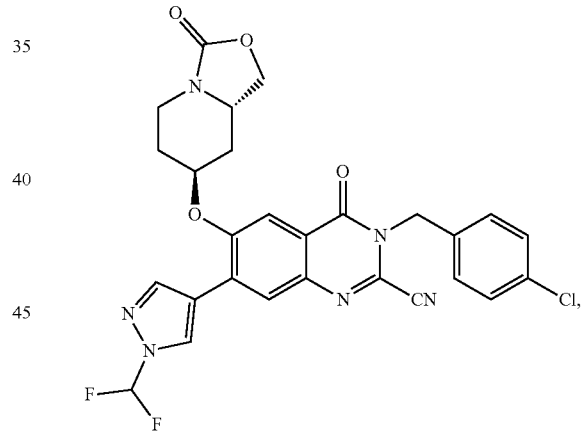
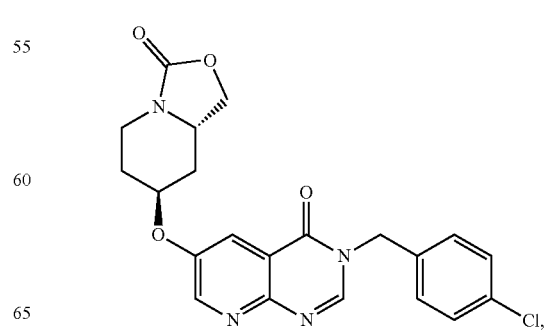

167
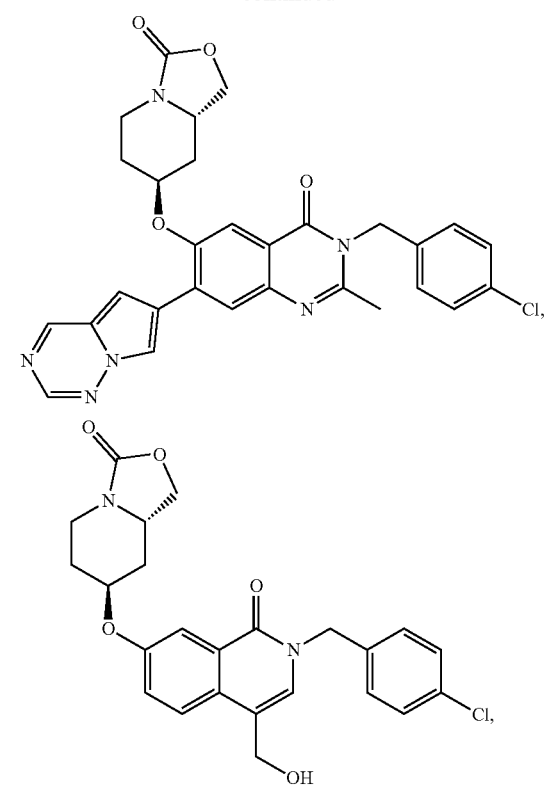
168
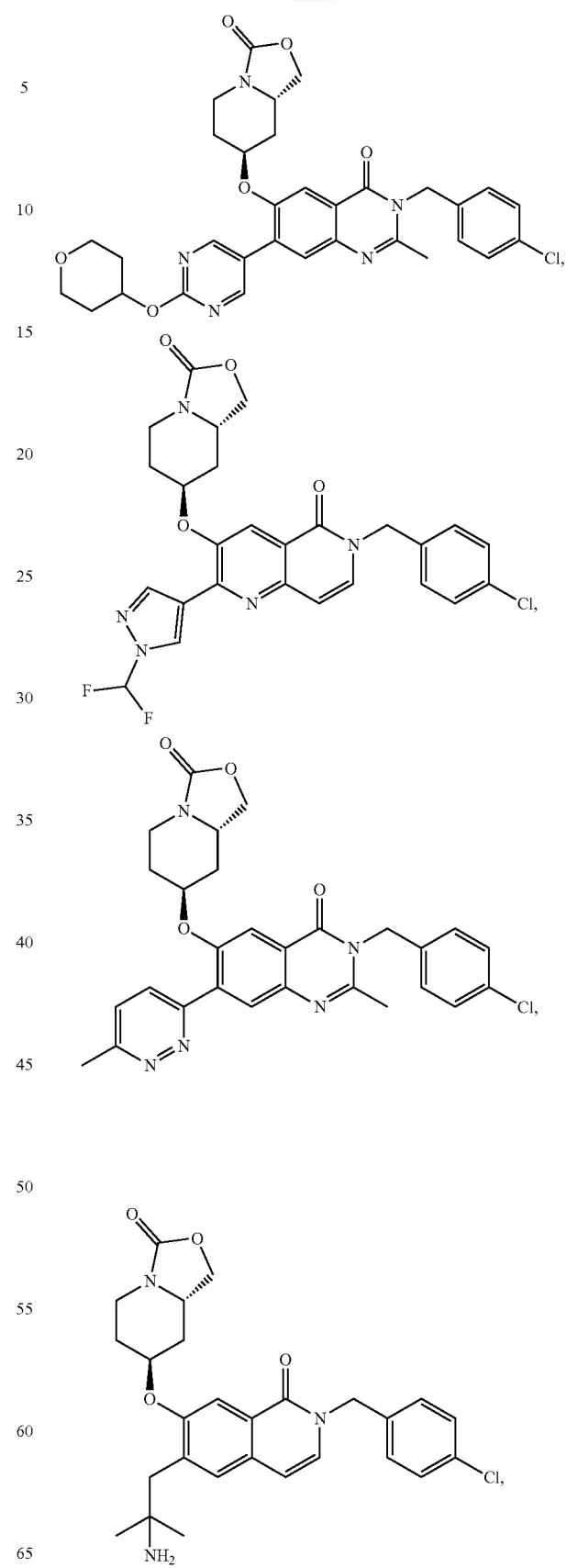

169
-continued
170
-continued
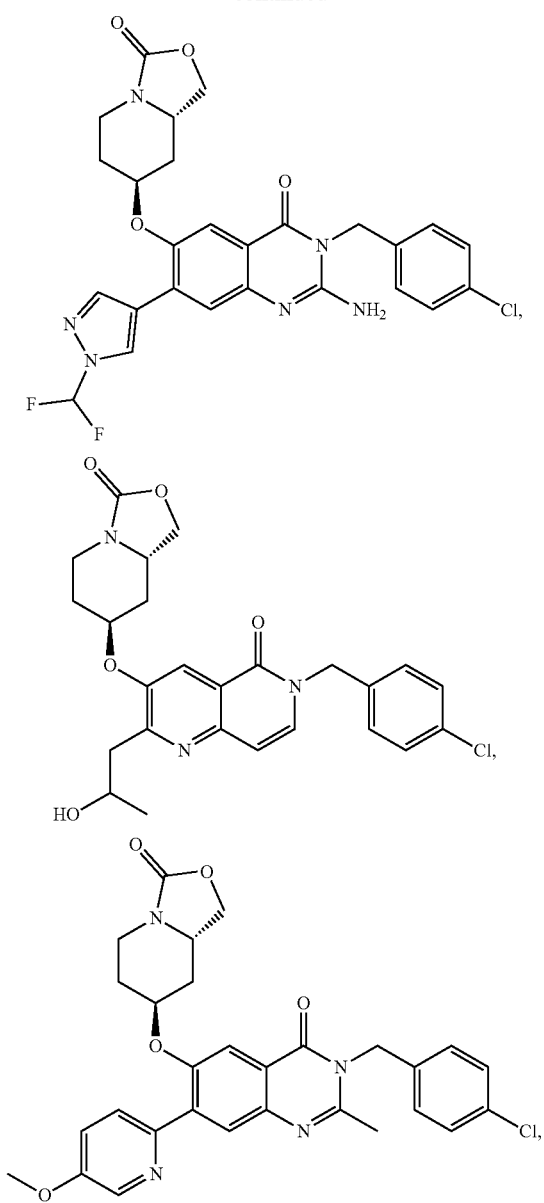
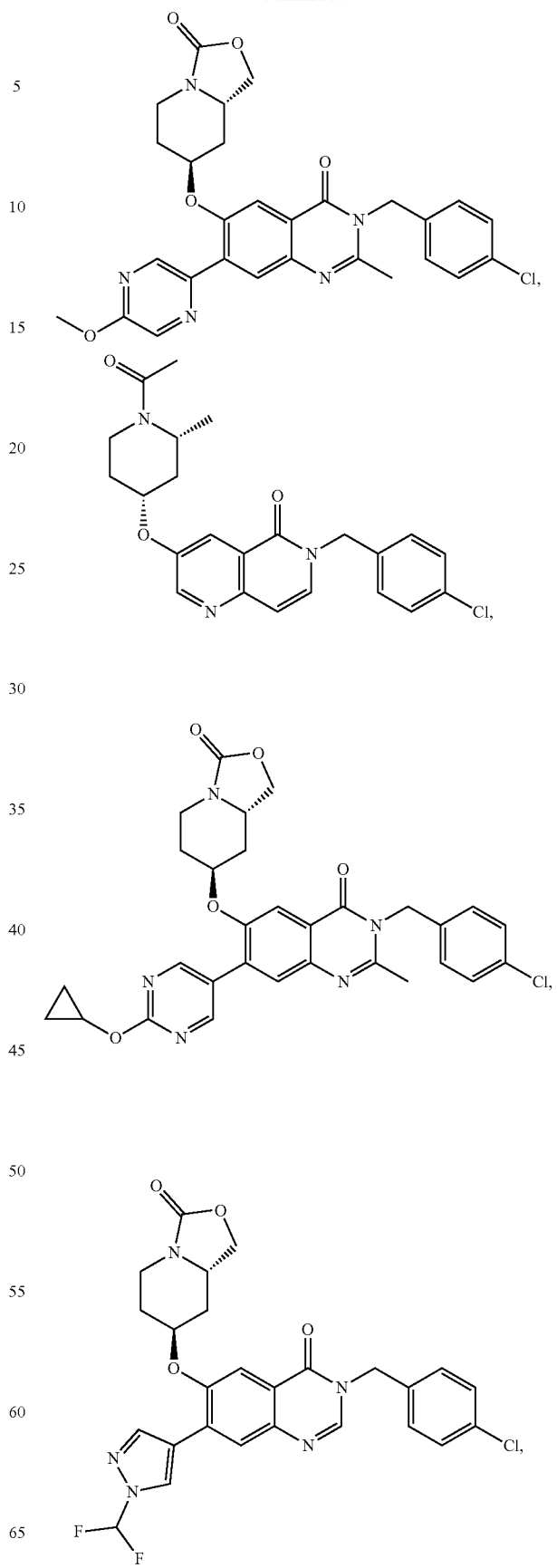

171
-continued
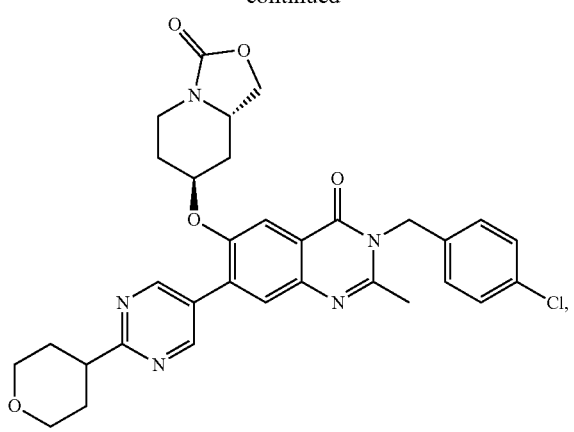
172
-continued
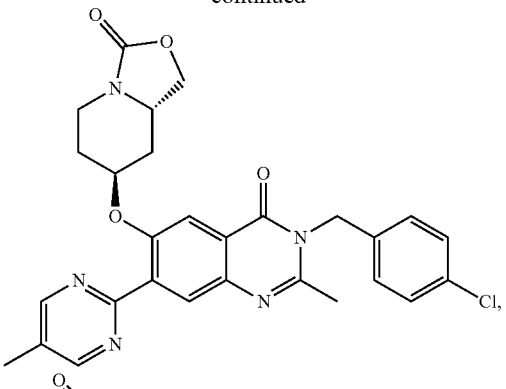
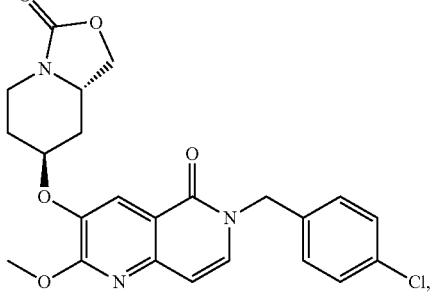
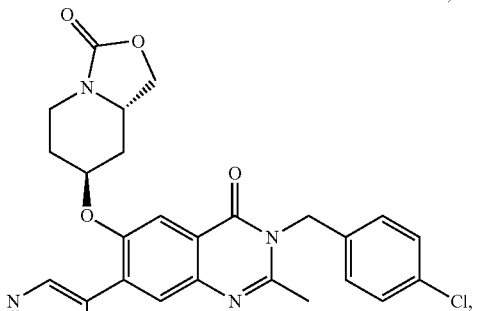
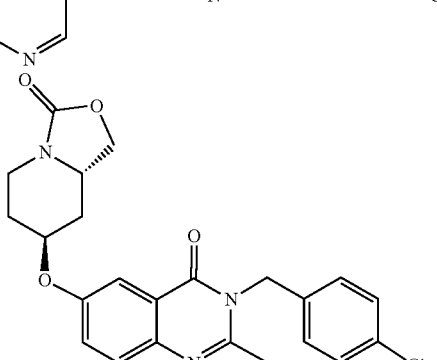
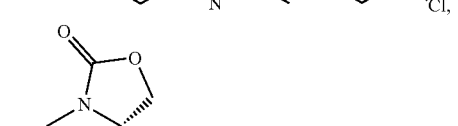
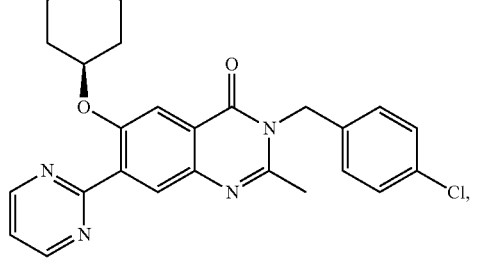

173
-continued
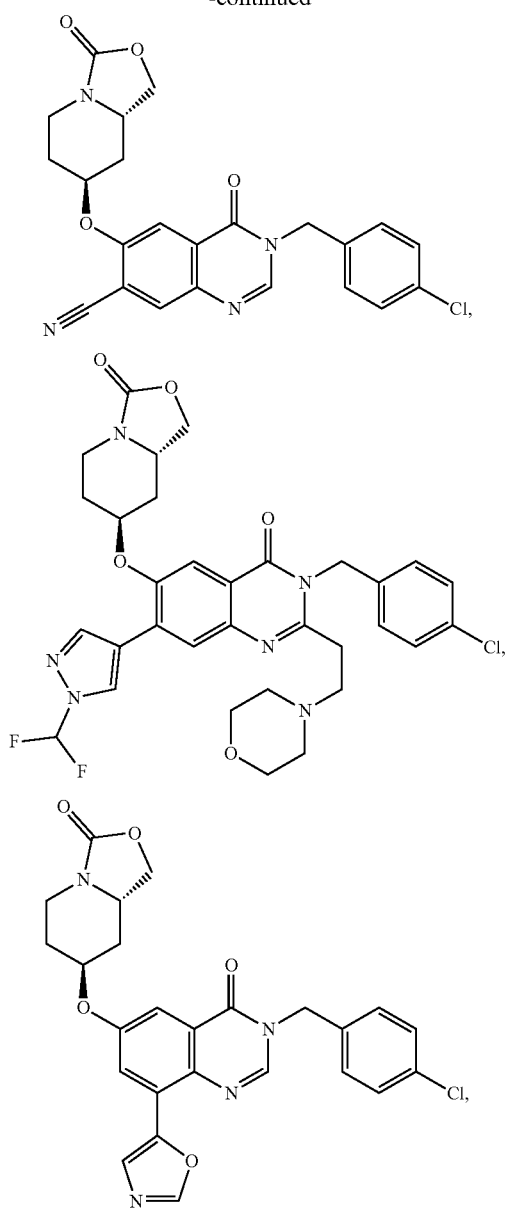
174
-continued
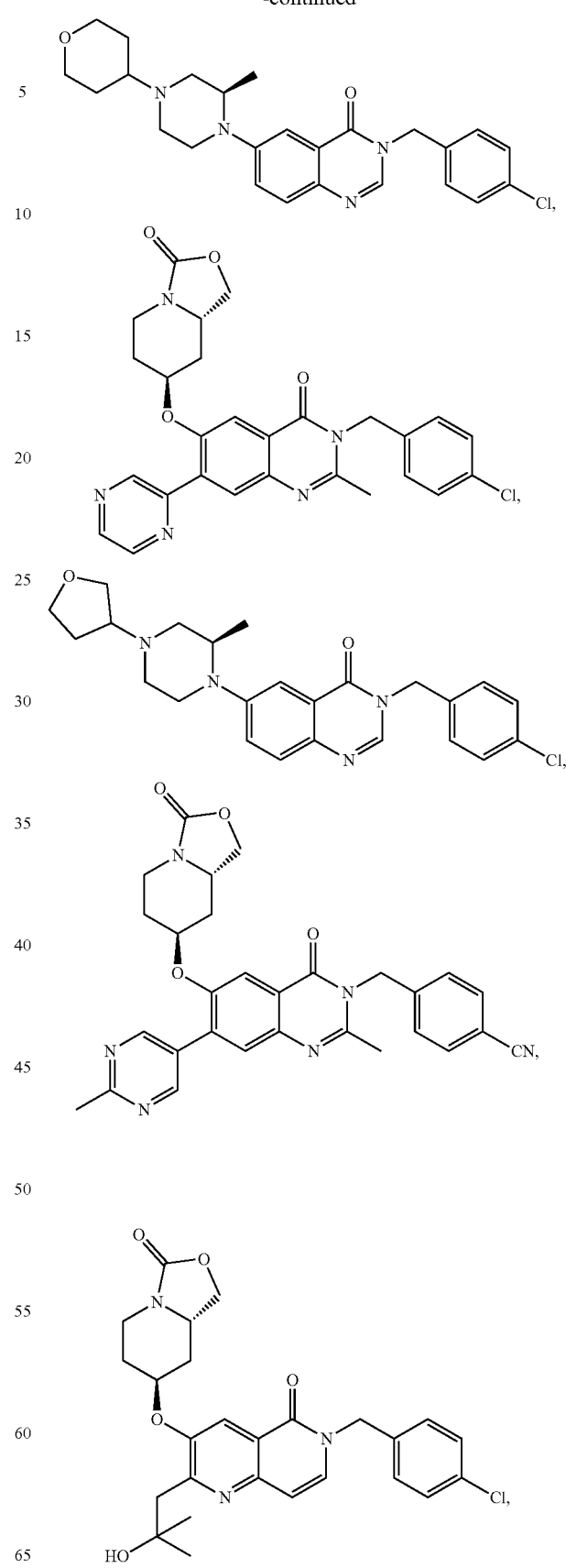

175
-continued
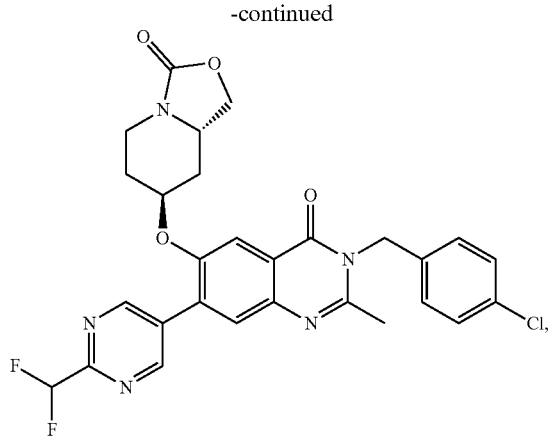
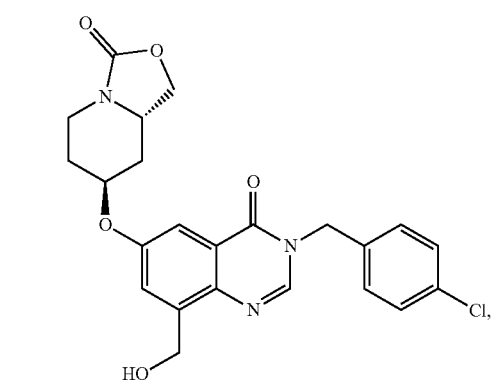 [SMILES: O=C1OC[C@@H]2C[C@@H](Oc3cc(CO)c4ncn(Cc5ccc(Cl)cc5)c(=O)c4c3)CCN12]
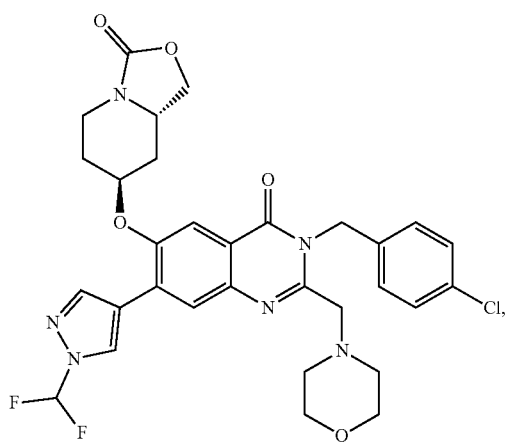
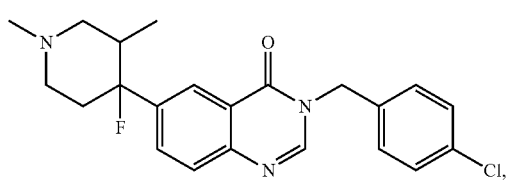
176
-continued
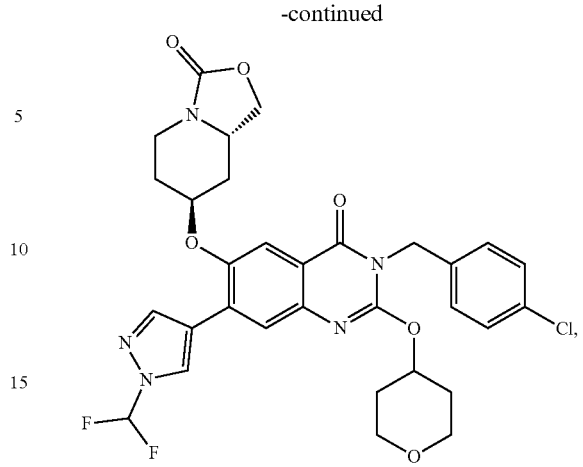
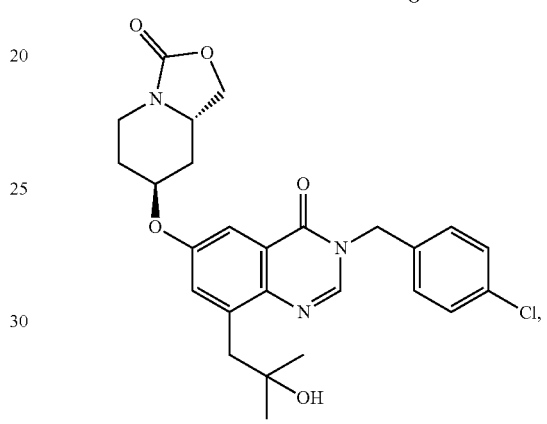
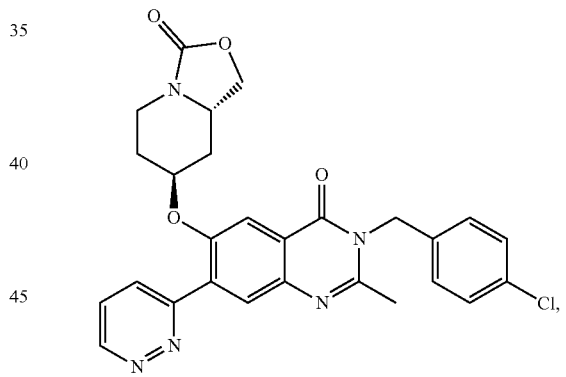
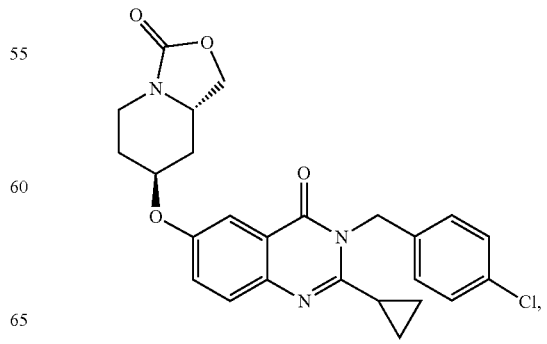

177
-continued
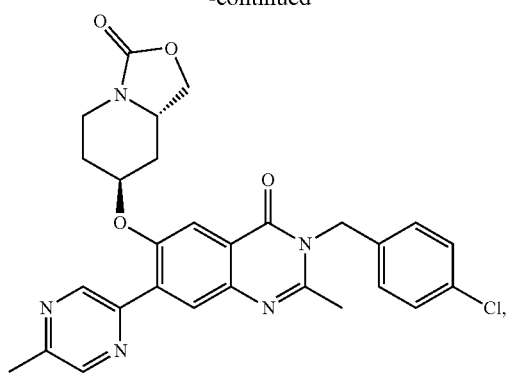
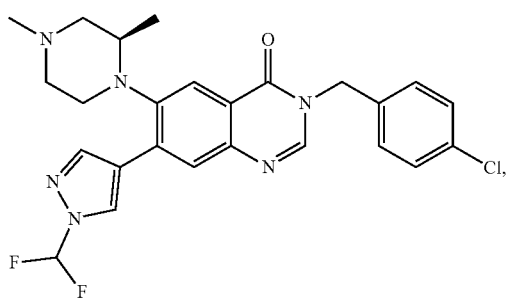 [SMILES: C[C@@H]1CN(C)CCN1c1cc2c(=O)n(Cc3ccc(Cl)cc3)cnc2cc1-c1cnn(C(F)F)c1]
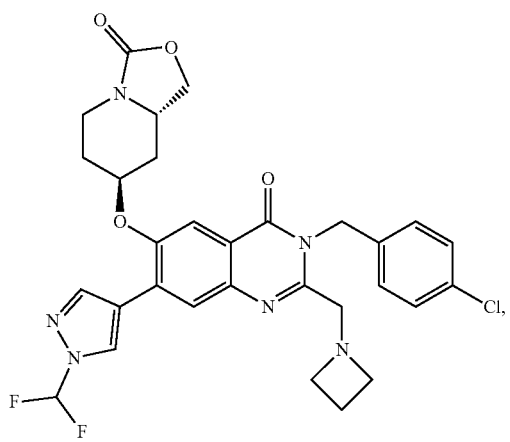
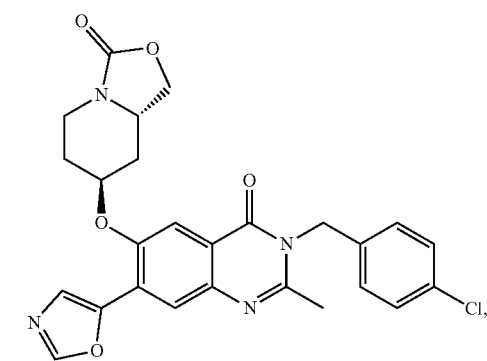 [SMILES: Cc1nc2cc(-c3cnco3)c(O[C@H]3CCN4C(=O)OC[C@@H]4C3)cc2c(=O)n1Cc1ccc(C#N)cc1]
178
-continued
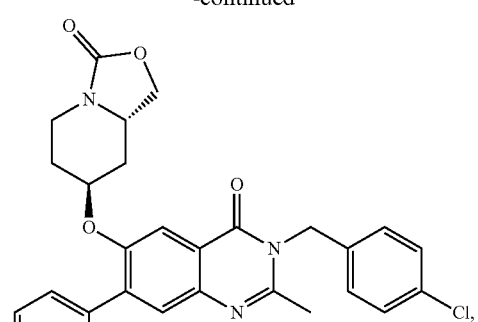
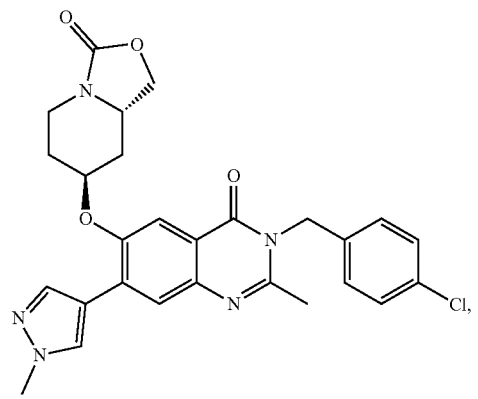
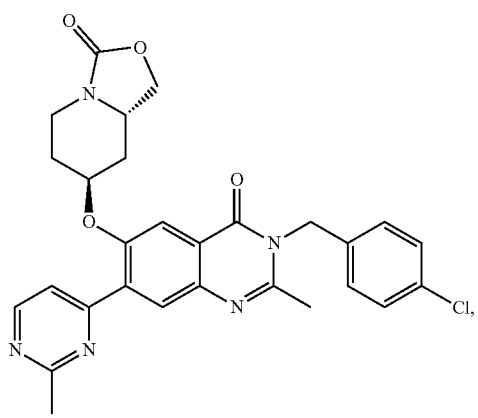
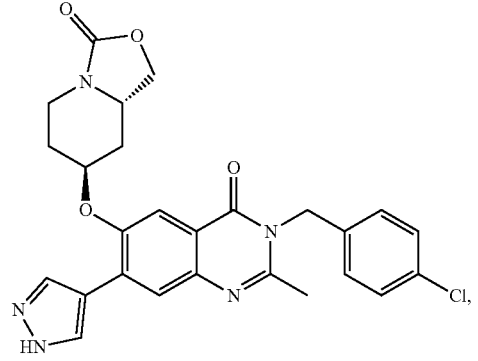

179
-continued
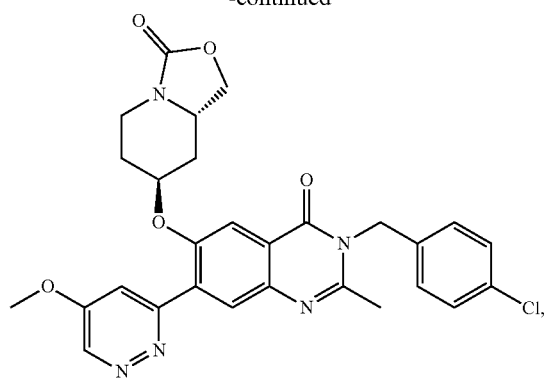
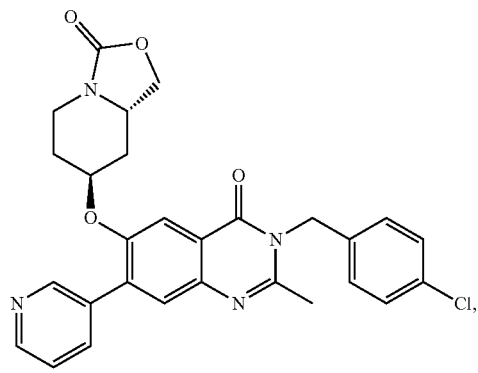
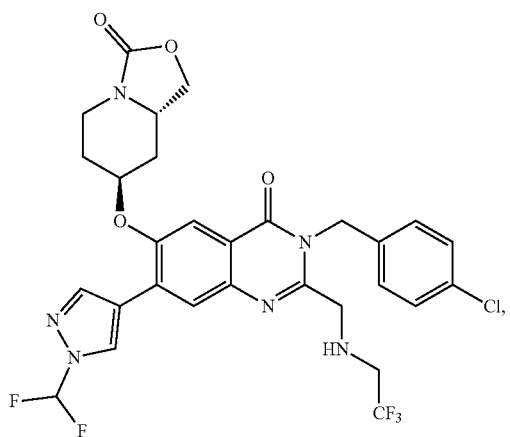 [SMILES: Cc1nc2cc(-c3cnn(C(F)F)c3)c(O[C@H]3CCN4C(=O)OC[C@@H]4C3)cc2c(=O)n1Cc1ccc(C#N)c(F)c1]
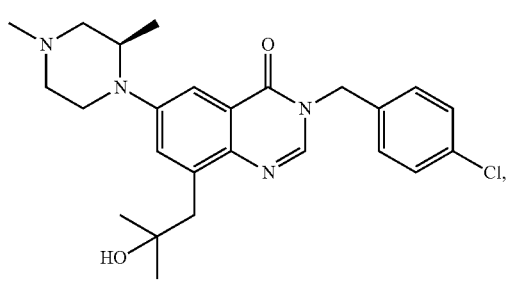
180
-continued
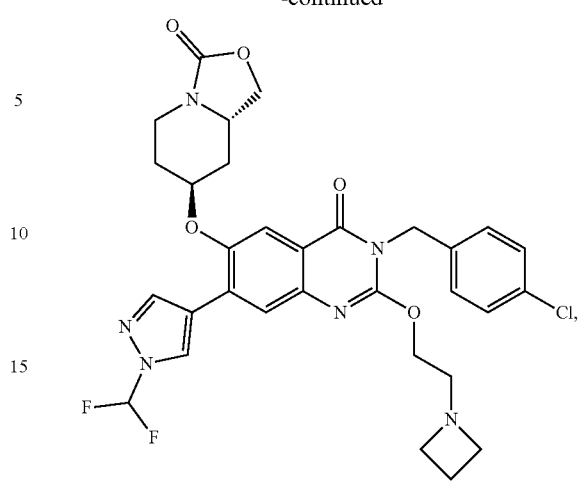
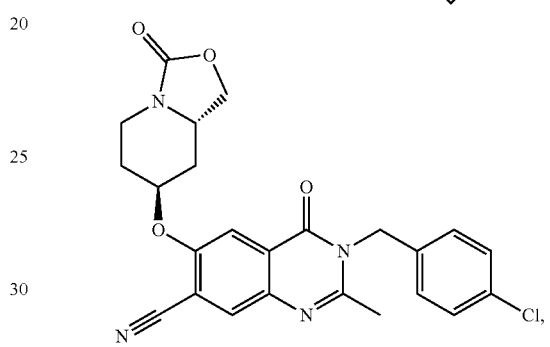
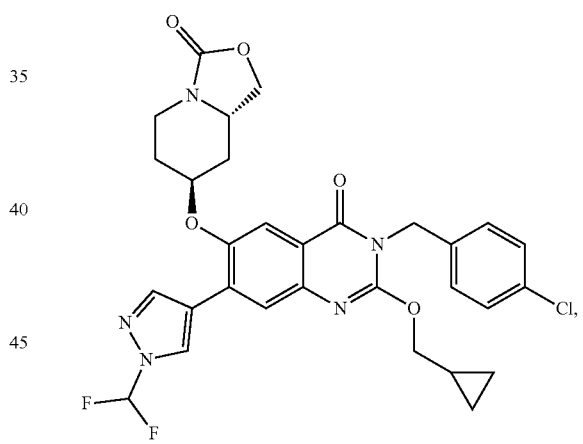
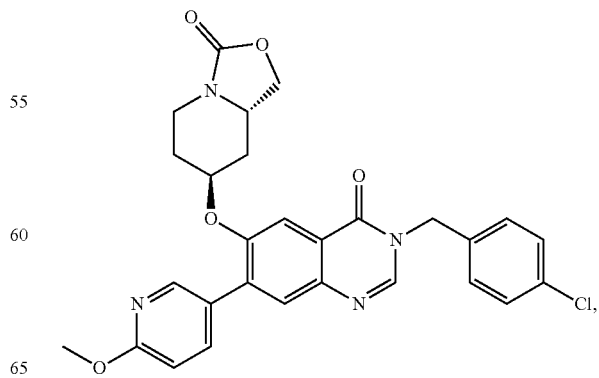

181
-continued
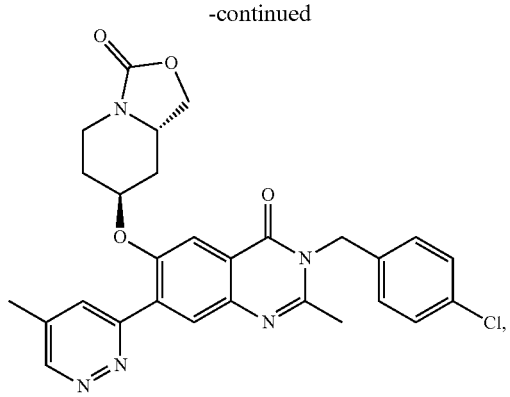
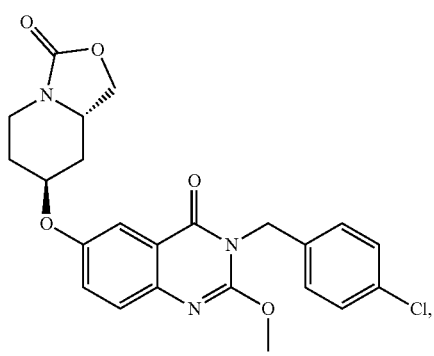
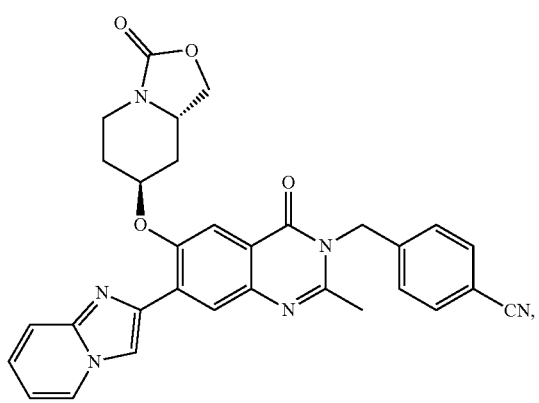
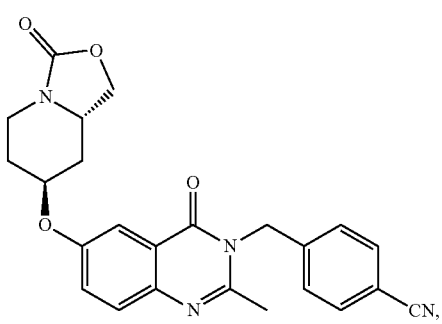
182
-continued
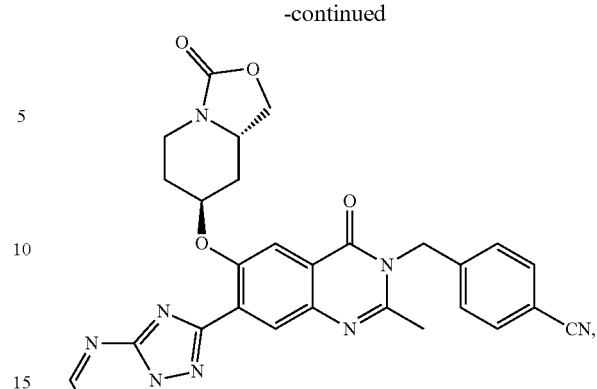
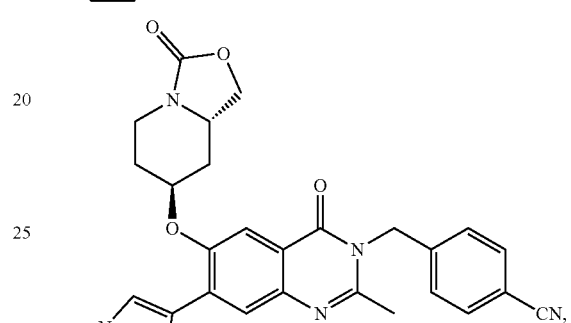
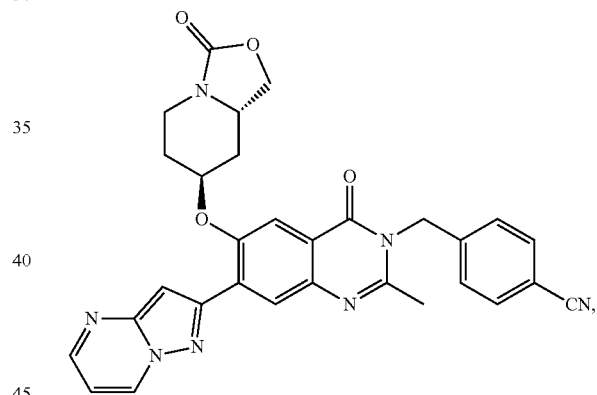
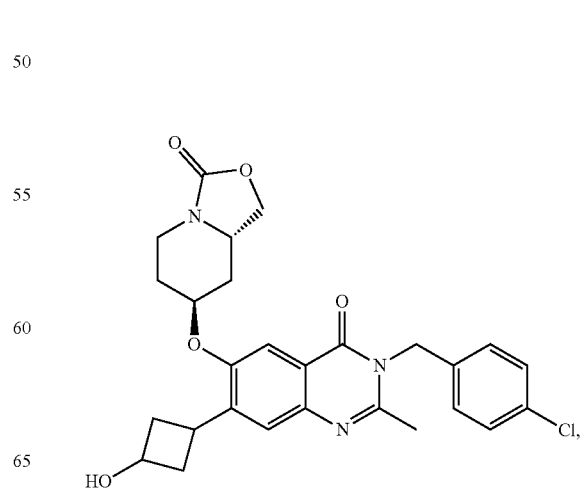

183
-continued
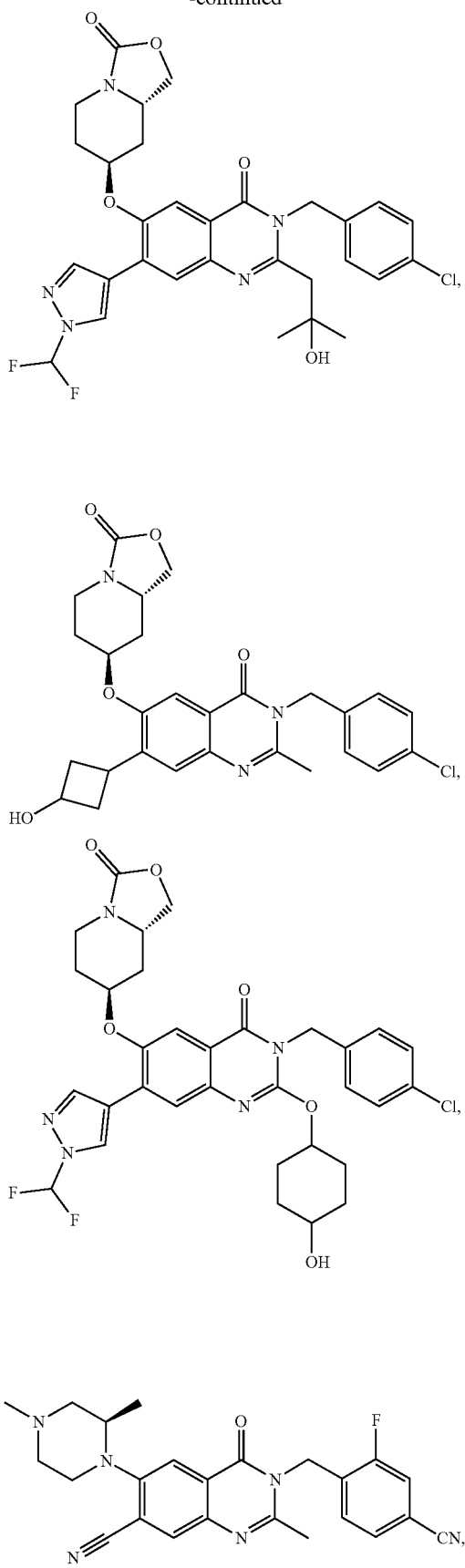
184
-continued
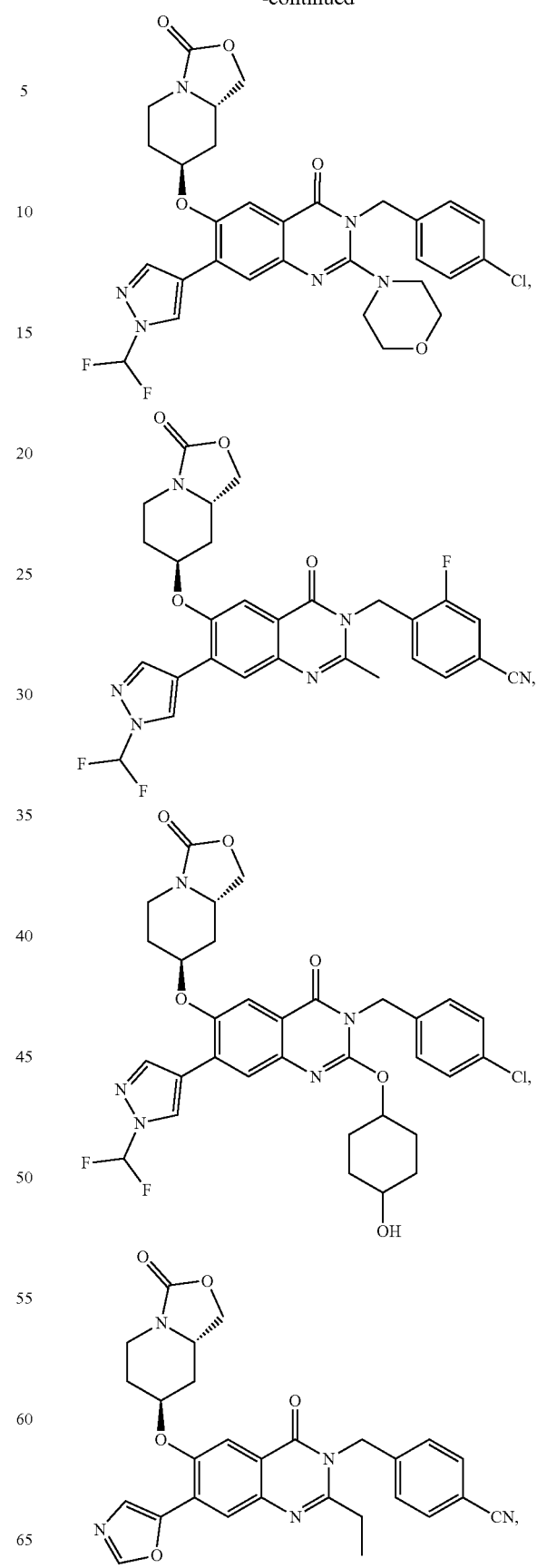

185
-continued
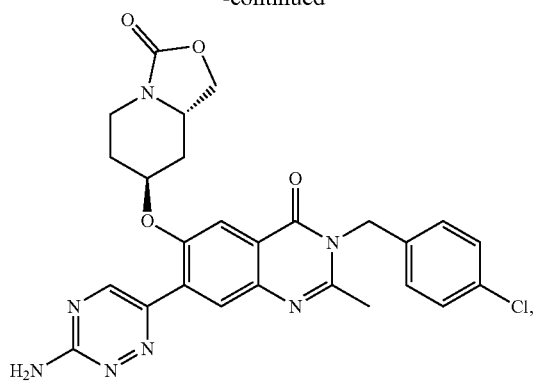
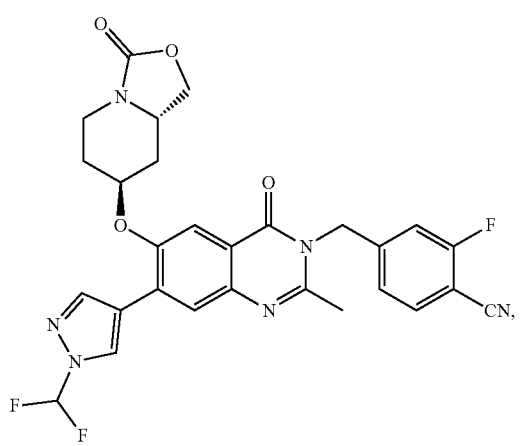
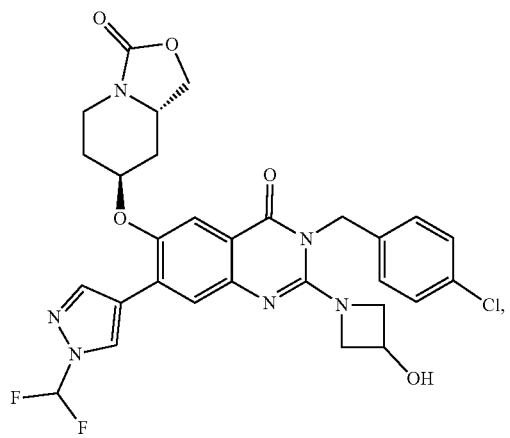
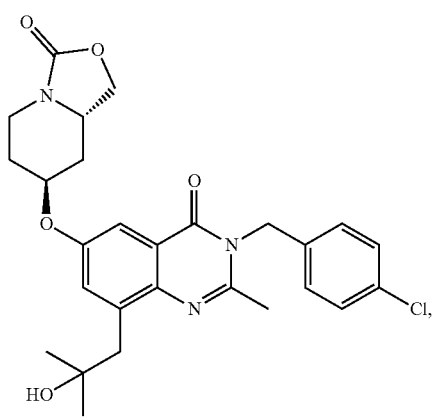 [SMILES: Cc1nc2c(CC(C)(C)O)cc(O[C@H]3CCN4C(=O)OC[C@@H]4C3)cc2c(=O)n1Cc1ccc(Cl)cc1]
186
-continued
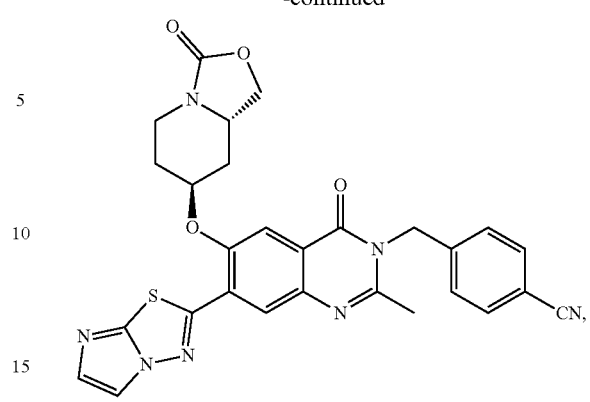
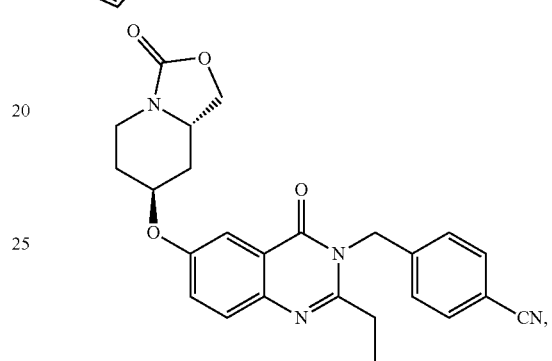
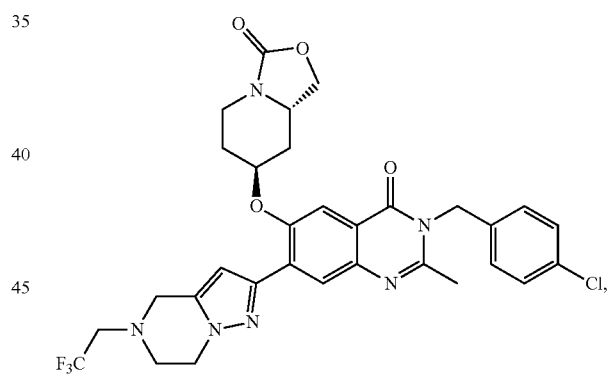
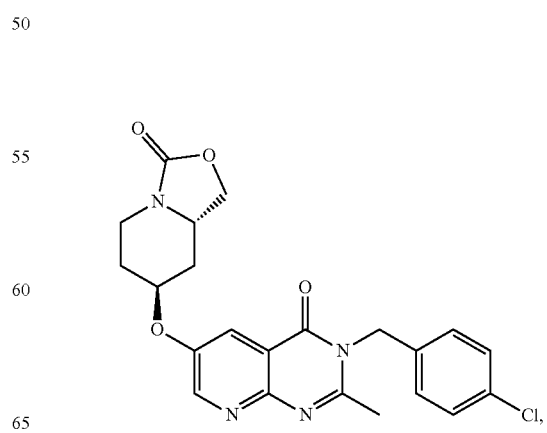

187
-continued
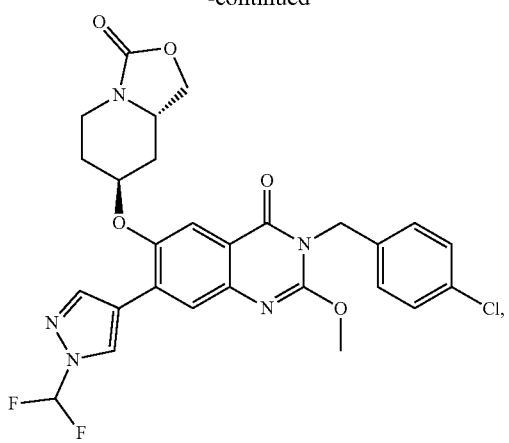
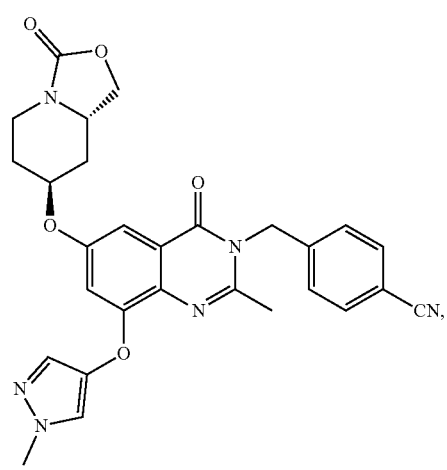
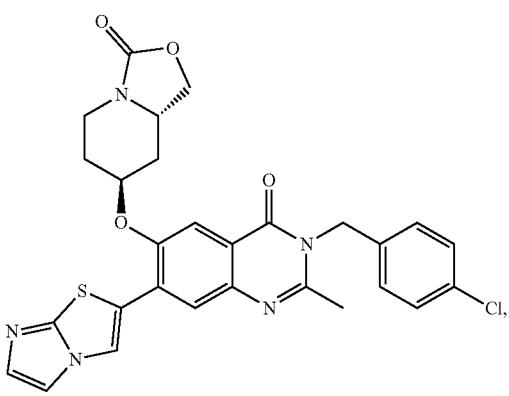 [SMILES: Cc1nc2cc(-c3cn4ccnc4s3)c(O[C@H]3CCN4C(=O)OC[C@@H]4C3)cc2c(=O)n1Cc1ccc(C#N)cc1]
188
-continued
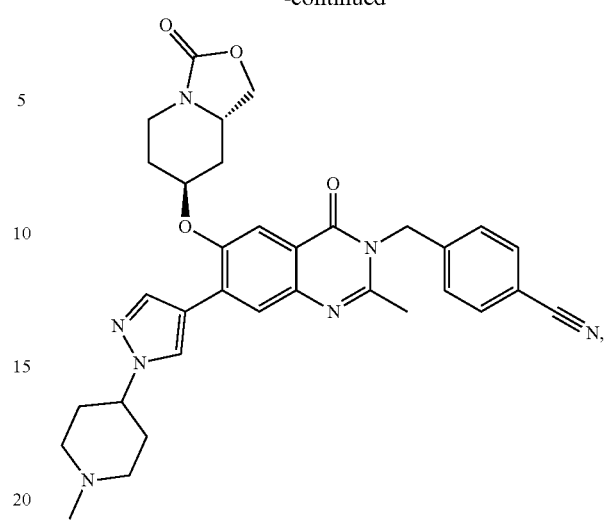
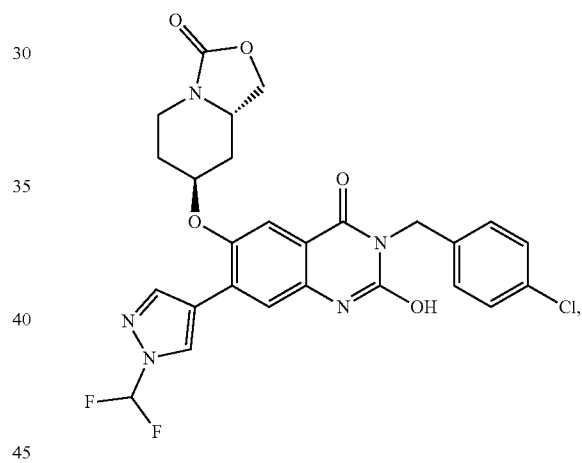
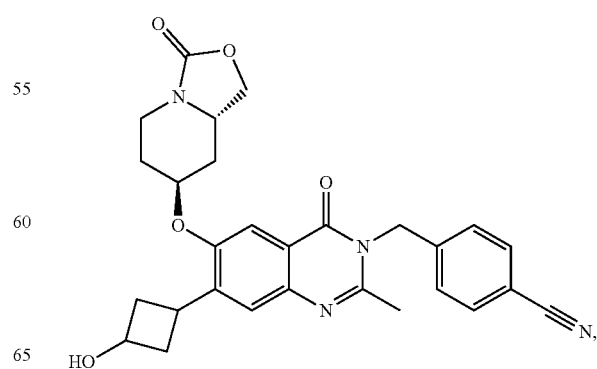

189
-continued
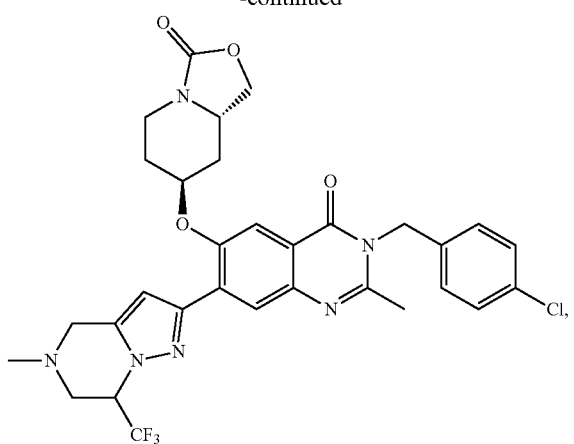
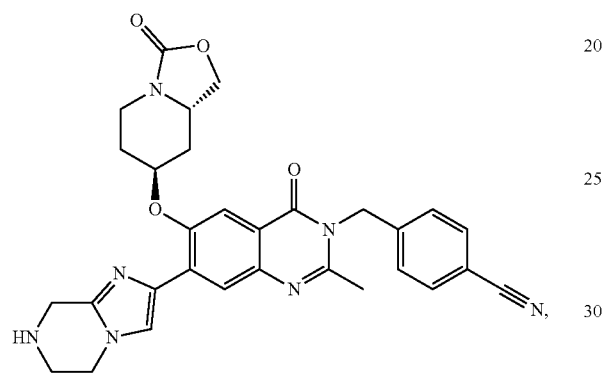
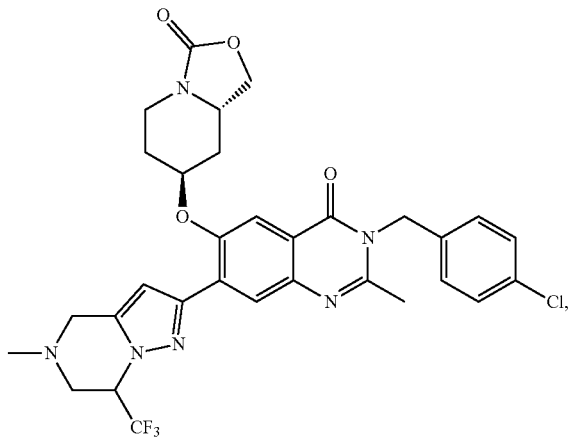 [SMILES: Cc1nc2cc(-c3cc4n(n3)C(C(F)(F)F)CN(C)C4)c(O[C@H]3CCN4C(=O)OC[C@@H]4C3)cc2c(=O)n1Cc1ccc(Cl)cc1]
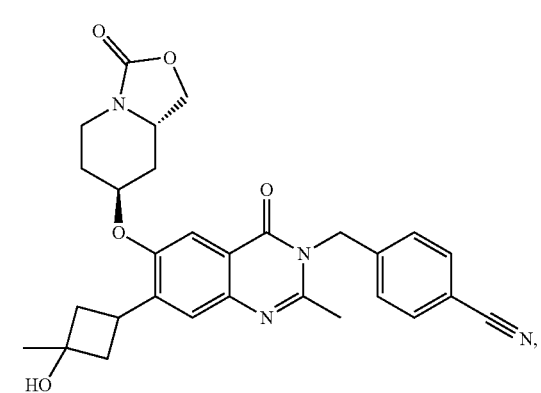
190
-continued
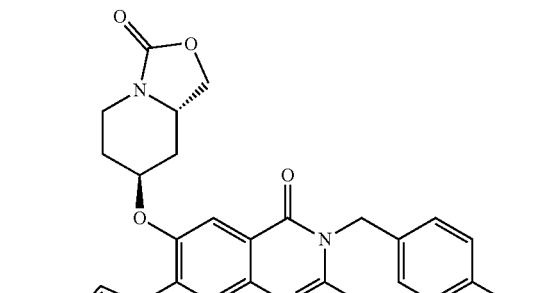
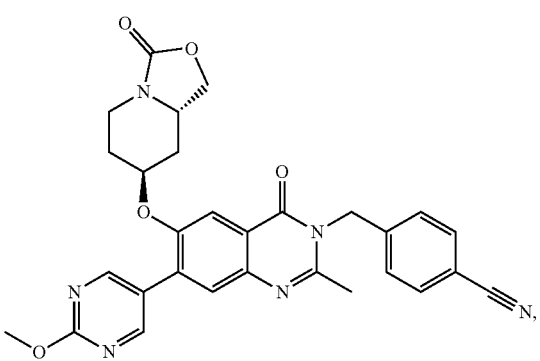
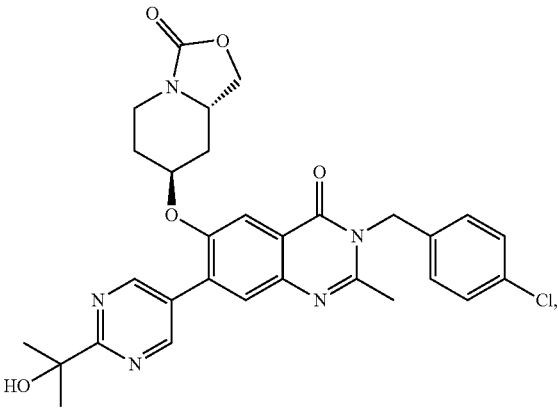 [SMILES: Cc1nc2cc(-c3cnc(C(C)(C)O)nc3)c(O[C@H]3CCN4C(=O)OC[C@@H]4C3)cc2c(=O)n1Cc1ccc(Cl)cc1]

191
-continued

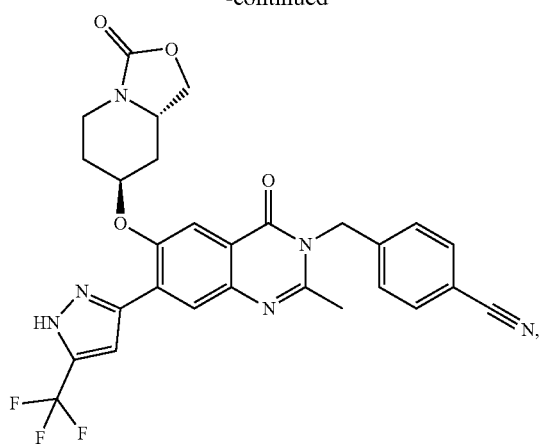

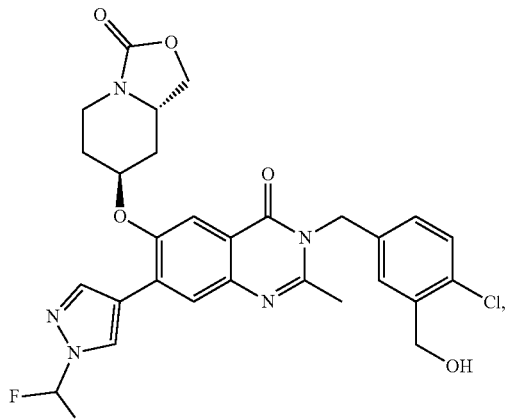

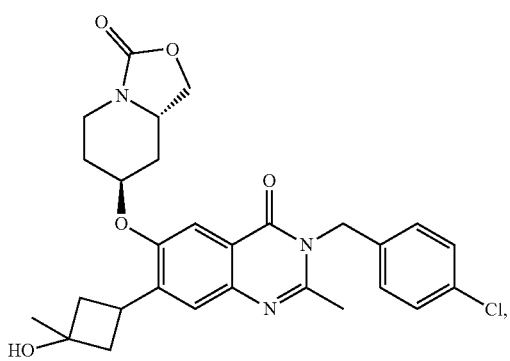

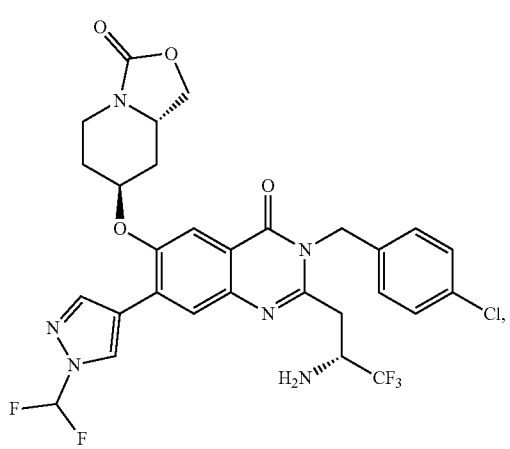

192
-continued

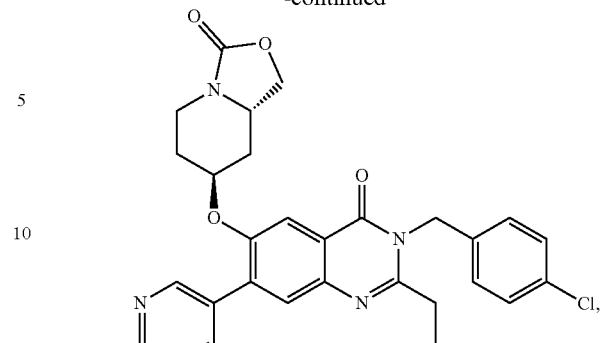

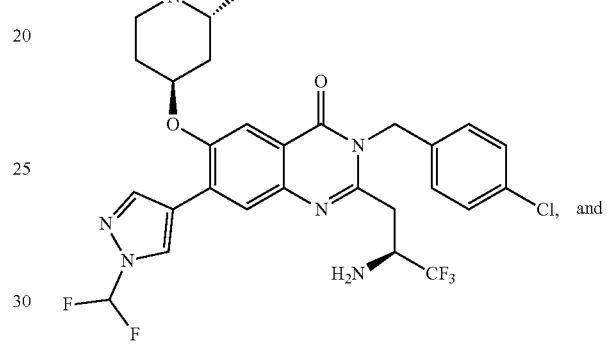

or a pharmaceutically acceptable salt thereof.

15. A pharmaceutical composition comprising an effective amount of the compound of claim 1, or a pharmaceutically acceptable salt thereof, and a pharmaceutically acceptable carrier.

16. The pharmaceutical composition according to claim 15, further comprising one or more additional therapeutic agents, wherein said additional therapeutic agents are selected from anti-herpes agents, and immunomodulators.

17. A method of treating a patient infected with a herpesvirus, comprising the step of administering an amount of the compound according to claim 1, or a pharmaceutically acceptable salt thereof, effective to treat infection by said herpesvirus in said patient.

18. The method according to claim 17, further comprising administering one or more additional therapeutic agents, wherein said additional therapeutic agents are selected from anti-herpes agents, and immunomodulators.

* * * * *